US012356078B2

(12) United States Patent
Aguilar et al.

(10) Patent No.: US 12,356,078 B2
(45) Date of Patent: Jul. 8, 2025

(54) PANORAMIC CAMERA AND IMAGE PROCESSING SYSTEMS AND METHODS

(71) Applicant: BOUNCE IMAGING, INC., Boston, MA (US)

(72) Inventors: Francisco Aguilar, Dickerson, MD (US); Sietse Dijkstra, Hoogkarspel (NL)

(73) Assignee: BOUNCE IMAGING, INC., Boston, MA (US)

( * ) Notice: Subject to any disclaimer, the term of this patent is extended or adjusted under 35 U.S.C. 154(b) by 0 days.

(21) Appl. No.: 18/438,005

(22) Filed: Feb. 9, 2024

(65) Prior Publication Data
US 2024/0267629 A1 Aug. 8, 2024

Related U.S. Application Data

(63) Continuation of application No. 17/541,955, filed on Dec. 3, 2021, now Pat. No. 11,902,667, which is a
(Continued)

(51) Int. Cl.
H04N 23/698 (2023.01)
G06T 3/4038 (2024.01)
(Continued)

(52) U.S. Cl.
CPC ......... H04N 23/698 (2023.01); G06T 3/4038 (2013.01); G06T 7/80 (2017.01); H04N 23/56 (2023.01); G06T 2207/20081 (2013.01)

(58) Field of Classification Search
CPC ........ H04N 23/698; H04N 23/56; G06T 7/80; G06T 3/4038; G06T 2207/20081
(Continued)

(56) References Cited

U.S. PATENT DOCUMENTS 9,657,935 B2 5/2017 Wilson
2016/0119541 A1 4/2016 Alvarado-Moya et al.
(Continued)

OTHER PUBLICATIONS

International Preliminary Report on Patentability for International Application No. PCT/US2019/053680, mailed Apr. 8, 2021, 15 Pages.
(Continued)

Primary Examiner — Allen C Wong
(74) Attorney, Agent, or Firm — DLA Piper LLP (US)

(57) ABSTRACT

An imaging system may include a plurality of networked imagers arranged in a geometric arrangement with respective fields of view covering part or all of a panoramic geometry, at least one inertial measurement unit (IMU) in communication with the networked imagers configured to generate orientation data indicating orientations of the plurality of networked imagers, and at least one processor in communication with the networked imagers and the at least one IMU. The at least one processor may be configured to receive a plurality of images from the plurality of networked imagers and combine the plurality of images into at least one combined image by positioning pixels of each of the plurality of images relative to pixels of the remaining plurality of images, associating the positioned pixels with the orientation data, and merging the oriented pixels of each of the plurality of images into the at least one combined image.

20 Claims, 52 Drawing Sheets

Related U.S. Application Data continuation of application No. 17/130,835, filed on Dec. 22, 2020, now Pat. No. 11,212,441, which is a continuation of application No. 16/586,772, filed on Sep. 27, 2019, now Pat. No. 10,904,434.

(60) Provisional application No. 62/813,939, filed on Mar. 5, 2019, provisional application No. 62/738,214, filed on Sep. 28, 2018.

(51) Int. Cl.
  *G06T 7/80* (2017.01)
  *H04N 23/56* (2023.01)
(58) Field of Classification Search
  USPC .......................................................... 348/38
  See application file for complete search history.

(56) References Cited

U.S. PATENT DOCUMENTS

| | | |
|---|---|---|
| 2016/0176343 A1 | 6/2016 | Sakano et al. |
| 2017/0067739 A1* | 3/2017 | Siercks ..................... G06T 7/97 |
| 2017/0310936 A1* | 10/2017 | Nordin ................. G06F 3/1446 |
| 2018/0232945 A1 | 8/2018 | Kashibuchi |
| 2018/0267301 A1 | 9/2018 | Holst |

OTHER PUBLICATIONS

International Search Report and Written Opinion for International Application No. PCT/US2019/053680, mailed Dec. 6, 2019, 16 Pages.

\* cited by examiner

Distribution of fish-eye projection on the reference sphere. For clarity a wide angle of 100° is used.

*Image coverage of the spherical FOV with 140° of HFOV and 89° of VFOV*

| CS | $S_0^T r_1$ | $S_0^T r_2$ | $S_0^T r_3$ |
|---|---|---|---|
| 1 | − | − | − |
| 2 | + | − | − |
| 3 | − | + | − |
| 4 | + | + | − |
| 5 | − | − | + |
| 6 | + | − | + |
| 7 | − | + | + |
| 8 | + | + | + |

FIG. 39

PANORAMIC CAMERA AND IMAGE PROCESSING SYSTEMS AND METHODS

CROSS-REFERENCE TO RELATED APPLICATIONS

This application is a continuation of U.S. patent application Ser. No. 17/541,955, filed Dec. 3, 2021, which is a continuation of Ser. No. 17/130,835, filed Dec. 22, 2020, entitled "Panoramic Camera and Image Processing Systems and Methods,", which is a continuation of Ser. No. 16/586,772, filed Sep. 27, 2019 (Now U.S. Pat. No. 10,904,434) which claims priority to U.S. Provisional Application No. 62/738,214, entitled "Omnidirectional Body-Mounted Camera System for Humans and Animals," filed Sep. 28, 2018 and U.S. Provisional Application No. 62/813,939, entitled "Remote Object Pinpointing and Navigation System," filed Mar. 5, 2019, the entirety of each of which is incorporated by reference herein.

BRIEF DESCRIPTIONS OF THE DRAWINGS

FIG. 39 is a table of signs of projections of the direction vector on the axes of the cage coordinate systems according to an embodiment of the invention.

DETAILED DESCRIPTION OF SEVERAL EMBODIMENTS

Figure 1A:
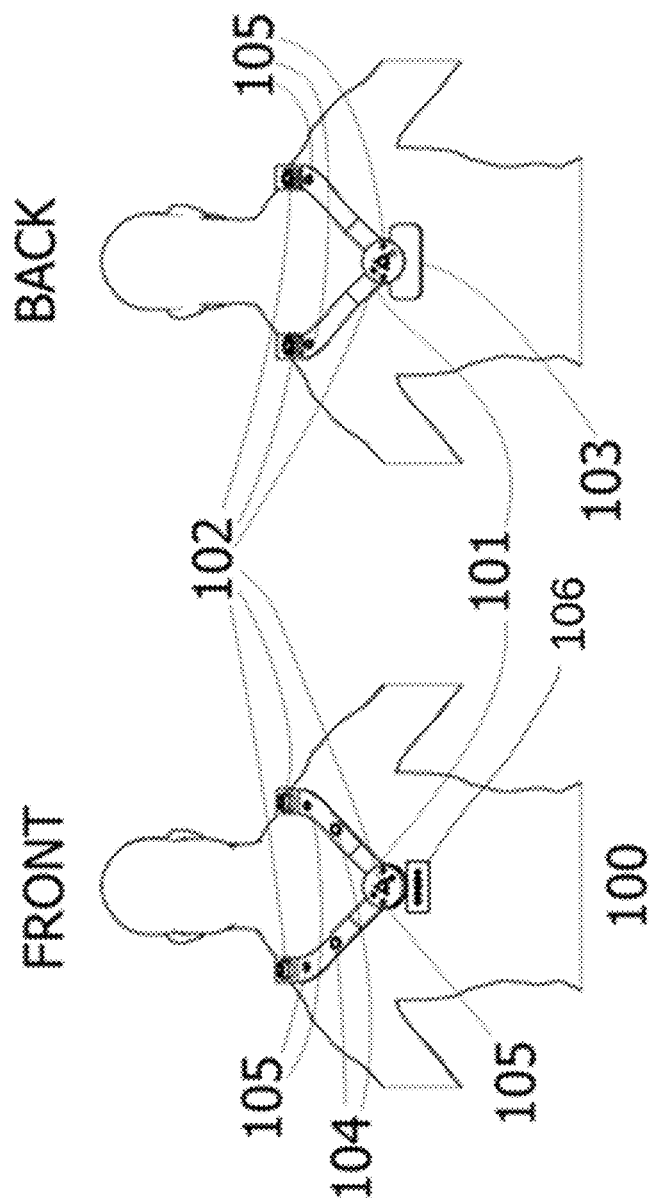
FIG. 1A shows a shoulder-and-chest-mounted omnidirectional personal body camera according to an embodiment of the disclosure.

In recent years the use of body cameras for police and other first-responders has become widespread. That trend has spread to include police K-9 dogs and is already widespread on remote platforms like robots and drones. Warfighters have also often had live streamed cameras on their helmets or otherwise to share situational information. In each of these environments, and in other imaging applications, there may be a variety of performance and/or usability factors to consider. For example, some embodiments described herein may provide a natural field of view without blackout/blindspots, motion stability that renders video easy to view without extensive editing (editing that erodes public trust), and/or orientational awareness enabling an understanding the environment in which the camera is operated. Some embodiments described herein may use panoramic video stitching and stabilization to provide these and/or other features to body cameras. By placing multiple cameras at different positions on the human, animal, or robotic user/carrier, some embodiments may provide a "first-person" point of view panoramic video so viewers can look in many directions at the same time. By placing a "virtual center point" of that panorama where the head of the user would be, some embodiments may provide a truly natural 360/virtual reality context as if one were "standing in their shoes". Through application of precise panoramic stabilization, some embodiments may keep a view on a direction of interest (in both the horizontal and vertical orientation), even as a human is running, a dog is swinging from side to side, or a robot is tumbling down a flight of stairs.

Some embodiments may utilize technology described in U.S. Pat. No. 10,091,418, entitled "Imaging Systems and Methods," which is incorporated herein in its entirety. However, some embodiments may apply such features to oddly-shaped objects (dogs, humans, robots) with visual centers (eyes/brains) not in their physical center. For example, this may include shifting the "virtual center point" from which the panoramic view "originates" once reconstructed to roughly reflect where the head or eyes or robot arm/post would be, allowing for a more natural view. In another example, this may include constructing precise mounts and positions for the cameras to match the shoulder width, vest size, or other individually-varying dimension of the user (e.g., by custom 3D printing in advanced materials like carbon fiber or through other construction techniques). These and/or other features may provide a truly individualized, first-person view of recorded video that is stable and allows many viewers to observe it in real-time.

Some embodiments described herein may take advantage of the known panoramic orientation in a known coordinate system to allow a remote user to "steer" a mechanism from a distance. This can be used, for example, to direct a small laser to move to different positions to allow a user to instruct a dog where to go beyond line-of-sight, to move a laser to designate a target by tapping on a smartphone screen, or to drive a robot or drone from a distance by looking in the desired direction in a virtual reality headset.

Finally, because all this panoramic video creation may be very processor-efficient, in some embodiments, all processing can be done onboard one or more local devices, reducing cloud processing and storage costs.

Some embodiments described herein may provide optimized capture, processing, and presentation of multiple still images and/or video frames (collectively referred to herein as "images") into a single, stitched panoramic (e.g., omnidirectional) scene or subset thereof that may be easily navigated by a user. In some example embodiments, the capture, processing, and presentation systems and methods may be used with a custom human-mounted body camera system. However, it will be clear to those of ordinary skill in the art that the discussed the system is only one of many applications for the disclosed systems and methods.

Omnidirectional Camera Systems

FIG. 1A shows a shoulder-and-chest-mounted omnidirectional personal body camera 101 according to an embodiment of the disclosure. In some example embodiments, a human-mounted omnidirectional camera system 101 may be customized for a user 100, and user 100 may be measured for shoulder width, head height, and/or vest size. In this embodiment the user 100 may wear the camera 101 over the shoulder. Three cameras 102 on the front and three cameras 102 on the back may capture different images from which a panorama may be created as described below. The battery and central processor device 103 may be located on the user's back side of the system 101 in this example. In low light situations, IR LEDs 105 or other lighting on the front and back may provide illumination. On the front two bright white LEDs 104 or other visual spectrum lighting may be fitted to provide visual illumination to the user.

Optimal positions for multiple cameras (in this case, six) may be calculated based on a field of view and orientation of the cameras. In one embodiment, these cameras may be Aptina MTV024 imager sensors paired with fisheye lenses with a diagonal field of view of greater than 100 degrees. The fields of view may be simulated in a computer-aided design (CAD) drawing by creating irregular pyramids with the angles of the horizontal and vertical field of view for the lenses and then placing these on a model of the human based on the measurements taken. By moving these pyramids, whose vertices correspond to the position of the lens of a camera or imager systems, the overlap between cameras (useful both for panoramic stitching and for 3-dimensions reconstructions of a space) may be maximized while ensuring complete omnidirectional 360-degree in all directions) coverage about the person.

In this embodiment, with the camera positions selected and with the chest and other measurements of the user, the sections of the "necklace" or breastplate that hold the cameras in the desired positons may be customized for the user (e.g., using a computer aided design (CAD) program). The resulting files can be used to 3D print sections or the whole of the housing that holds the cameras at chest and shoulder height on the front and back in some embodiments. For example, a Markforged printer may be used to print the sections in Onyx (chopped carbon fiber plus nylon) reinforced with continuous carbon fiber, allowing for very light, very rigid, and very strong housings. In other embodiments, other materials and/or construction techniques may be used.

Individual imager boards may be placed in slots created by the above housing, and lenses may be placed above them. Rigid-flex cables and connectors may connect these imager boards to the batteries, central processing unit (CPU), inertial measurement unit (IMU), and communications module which are housed in small boxes in the chest and shoulder sections of the housing (not shown). In this embodiment, the CPU is an Analog Devices Blackfin 548, the IMU is an Invensense MPU-9250 (multiple can be used at once), and the communications module is a Variscite DART module communicating both over a 802.11 a/b/g/n WiFi module and connected to a 4G-LTE module (in this embodiment, a pre-certified Nimbelink module). Other hardware, software, and or firmware may be used and, in general, the computing systems of FIG. 1A and other embodiments are described in greater detail below with respect to FIG. 19.

In use, system 101 may be initialized, and the images captured by the different image sensors 102 may be used to focus the lenses and conduct an intrinsic and extrinsic calibration. For example, the intrinsic and extrinsic calibration may be performed according to the teachings of U.S. Pat. No. 10,091,418, which are also described in greater detail below with respect to FIGS. 20-43.

This calibration information may be used to merge the different imager images into a single panoramic image reconstructed about a virtual center point. The initial measurements of head position may be used to translate that virtual center point along X, Y, and Z axes such that it is aligned with the eyes or head of the user. When generating the panorama the images may be projected on the inside of a virtual sphere. In a default case, the center of the sphere may be used as a reference from which the panorama is to be viewed. By translating this center point and the projection sphere, the viewpoint can be translated. This means a remote viewer on a smartphone or virtual reality headset may be able to see the world from the perspective of the user. To enable this translation, the calibration information may be augmented with information defining a line from a real center point of the sphere relative to the cameras to the desired point of view, or a set of coordinates relative to the center point representing the desired point of view in a coordinate system with the real center point also established. For example, if a user is wearing cameras at his or her chest, the line may be defined from the center point of the cameras to the position of the wearer's eyes. Likewise, if a dog is wearing cameras on a collar or a backpack, the line may be defined from the center point of the cameras to the position of the dog's eyes. The line may be defined in terms of distance and direction, for example. The line or coordinates may be customized for specific users/dogs/other applications during calibration, or may be generalized for a given application (e.g., a given default line or set of coordinates for a human chest-worn application, another given default line or set of coordinates for a dog collar-worn application, another given default line or set of coordinates for a dog backpack-worn application, etc.).

For viewing the panoramic image data, multiple projection methods may be available. For each projection the field of view can be made larger or smaller. The user may, for example, select the following projections (but may not be limited to the following projections): a rectilinear projection, a (equidistant or hemispherical) fisheye projection, a cylindrical projection, a panini projection, or an equirectangular projection.

Clock-level synchronization between the cameras 102 and IMU may be performed according to the teachings of U.S. Pat. No. 10,091,418 and as described below. The synchronization may allow the panoramic image to be instantly rotated to retain a stable yaw, pitch, and roll angle even if the user is moving (e.g. running or falling backwards). This may allow the remote viewer to continue to focus on the relevant incident even if the local user is moving wildly.

As noted above, white and infrared LED illuminators 104, 105 may be placed in sections of the housing 101 around the cameras 102 to allow for illumination that is visible to the cameras 102 when needed, to the user when helpful as a flashlight system, and as a defense in sentry mode. In sentry mode, if a sudden acceleration is detected by the IMU (suggesting the user has been hit or fallen), the white lights on the chest and shoulders may be triggered to shine in powerful rapid pulses designed to disorient and temporarily blind an attacker behind, in front, or to the side of the user.

In this embodiment, five green lasers are embedded in the front chest unit 106. A remote user watching the video on a smartphone (via radio, WiFi, or 4G embedded in the wireless communications module) can tap their screen to mark an item of interest such as a specific cabinet door. If the indicated direction/object is far to the right of the user, the rightmost laser in the housing may activate and show a small dot on the wall for the user. The user may then turn towards the dot. As the IMU detects this rotation, it may turn off the rightmost LED and turn on the one second from the right, and then the middle laser indicating "dead ahead". If the user turns too far and overshoots the orientation, the IMU and processor may activate one of the left lasers to guide them to rotate back to the left. The lasers can be in nonvisual spectra that can only be seen by a user with special glasses, and in that mode can provide for truly silent communication about orientation. When visible, such a laser system can be used to guide dogs or even to indicate a target for another observer.

Figure 1B:
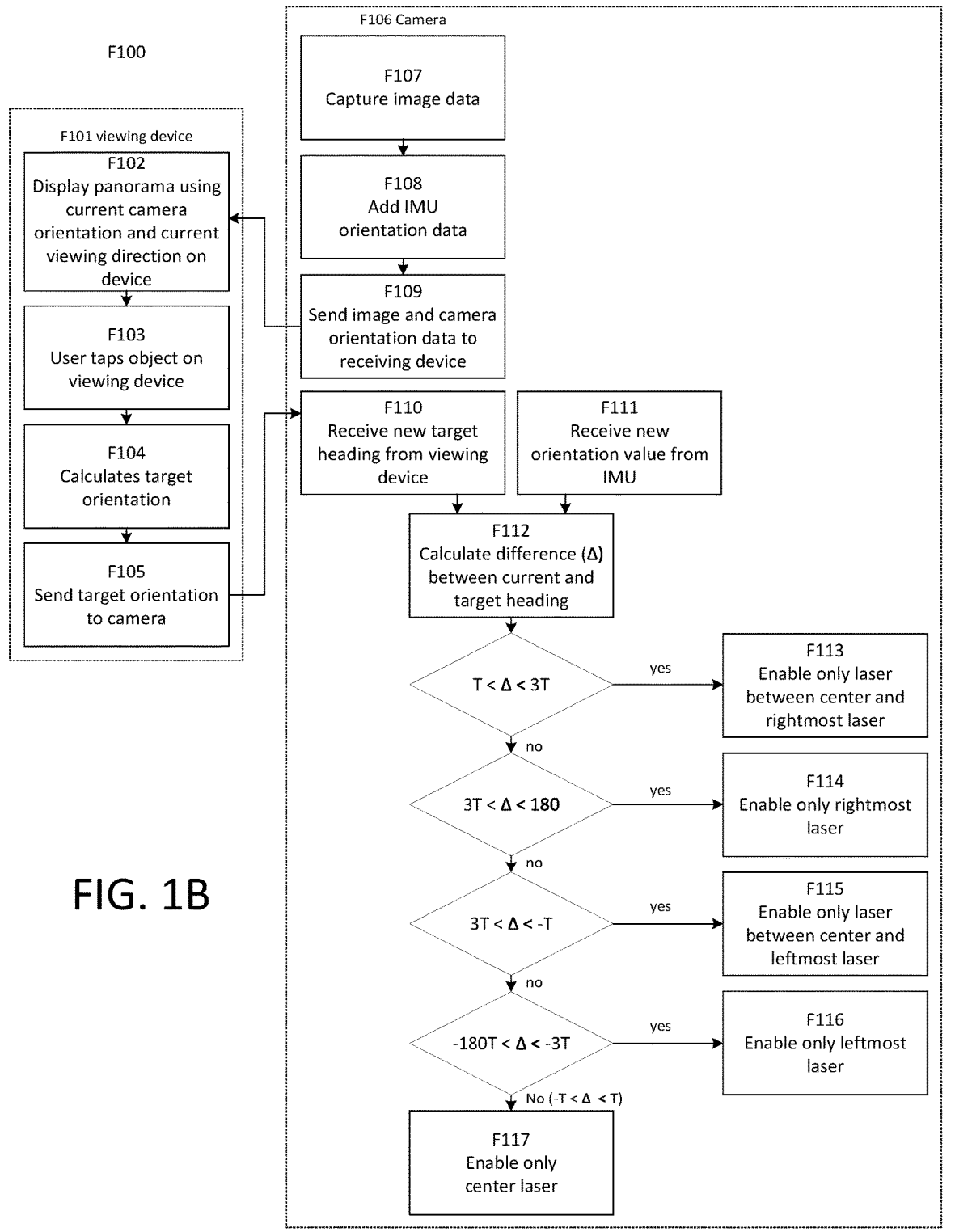
FIG. 1B shows a laser orientation method used with an omnidirectional personal body camera according to an embodiment of the disclosure.

In some embodiments, the laser orientation may be performed as follows. FIG. 1B shows a laser orientation method F100 used with an omnidirectional personal body camera according to an embodiment of the disclosure. The process may start with the camera F106 capturing image data F107. To this panorama the current camera orientation From IMU) may be added F108. Both may be sent F109 to the receiving device F101. The receiving device may display F102 the panorama by taking into account the current camera orientation, and the direction the user has chosen to view.

After the user taps a position on the screen F103 showing part of the panorama on the viewing device, the viewing device may calculate the heading of the indicated position F104 based on the panorama coordinate system and the current on-screen viewing direction. This calculated target heading may be sent F105 to the camera.

When the camera receives a new target heading F110 from the viewing device, or if it receives a new orientation value from the IMU F111, the difference between the current and target heading may be determined F112. Depending on the difference, a different laser can be enabled. If the value is larger than −T and smaller than T, the center laser may be enabled F117. The value T is a variable and may be defined as half of the angle between the lasers. An example angle between the lasers may be 20 degrees, giving a T value of 10 degrees. If the difference is between T and 3T the laser between the center and rightmost laser may be enabled F113. If the difference is between 3T and 180, the rightmost laser may be enabled F114. If the difference is between −T and −3T the laser between the center and leftmost laser may be enabled F115. If the difference is between −3T and −180, the leftmost laser may be enabled F116.

The omnidirectional video can be broadcast in real-time via the communications module over radio, 802.11 WiFi, cellular 4G/5G etc.), or different radio technology. This may allow a measure of added safety for a user because a remote viewer can quite literally "watch their back" in near-real-time by moving the orientation of the video on their screen or turning their head in a virtual reality environment. The video may also be stored locally on a removable SD card for later storage or cloud upload via WiFi. For evidence purposes, a single-write storage medium such as a Write Once Read Many (WORM) SD card can be used which may ensure that data cannot be altered after the initial recording.

FIG. 1A shows an example embodiment wherein the omnidirectional personal body camera is shoulder and chest mounted, but other physical configurations for the personal body camera may be possible and may, in some embodiments, function similarly.

Figure 2:
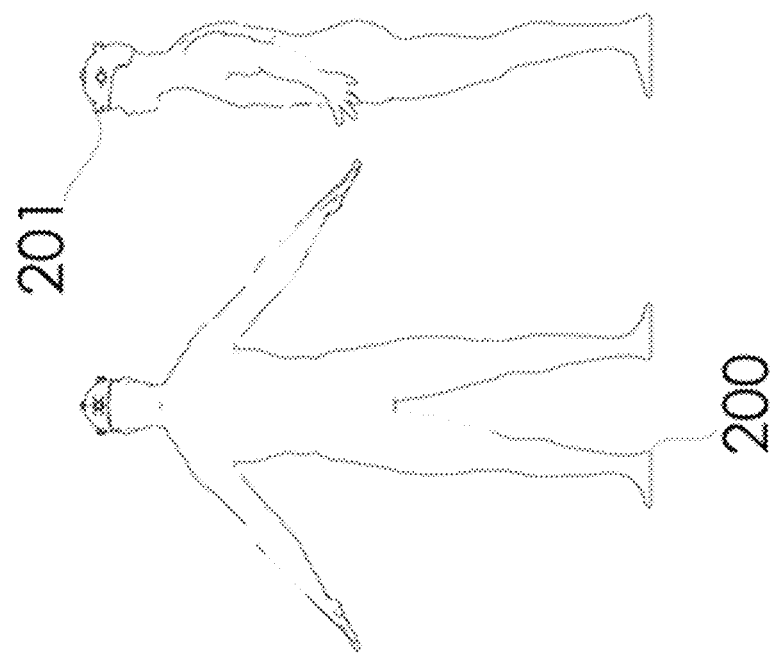
FIG. 2 shows a helmet-mounted omnidirectional personal body camera according to an embodiment of the disclosure.
Figure 3:
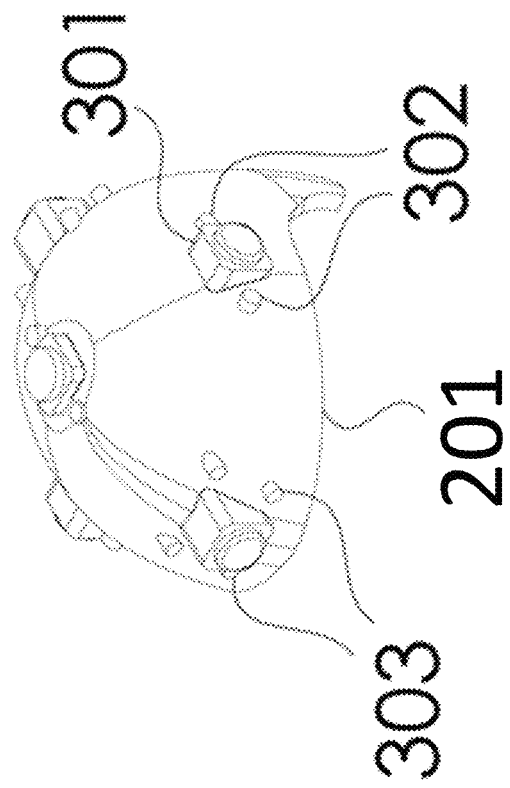
FIG. 3 shows details of a helmet-mounted omnidirectional personal body camera according to an embodiment of the disclosure.

For example, FIGS. 2 and 3 show a helmet-mounted omnidirectional personal body camera according to an embodiment of the disclosure. The user 200 may wear a helmet 201 in which various cameras are integrated. In this example, five cameras 301 are integrated in the helmet 201, although other quantities may be possible. Every camera 301 may have two IR LEDs 302 nearby to provide illumination in low light environment, as described above. The front facing camera 301 may also have bright white LEDs 303 nearby to provide visual illumination to the user and to flash a distracting burst of light when the user is in danger, as described above.

Figure 4:
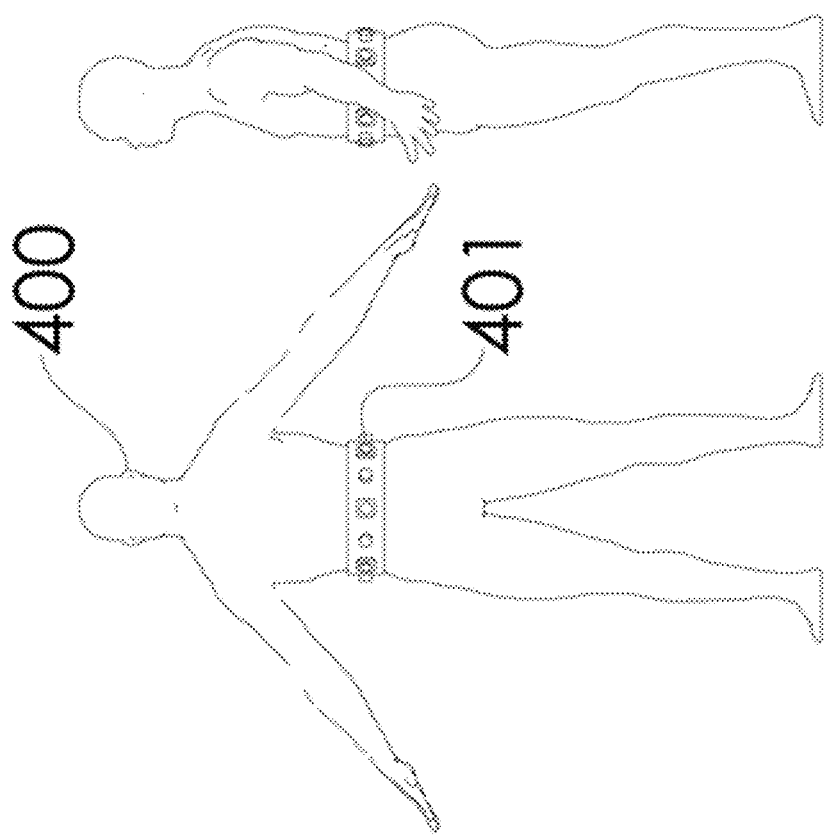
FIG. 4 shows a belt-mounted omnidirectional personal body camera according to an embodiment of the disclosure.
Figure 5:
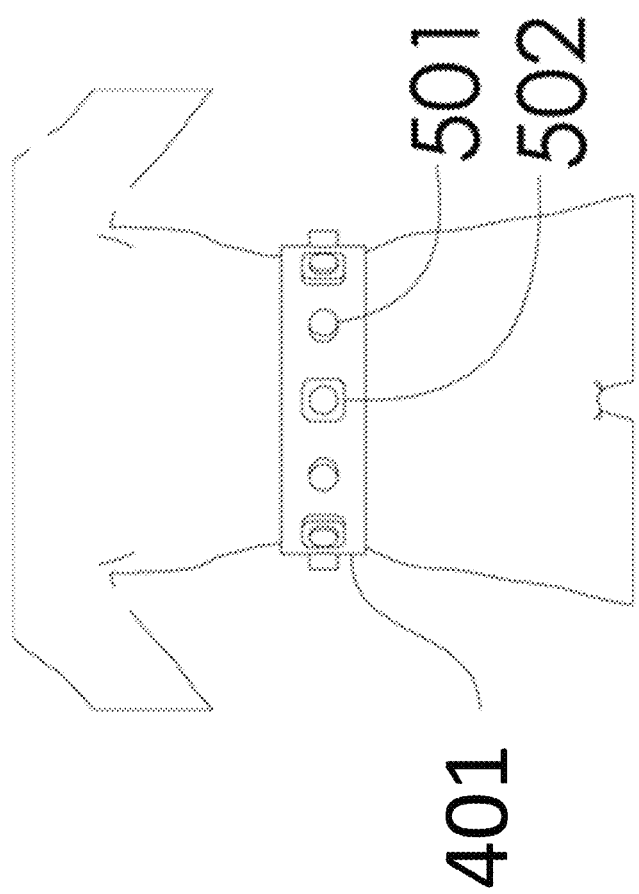
FIG. 5 shows details of a belt-mounted omnidirectional personal body camera according to an embodiment of the disclosure.
Figure 6:
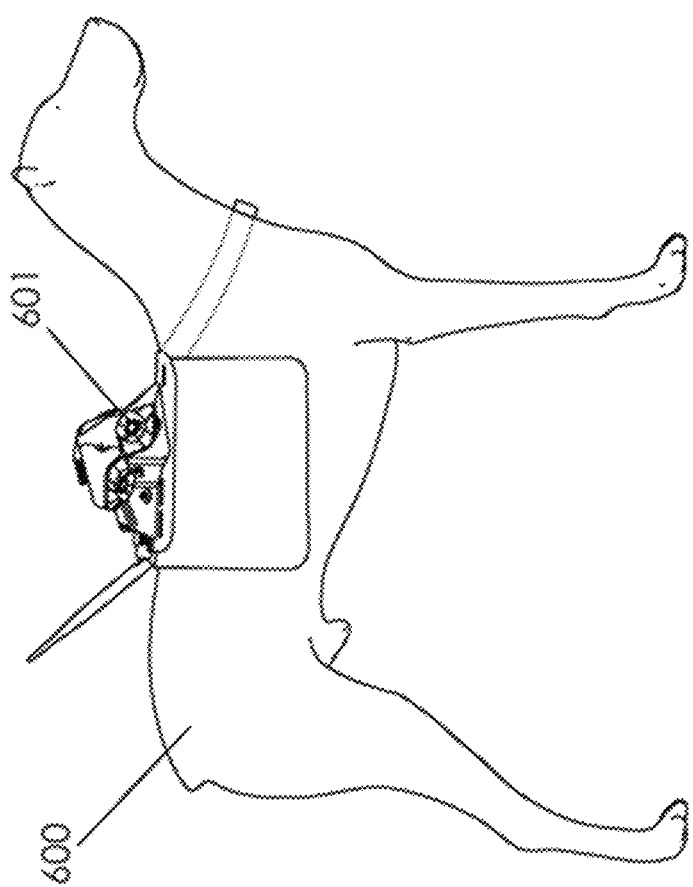
FIG. 6 shows a K9-mounted omnidirectional personal body camera according to an embodiment of the disclosure.

In another example, FIGS. 4 and 5 show a belt-mounted omnidirectional personal body camera according to an embodiment of the disclosure. The user 400 wears a belt 401 in which various cameras may be integrated. In this example, six cameras 502 are integrated in the belt 401, although other quantities may be possible. The belt 401 may also equipped with IR LEDs to provide illumination in low light environment. 501.

In another example, FIGS. 6 and 7A-7C show a K9-mounted omnidirectional personal body camera according to an embodiment of the disclosure. The dog 600 wears a vest to which a camera unit 601 may be attached. The camera unit 601 shape and weight distribution may be optimized for use on dogs. The camera unit 601 may be equipped with a quick attach and release mechanism to minimize interaction time with the dog. In this example, camera unit 601 is equipped with 6 imagers 701 whose orientations may be optimized to obtain a good field of view around the dog (front, sides, and back), although other quantities may be possible. In low light situations IR LEDs 702 may provide illumination. Two way audio may be provided by microphone 703 and speaker 704. By using the speaker 704, commands can be given to the dog, for example.

Figure 7A:
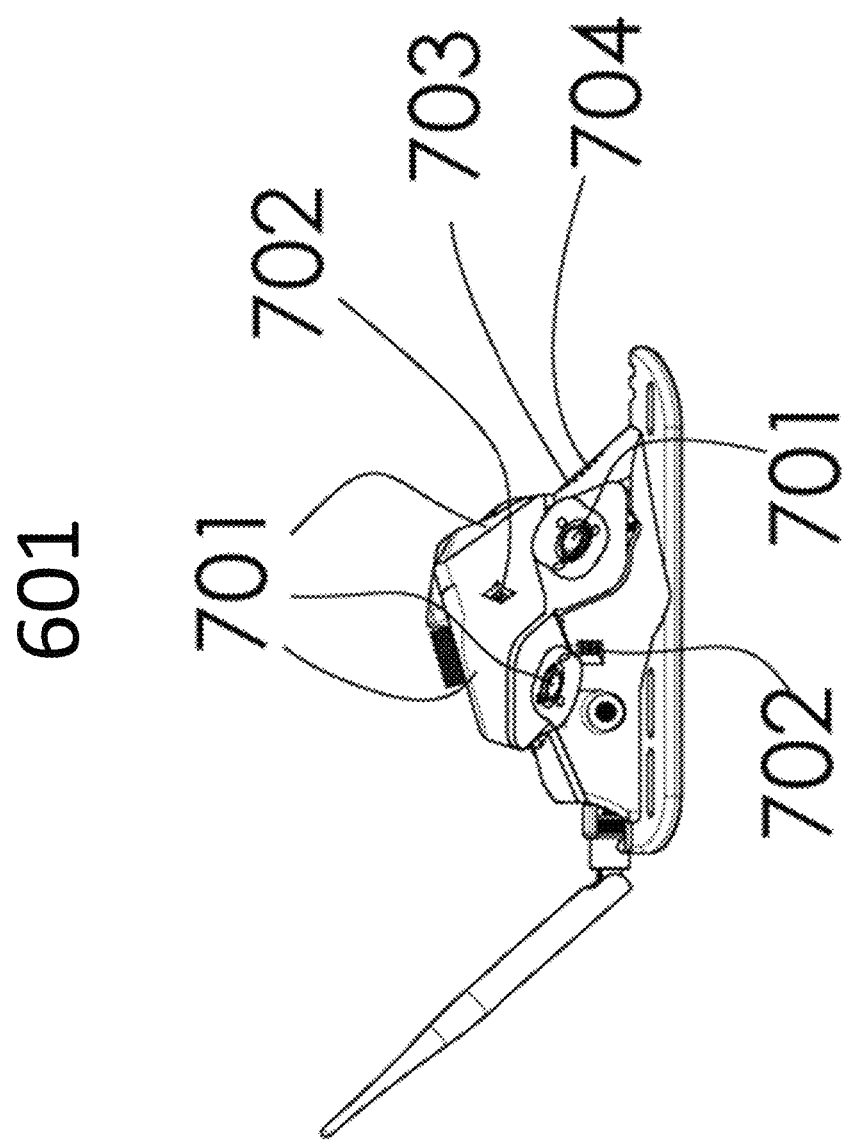
FIG. 7A-7C show details of a K9-mounted omnidirectional personal body camera according to an embodiment of the disclosure.
Figure 7B:
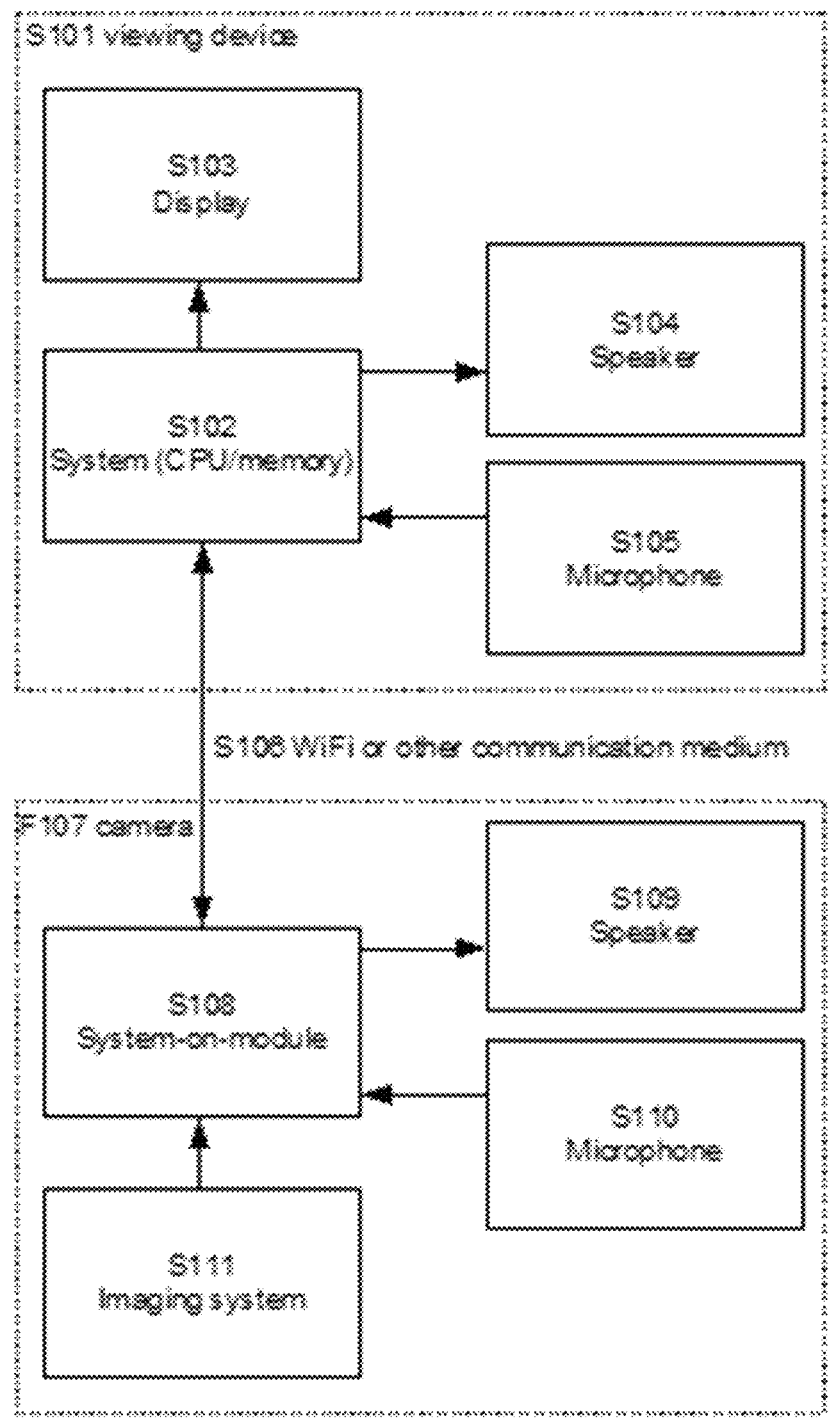
Figure 7C:
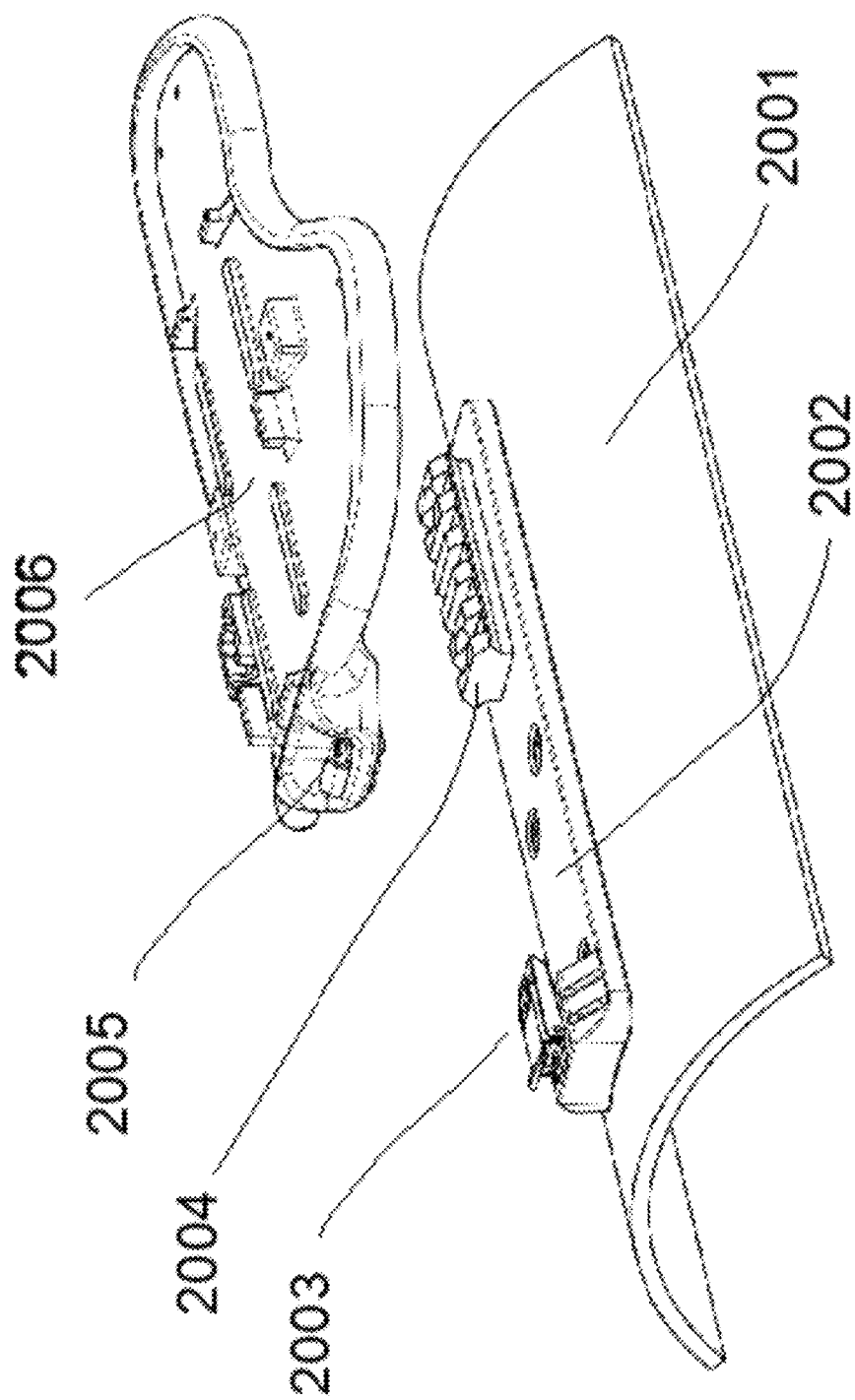

An example quick attach and release mechanism is shown in FIG. 7C. The K9 vest 2001 may be placed on the back of the dog. Part 2002 may be connected to K9 vest 2001. Part 2002 may hold a piece of picatinny rail 2004 (this can also be a different kind of rail) and a clip with lever 2003. The base of the camera 2006 may include a hook 2005 that may be gripped and secured by the clip 2003. To attach the camera, the camera may be placed over the rails 2004, the clip 2003 may be connected to the hook 2005, and the clip may be closed. This may cause the camera to slide forward (left in FIG. 7C), locking it to the rails. To release, the clip 2003 may be released, which may slide the camera backwards (right in FIG. 7C). The camera is now released and can be lifted from the vest.

The system setup using microphone and speaker is shown in FIG. 7B. In addition to the image capturing system S111, a speaker S109 and microphone S110 may be connected to the system-on-module S108 in the camera S107. The communication medium S106 may transfer the video and metadata from the camera to the viewing device S101. Control commands may be sent from the viewing device to the camera, and audio data may be sent in two directions. For the purpose of audio, the microphone S105 on the viewing device may be used to capture audio, which may be encoded by the system S102 to be sent to the camera S107. The other way around, the microphone S110 on the camera S107 may capture audio that may be encoded by the SOM S108 to be sent to the receiving device. Multiple viewing devices may receive the audio sent from the camera at the same time. Multiple viewing devices may capture audio and send it to the camera at the same time where it may be mixed in the SOM S108 and played back through the speaker S109. In some embodiments, on the receiving device, a headset may be used instead of the integrated speaker/microphone to capture and play back audio. In some embodiments, instead of using the microphone on the receiving device, prerecorded audio may be sent to the camera to be played back.

Some embodiments, such as the K9 embodiments, may experience relatively unpredictable movement (e.g., due to the movement of a dog) and may benefit from image stabilization. The IMU may be leveraged to stabilize displayed video as the camera is moving. For every video frame, the IMU may supply a quaternion that defines the orientation of the camera. A quaternion is just one of many ways to represent an orientation, other ways to represent the orientation may also be used. The quaternion may be applied as a transformation step that rotates the projection sphere in the displaying pipeline (e.g. in OpenGL). This may compensate the camera movement between successive frames.

In some cases it may be useful to not compensate all movement to keep looking forward. With the K9 camera, for example, only pitch (forward backward rotation) and roll (clockwise/counterclockwise rotation) may be compensated, and not the yaw (left right rotations). To achieve this, the quaternion may be converted to Euler angles that represent the orientation as a sequence of rotation around predefined axes. By converting the quaternion to an Euler angle representation that ends with the yaw rotation, the yaw may be made 0. By converting the modified Euler angle representation back to a quaternion, it may be used in the displaying pipeline for stabilization as described above (e.g., the pitch and roll movements may be stabilized, but since all yaw movements have been zeroed, they will not be altered).

Laser Designation System for Navigation

Figure 8A:
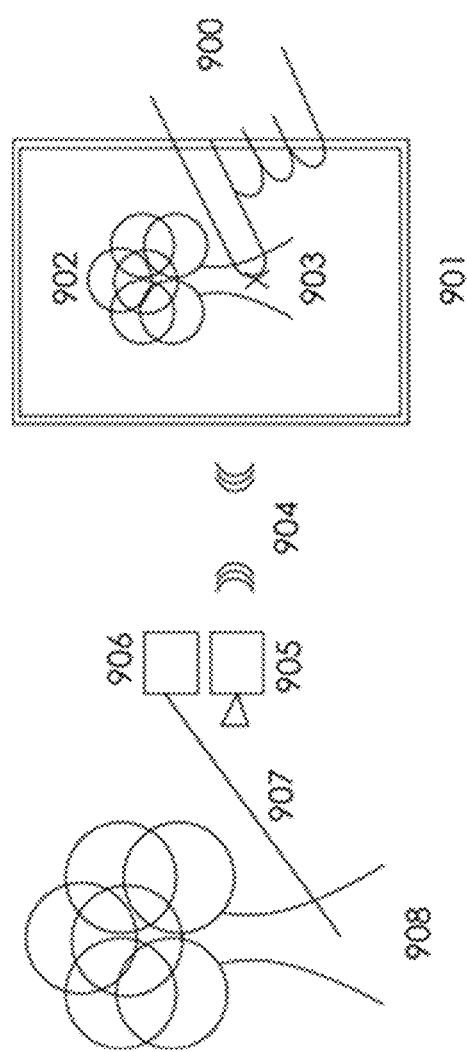
FIG. 8A shows an overview of a laser designation system according to an embodiment of the disclosure.

FIG. 8A shows an overview of a laser designation system according to an embodiment of the disclosure. The laser designation system may be used to point to a direction when guiding a dog, person, robot, etc., remotely, for example. A scene 908 may be captured by a camera 905. The video may be sent over a wireless (or wired) connection 904 to a viewing device 901, where the scene may be shown 902. The operator 900 of the viewing device 901 may select a target position for the light 903. The indicated position may be converted to an appropriate coordinate system and sent to the camera 905 (or a processor thereof or in communication therewith). A light beam system including a light 907 may receive the position and point the light at the actual position in the scene that is equivalent to the indicated position.

Figure 8B:
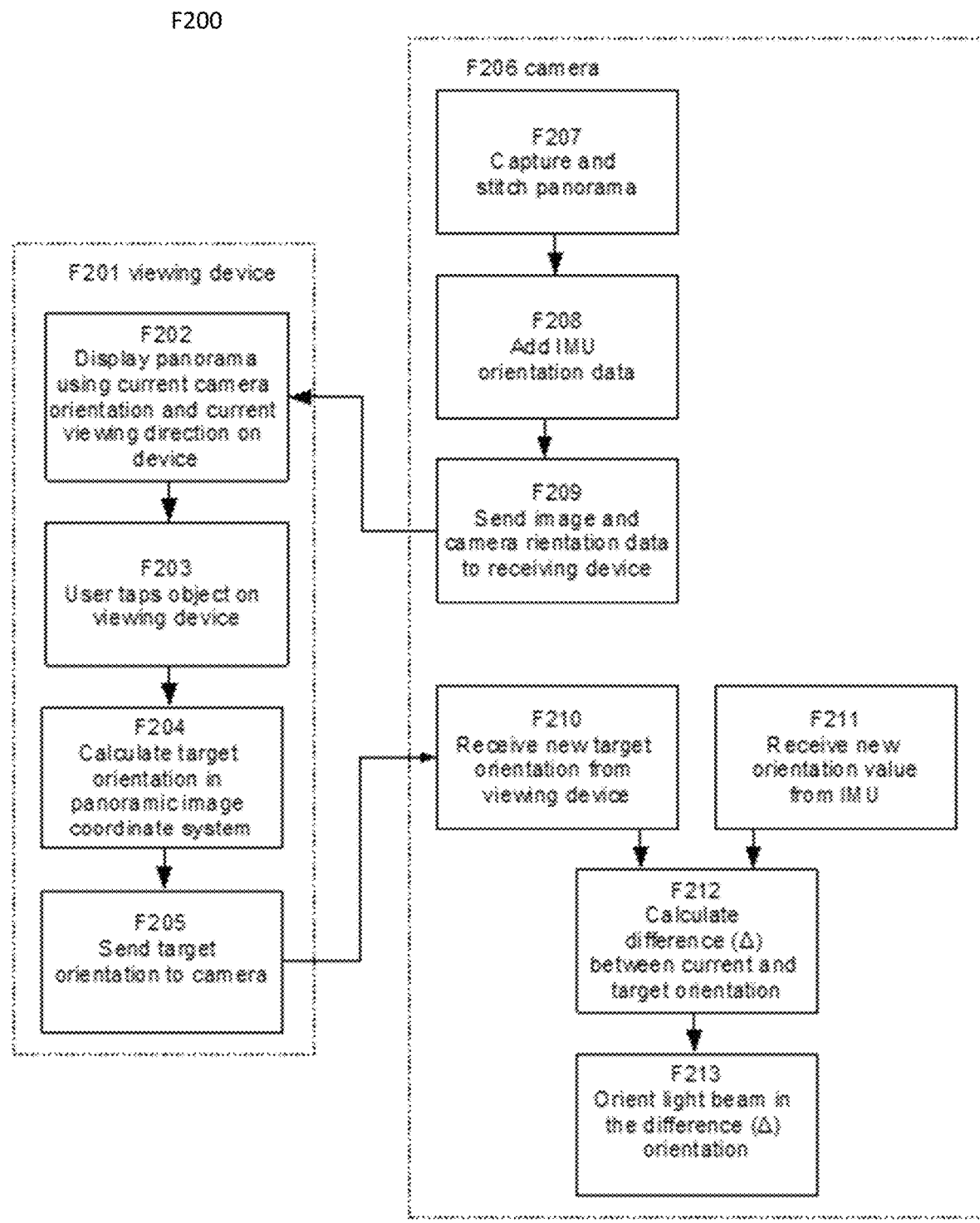
FIGS. 8B and 8C show light beam orientation methods used in laser designation systems according to embodiments of the disclosure.

FIG. 8B shows a light beam orientation method F200 used in laser designation systems according to an embodiment of the disclosure. When the camera 905 or light system 906 changes orientation, this may be taken into account by the different systems to adjust the light beam such that the indicated light orientation is maintained. This may be achieved by integrating an IMU into the camera and/or light system, and relating the coordinate systems.

The process may start with the camera F206 capturing image data F207. To this panorama, the current camera orientation (from IMU) may be added F208. Both may be sent F209 to the receiving device F201. The receiving device may display F202 the panorama by taking into account the current camera orientation and the direction the user has chosen to view.

After the user taps a position on the screen F203, the viewing device may calculate the orientation of the indicated position F204 based on the panorama coordinate system and the current on-screen viewing direction. This calculated target orientation may be sent F205 to the camera F206.

When the camera receives a new target orientation from the viewing device F201, or if it receives a new orientation value from the IMU F211, the difference between the current and target orientation may be determined F212. For example, this processing may be similar to that described above with respect to F100. The light beam system may be instructed to beam at that difference orientation, which may indicate the object the user tapped on the screen.

Figure 8C:
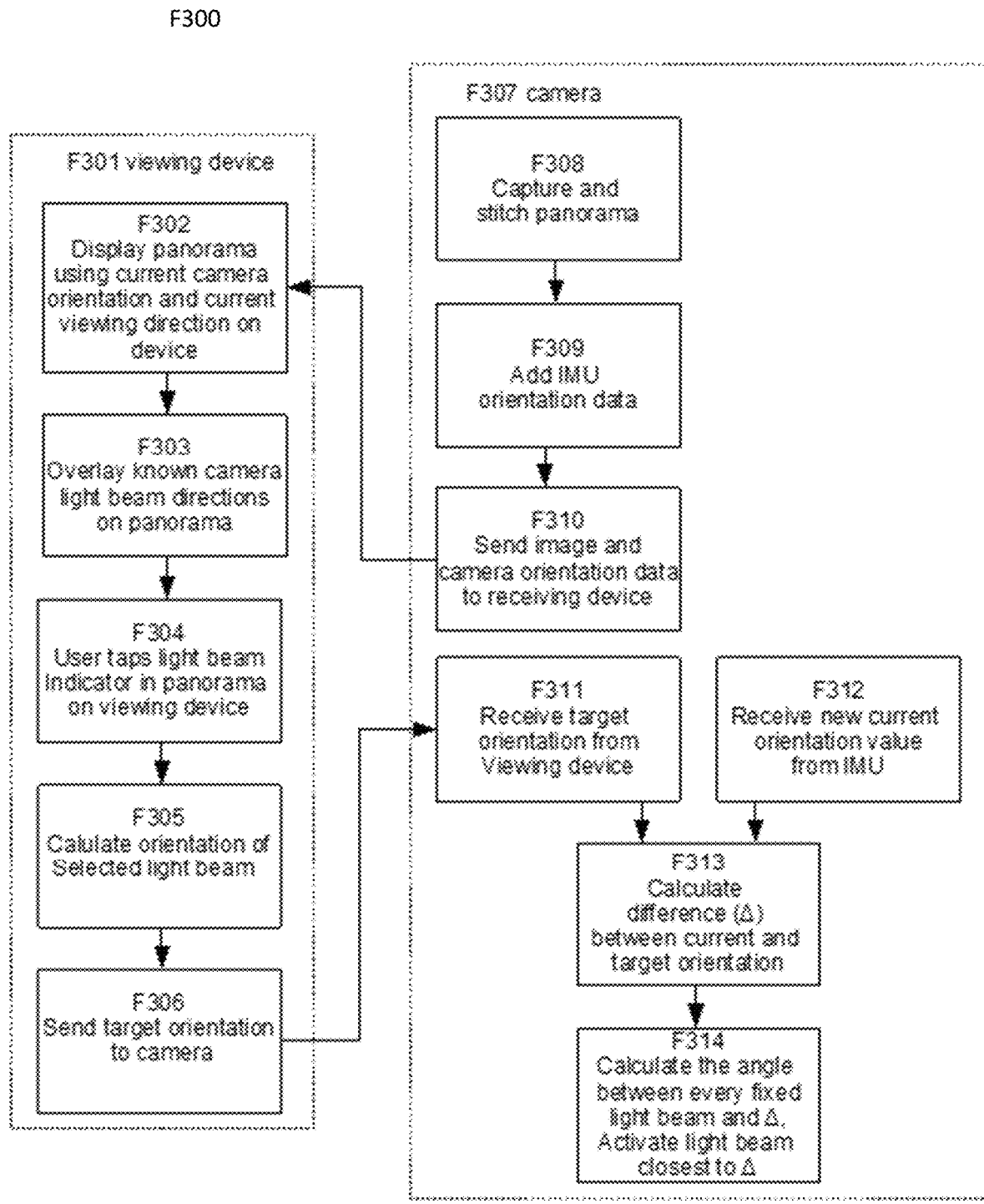

FIG. 8C shows a light beam orientation method F300 used in laser designation systems according to an embodiment of the disclosure. Other embodiments may provide other ways in which the operator can interact with the viewing system to direct the light beams. For example, if the number of light sources/positions is limited, the light directions on the viewing screen may be augmented as an overlay to the scene. The operator can use buttons at fixed locations in the user interface to engage the light. In some embodiments, a combination of this mode and the mode described with respect to FIG. 8A can be used.

The process may start with the camera F307 capturing image data F308. To this panorama, the current camera orientation (from IMU) may be added F309. Both may be sent F310 to the receiving device F301. The receiving device may display F302 the panorama by taking into account the current camera orientation and the direction the user has chosen to view. The viewing device may know the orientations of the fixed light beams in the camera (they may be either sent before to the viewing device or stored in the viewing device). From this information, it may overlay the orientation on the panorama F303. After the user taps an overlaid light beam control on the screen F304, the viewing device may calculate the orientation of the indicated light beam F305. This target orientation may be sent F306 to the camera F307.

When the camera receives a new target orientation from the viewing device F301, or if it receives a new orientation value from the IMU F312, the difference between the current and target orientation may be determined F313. For every fixed light beam in the camera, the angle to the difference (A) may be calculated. The light beam that is has the smallest angle to the A may be activated.

Figure 9:
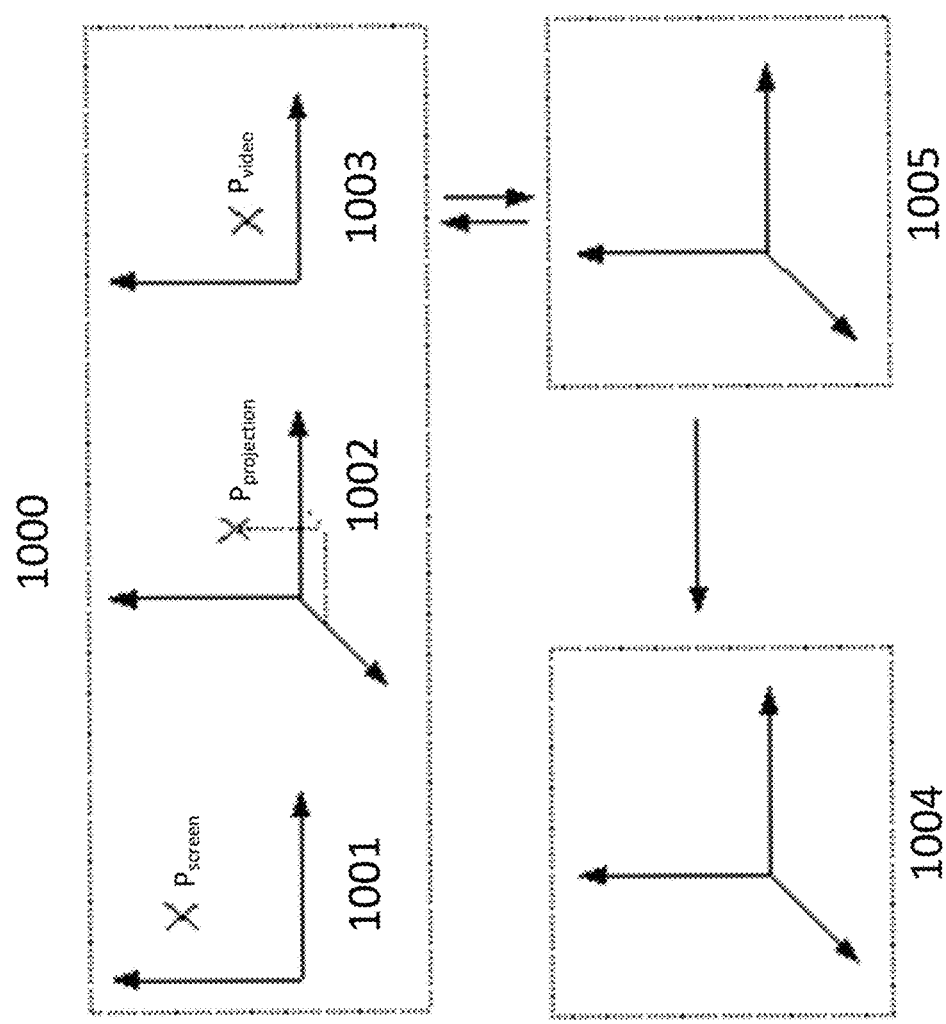
FIG. 9 shows a plurality of coordinate systems in a laser designation system and how they relate to each other according to an embodiment of the disclosure.

FIG. 9 shows a plurality of coordinate systems in a laser designation system and how they relate to each other according to an embodiment of the disclosure. In the illustrated example, the group 1000 represents the viewing device, where 1001 is the screen coordinate system, 1002 the projections coordinate system, and 1003 the (equirectangular) video coordinate system. A user may tap the screen at a certain position ($p_{screen}$) or otherwise designate a position. When multiplied with the inverse of the current projection matrix $M_{proj}$, this may give a coordinate in 3d coordinate in projection space ($p_{projection}$). With the inverse of the equirectangular projection, this coordinate may be related to a 2d position on the video coordinate ($p_{video}$).

This coordinate may be sent to the camera 1005, where the camera can convert it to a position in the camera coordinate system. The camera may take into account its own orientation if it has an IMU in this calculation. This may be forwarded to the light system 904. If the camera and light system form a single physical unit, the relation between camera and light coordinate system may be fixed. If the relation is not fixed, the orientations may be related to each other by an extra system.

There may be different ways in which light can be directed in a certain direction. Also the light is not limited to a beam/ray/point. It may also be, depending on the use case, different sequences, patterns, areas, points or lines, and/or may be animated so that the shape of light varies over time. One example of directing light in a specific direction may be through the use of one or more lasers. For example, multiple lasers at fixed known positions may be switched on and off to pinpoint a direction with a certain amount of accuracy, as described in greater detail below.

Figure 10:
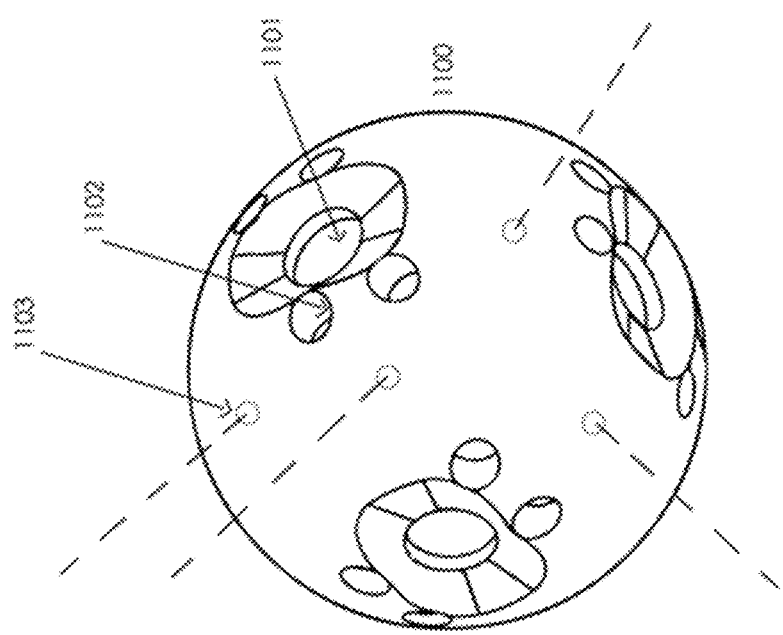
FIG. 10 shows a system wherein a camera and a light system are integrated into one physical unit according to an embodiment of the disclosure.

FIG. 10 shows a system wherein a camera and a light system 906 are integrated into one physical unit 1100 according to an embodiment of the disclosure. The physical unit may be an omnidirectional electronically stabilized camera which may be configured for throwing and/or rolling, for example. The lenses of the different imagers 1101 may be merged into one omnidirectional panorama. The scene may be illuminated using the integrated light sources 1102. The unit 1100 may further include laser sources 1103. The omnidirectional video may be sent to a remote viewing device, where a light direction may be selected by a user. This orientation/position may be sent to the camera system and the right laser 1103 is activated. If unit 1100 is reoriented, another laser 1103 may be automatically activated if the change in orientation is big enough. In this example the pinpointing accuracy will be approximately +/−22.5 deg. as the maximum angle between adjacent lasers is 45 deg. For example, this may be performed according to process F300 described above.

Figure 11:
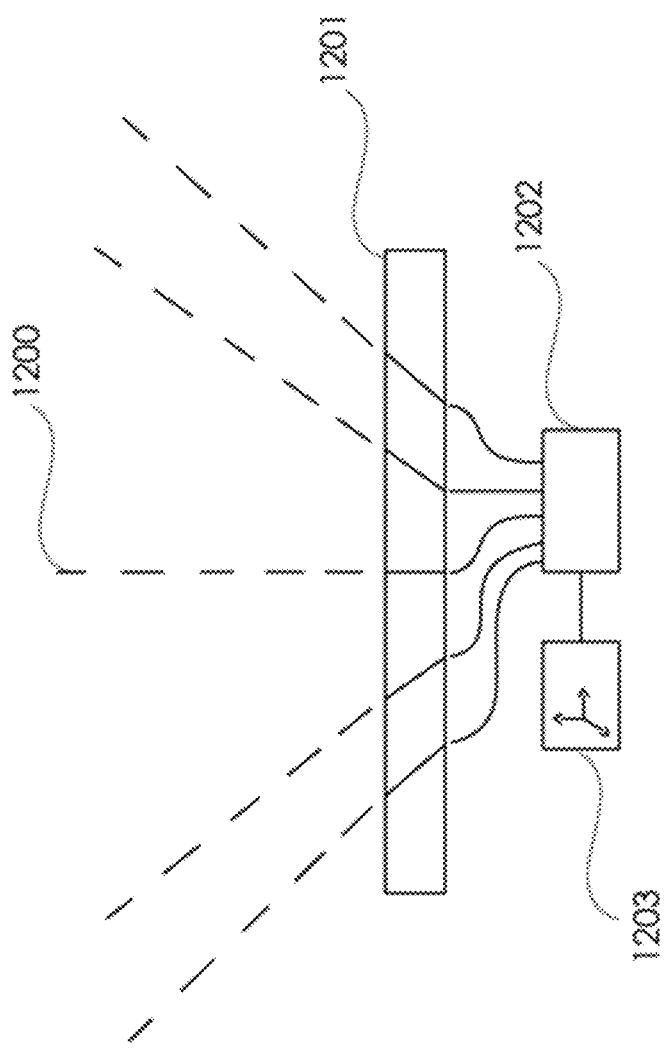
FIG. 11 shows a light system wherein the light system is a separate unit from a camera unit according to an embodiment of the disclosure.

FIGS. 11-13B show light systems wherein the light system 906 is a separate unit from a camera unit and methods of operating such light systems according to various embodiments of the disclosure. In the example of FIG. 11, there are multiple laser sources 1200 in different directions in the same plane 1201. Using this setup, a direction may be indicated, for example, on the horizontal plane. To compensate for changes in orientation after a target heading is set, the processor 1202 activates and deactivates the right lasers based on the given target heading and the current heading. The target heading may be set from a remote viewing device, and the current heading may be obtained using an IMU 1203. For example, this may be performed according to process F100 described above.

Figure 12A:
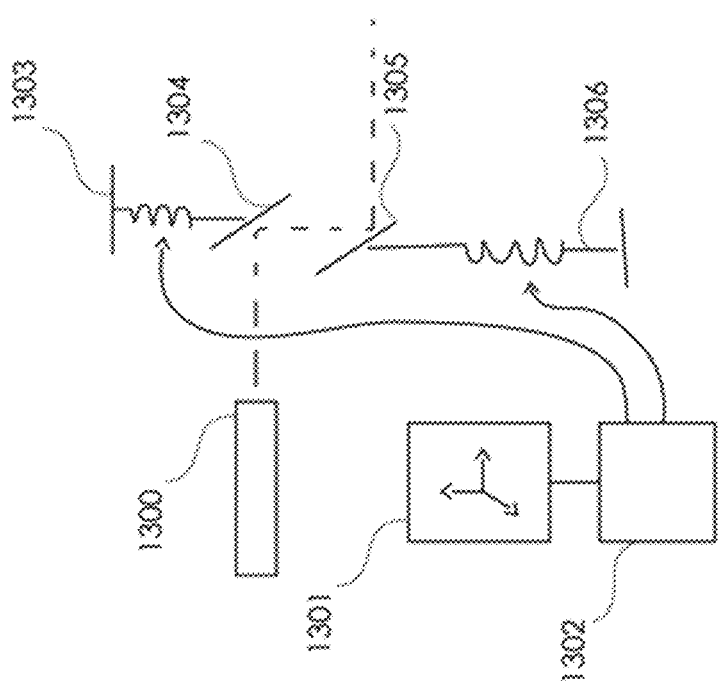
FIG. 12A shows a light system wherein the light system is a separate unit from a camera unit according to an embodiment of the disclosure.

In the example of FIG. 12A, there is one laser source 1300. The laser may be deflected using mirrors 1304, 1305 in two perpendicular directions (X/Y). Using this setup a direction can be indicated in any direction. To compensate for changes in orientation after a target direction is set, the processor 1302 may adjust the mirrors using actuators 1303, 1306 based on the given target direction and the current orientation. The target direction may be set from a remote viewing device, and the current orientation may be obtained using an IMU 1301.

Figure 12B:
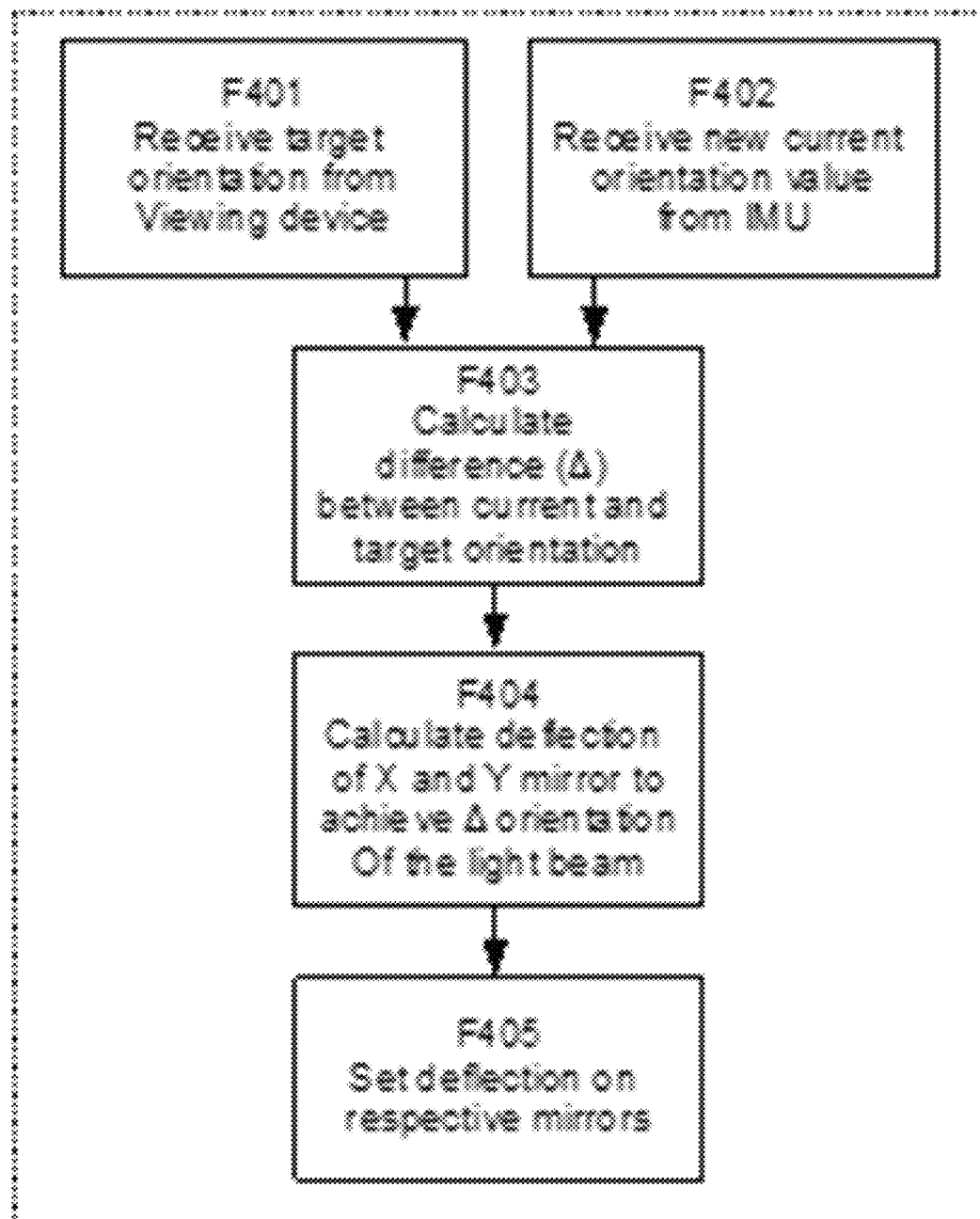
FIG. 12B shows a light orientation method used with a light system wherein the light system is a separate unit from a camera unit according to an embodiment of the disclosure.

FIG. 12B shows a light orientation method F400 used with a light system wherein the light system is a separate unit from a camera unit (e.g., the example of FIG. 12A) according to an embodiment of the disclosure. The light system that uses mirrors to aim the light at a certain direction may take as input the target light orientation F401, which it may receive from another system, and its own current orientation F402. Based on these two orientations, the difference may be calculated F403. From this difference, the deflections of the individual mirrors in X and Y directions may be calculated to achieve the desired light orientation F404. Once both deflections are calculated, they may be sent to the actuators on the mirrors F405.

Figure 13A:
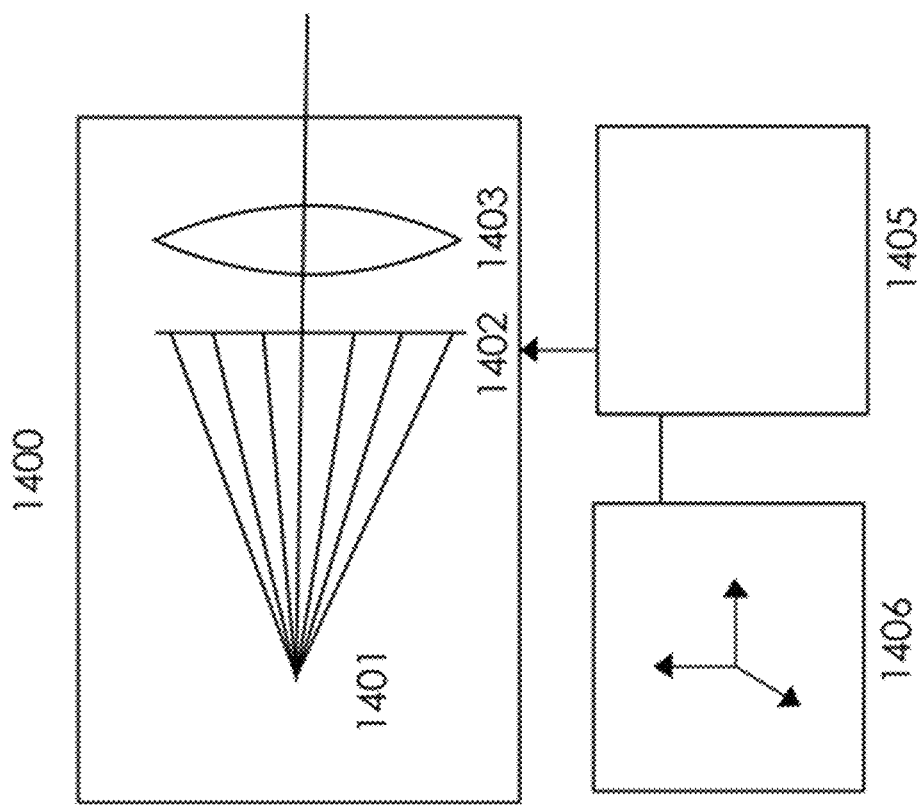
FIG. 13A shows a light system wherein the light system is a separate unit from a camera unit according to an embodiment of the disclosure.

Instead of using lasers, it may be possible to pinpoint objects using one or more projectors. A projector may cover a big area, and by activating the right parts of its "screen," it may be possible to target an object or direction. It also may be possible to target an area, or lines, or make animations towards the object. It also may be possible to use multiple projects in one system. In the example of FIG. 13A, the light beam is made using a projector 1400. The light source 1401 may be made visible on certain parts using a mask/LCD screen 1402 and lens 1403. Using this setup, a direction can be indicated in any direction. The processor 1405 may generate a video signal 1404 that may be sent to the projector. To compensate for changes in orientation after target direction is set, the processor 1405 may adjust the video signal based on the given target direction and the current orientation. The target direction may be set from a remote viewing device, and the current orientation may be obtained using an IMU 1406.

Figure 13B:
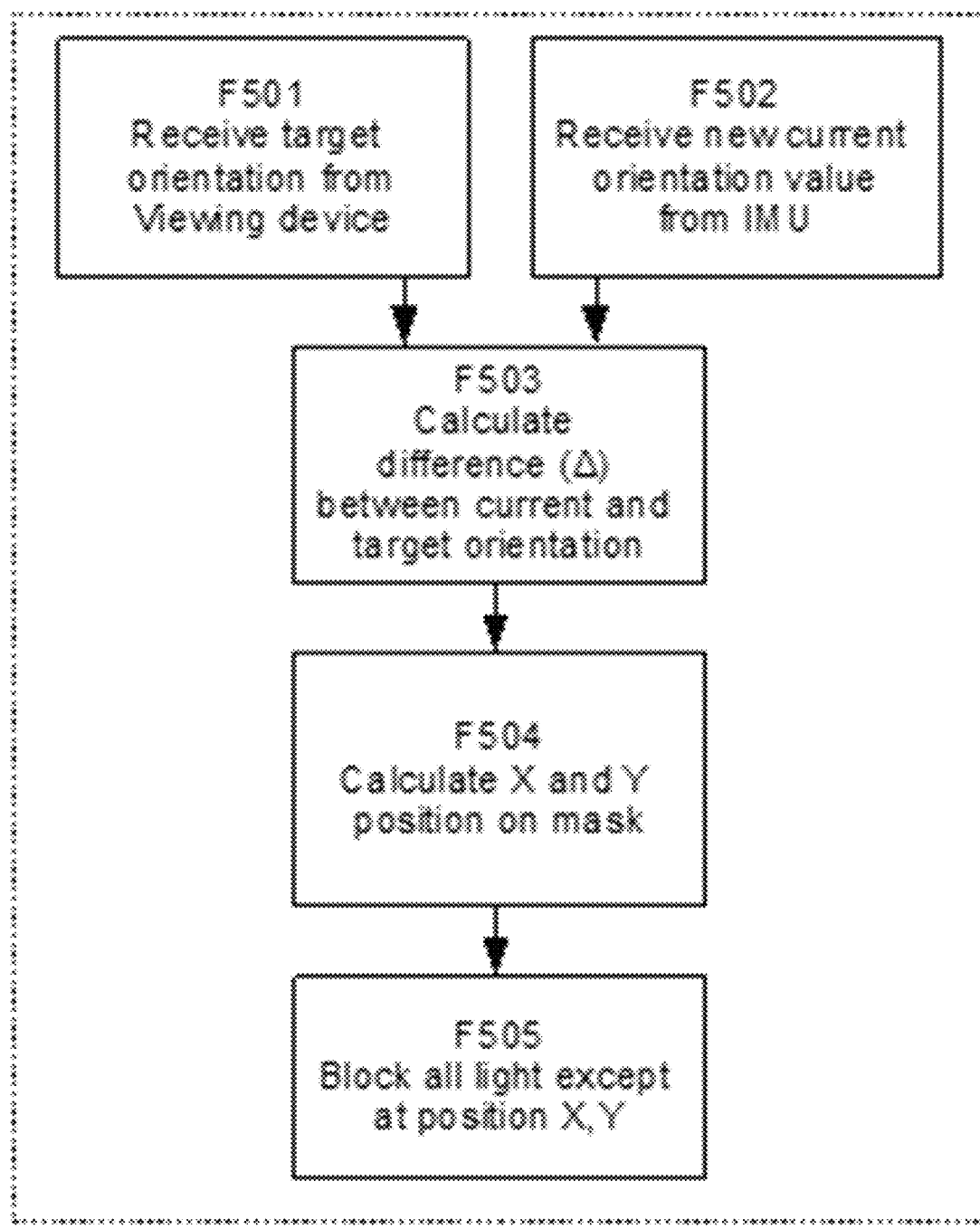
FIG. 13B shows a light orientation method used with a light system wherein the light system is a separate unit from a camera unit according to an embodiment of the disclosure.

FIG. 13B shows a light orientation method F500 used with a light system wherein the light system is a separate unit from a camera unit (e.g., the example of FIG. 13A) according to an embodiment of the disclosure. The light system that uses a projector to aim the light at a certain direction may take as input the target light orientation F501, which it may receive from another system, and its own current orientation F502. Based on these two orientations, the difference may be calculated F503. From this difference, a position in the mask in X and Y directions that does not block light may be calculated F504 to achieve the desired light beam orientation. Once both positions are calculated, they may be set to the mask F505.

FIGS. 14A-16 show K9-mounted omnidirectional personal body cameras and methods of operating such omnidirectional personal body cameras according to various embodiments of the disclosure.

Figure 14A:
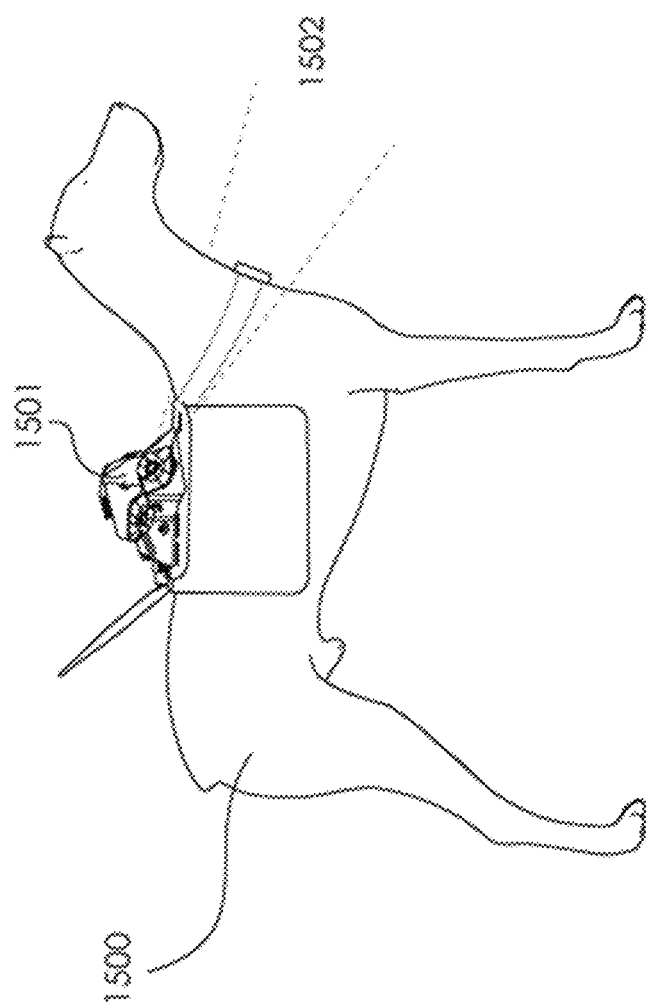
FIG. 14A shows a K9-mounted omnidirectional personal body camera according to an embodiment of the disclosure.

For example, FIG. 14A shows a dedicated k9 camera 1501 mounted on a dog 1500 with vest. In this case the k9 camera is equipped with two lasers 1502 to indicate a direction to the dog. The laser may be activated manually by the user that operates the viewing device, or automatically by the camera itself if the user set an automatic-orientation. In case of automatic operation, an IMU may be used to track direction.

Figure 14B:
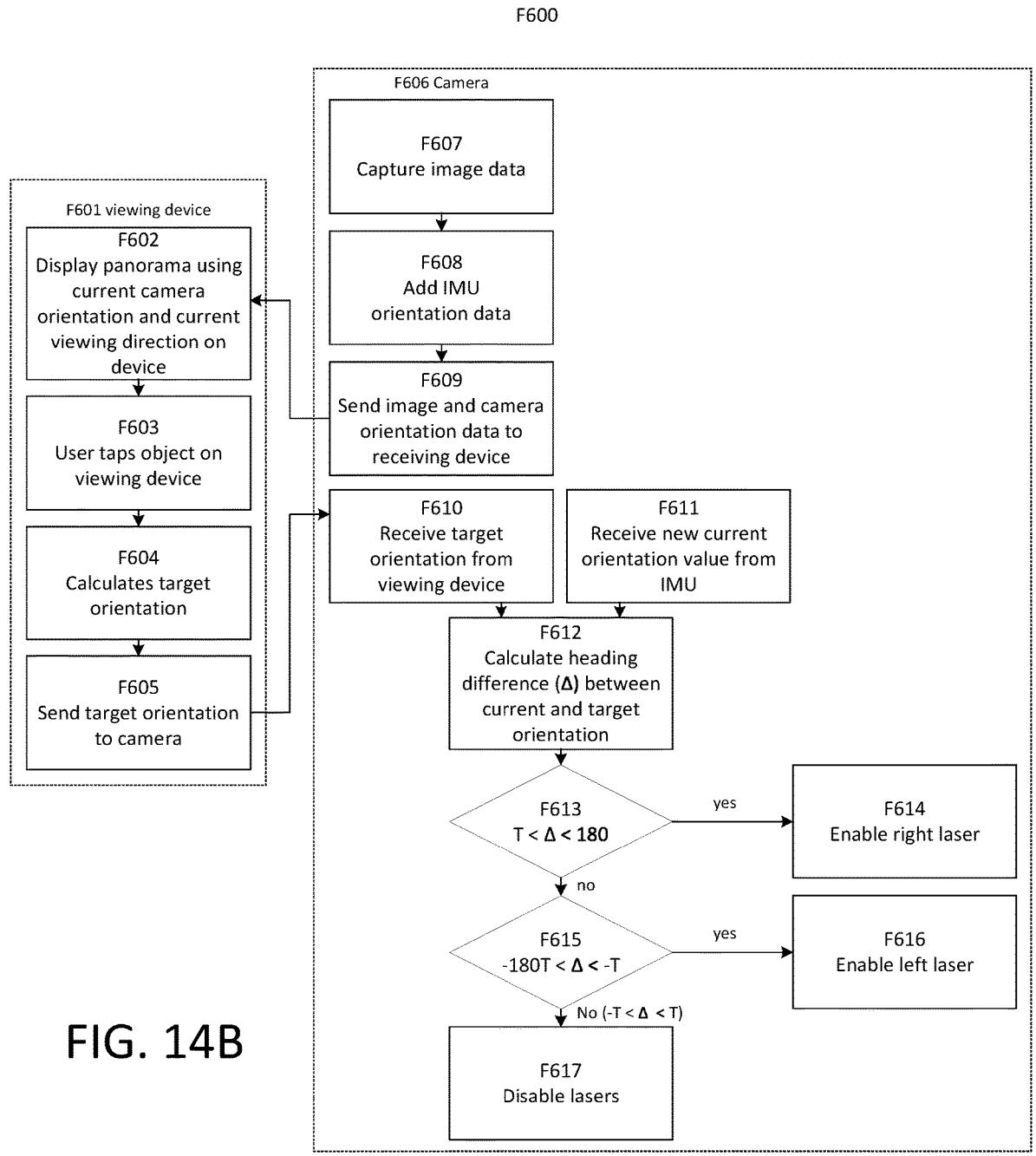
FIGS. 14B and 14C show light beam orientation methods used in K9-mounted omnidirectional personal body camera systems according to embodiments of the disclosure.
Figure 14C:
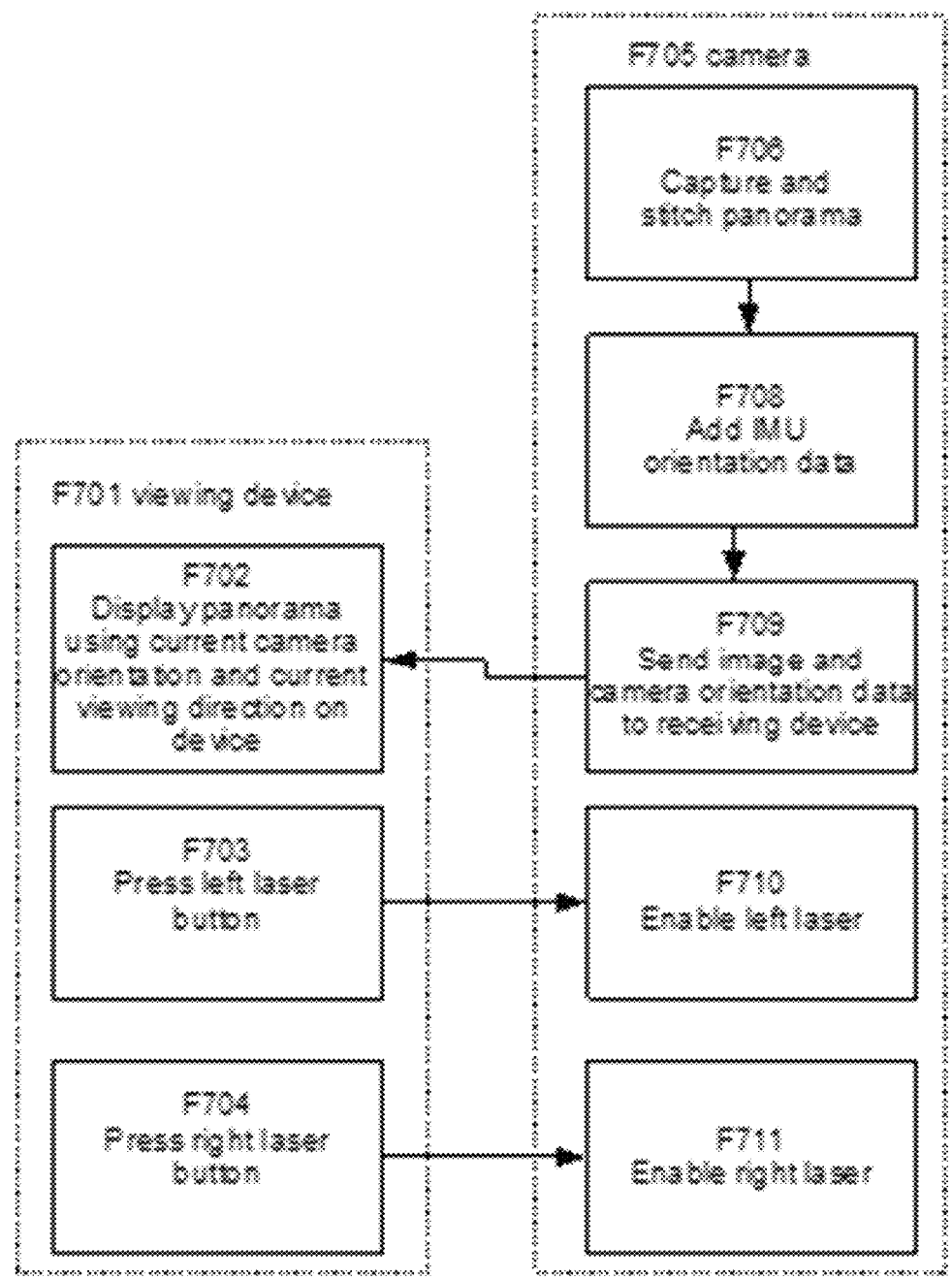

FIGS. 14B and 14C show light beam orientation methods used in K9-mounted omnidirectional personal body camera systems according to embodiments of the disclosure. For example, these systems may be controlled by automatic methods F600 and/or manual methods F700.

The automatic process F600 may start with the camera F606 capturing data F607. To the captured panorama the current camera orientation (from IMU) may be added F608. Both may be sent F609 to the receiving device F601. The receiving device may display F602 the panorama by taking into account the current camera orientation and the direction the user has chosen to view. When the user taps a position on the panorama F603, the viewing device may calculate target orientation F604. This target orientation may be sent F605 to the camera F606.

When the camera receives a new target orientation from the viewing device F601, or if it receives a new orientation value from the IMU F611, the difference between the current and target heading may be determined F612. Depending on the difference, a different laser may be enabled. If the value is larger than −T and smaller than T, the lasers may be turned off. The value T is a variable and may be defined as half of the angle between the lasers. An example angle between the lasers may be 20 degrees, giving a T value of 10 degrees. If the difference is between T and 180, the right laser may be enabled F614. If the difference is between −T and −180, the left laser may be enabled F616.

It may also be possible to control the lasers manually, as shown by process F700. The camera F705 may capture data F706. To the captured panorama the current camera orientation (from IMU) may be added F708. Both may be sent F709 to the receiving device F701. The receiving device may display F702 the panorama by taking into account the current camera orientation and the direction the user has chosen to view. The device may be equipped with some interface for activating lasers (e.g., a left laser button and a right laser button) When the left laser button is pressed F703 on the viewing device, the left laser may be activated F710 on the camera. When the right laser button is pressed F704 on the viewing device, the left laser may be activated F711 on the camera. The lasers can be deactivated by releasing the button, or it may be configured so that a press on the button activates the laser for a certain amount of time. When one laser is enabled, the other one may be disabled.

Figure 15:
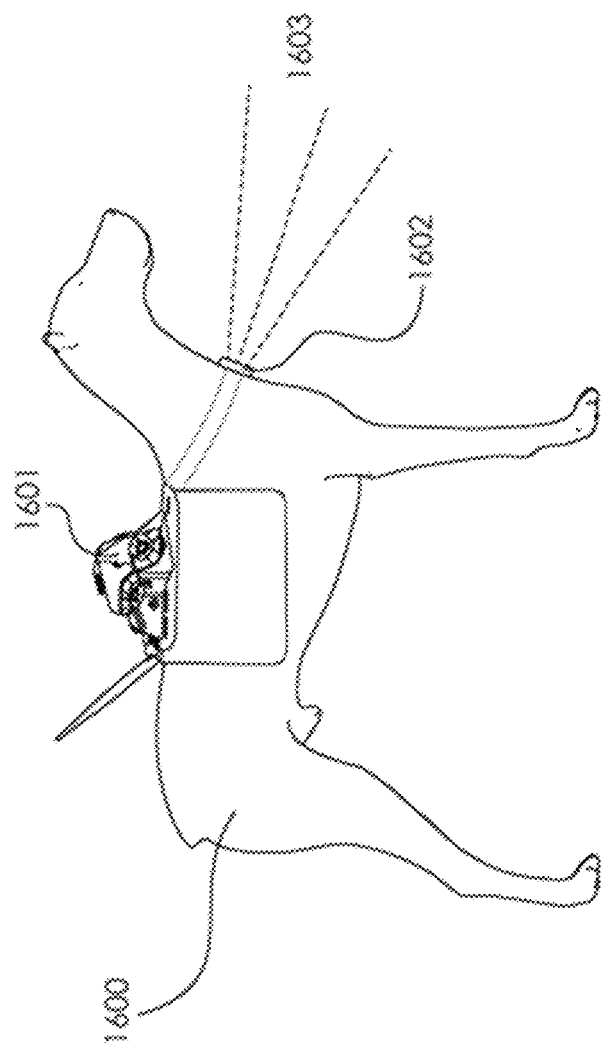
FIG. 15 shows a K9-mounted omnidirectional personal body camera according to an embodiment of the disclosure.

FIG. 15 shows an example with a dedicated k9 camera 1601 mounted on a dog 1600 with vest. In this case the camera is equipped with an extra pointing unit 1602 on the front of the dog. Multiple lasers 1603 may be used to indicate a direction to the dog (including forward). The lasers may be activated manually by the user that operates the viewing device, or automatically by the camera itself if the user set an automatic-orientation (e.g., using process F600). In case of automatic operation, an IMU may be used to track direction and turn on and off lasers (e.g., using process F700).

Figure 16:
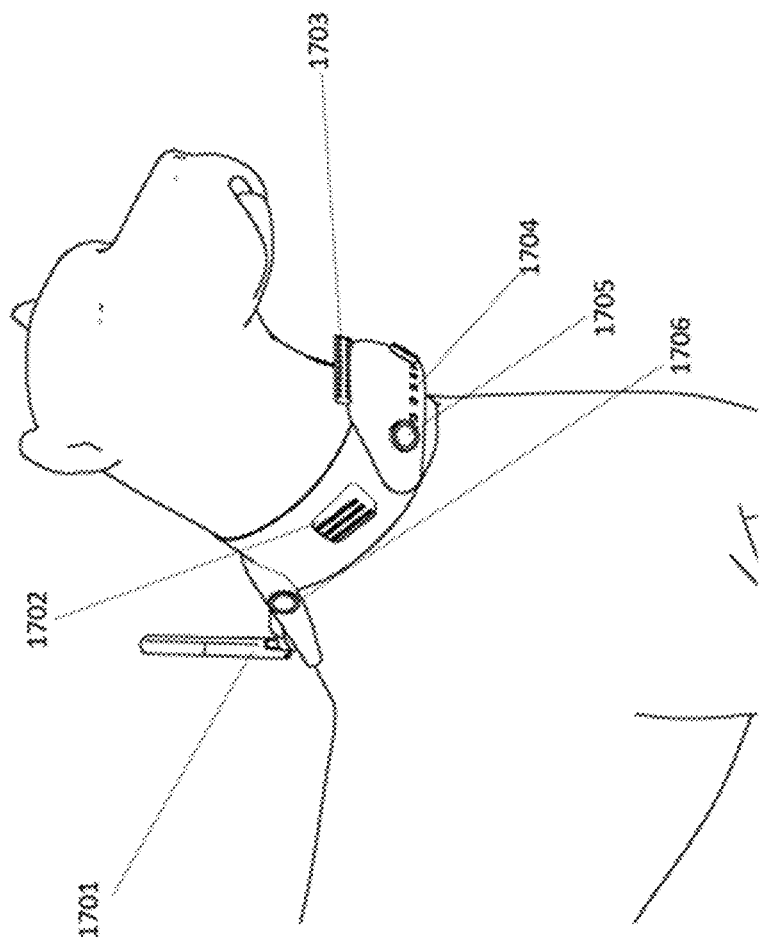
FIG. 16 shows an around-the-collar camera for K9 with an integrated illumination light and remote guidance system according to an embodiment of the disclosure.

In another embodiment, shown in FIG. 16, the cameras may be placed in a rigid collar structure about the neck of the dog. Two cameras in front 1705 and four cameras on the back 1706 may allow the stitched panorama to have the dog's eye view as the center point perspective and avoid the issue of video being blocked by head, neck, and ears. A speaker/microphone module (e.g., similar to that described above with respect to S100 near the ear of the dog 1702 may allow for the user to send live and pre-recorded voice commands and to hear sounds from where the dog is operating. An antenna 1701 can be a whip, dome, flexible, or other form factor but in any design may offer enhanced (e.g., increased range) signal range for WiFi, radio, and/or cellular communications.

In some embodiments, a high powered laser light bar 1703 may provide illumination for the dog as it searches a space and can be activated manually with a button or remotely via the viewing application. One example of directing light in a specific direction may be through the use of one or more lasers. For example, multiple lasers at fixed known positions 1704 may be switched on and off to pinpoint a direction with a certain amount of accuracy. To turn the dog left, the left-most laser is activated, then the second left-most, then the middle as the dog turns towards the target direction. If the dog overshoots, then the rightmost lasers may be used to correct. All this may be oriented based on the known coordinate systems of the IMU, cameras, and video, correlated with each other. These features may be provided using processing as described above with respect to processes F100 and/or F300 in various embodiments, for example.

Robot/Drone Navigation

Figure 17:
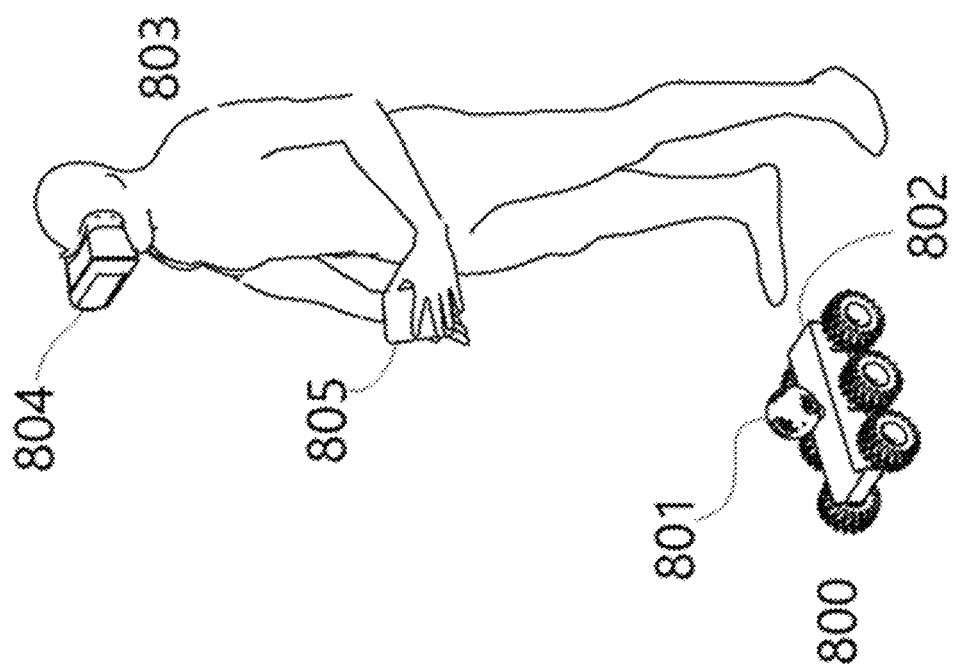
FIG. 17 shows a robot platform navigated using a panoramic coordinate system according to an embodiment of the disclosure.

FIG. 17 shows a robot platform 800 that may be navigated using a panoramic coordinate system according to an embodiment of the disclosure. Using the known coordinate system of the stabilized panoramic video created with the methods of U.S. Pat. No. 10,091,418 and as described below, robot/drone/vehicle navigation may be achieved using the same basic methods as with the light/laser designator above. One example embodiment is the robot platform 800, which may use panoramic video for navigation.

The robot platform 800 may include a movable platform 802 equipped with a panoramic camera 801. The panoramic camera may capture all the surroundings and audio which it can stream to a receiver. The platform may be a ground, water or air based platform and may be used for many purposes, including virtual presence, remote surveillance, remote inspection, etc. The motion platform is not constrained to small custom platforms, but it can also be, for example an existing car, truck, crane, vessel, helicopter, etc.

While streaming the panoramic video from the platform to a user 803, the user can have an immersive experience in VR where he can orient himself by just looking around. This can be done either by wearing a VR headset 804, or being inside a panoramic chamber where the panoramic video is projected on the walls, or a regular projection of the panorama on a monitor. Quick head turns feel normal as there is no delay as the complete panoramic video is already available. This eliminates the step of for example controlling a remote camera pan operated by an actuator, as that would otherwise introduce noticeable latency in the video.

To control the robot, the user can press a button on a hand held remote control 805. The most basic operation, is that there is only one button. When the user pressing the button, robot platform 800 may orient itself (if applicable, with for example wheeled robots) in the current viewing direction and start moving towards that. If the user reorients, the robot may change direction accordingly. The robot platform 800 may follow the movement of the user. When the button is released the movement may stop. An example control process F800 is described in detail below. Control of the platform and camera may be either wired or wireless. The audio and video may be recorded on the platform, or on a remote location when streaming. The power supply may be either from battery source or remote wired source.

Figure 18:
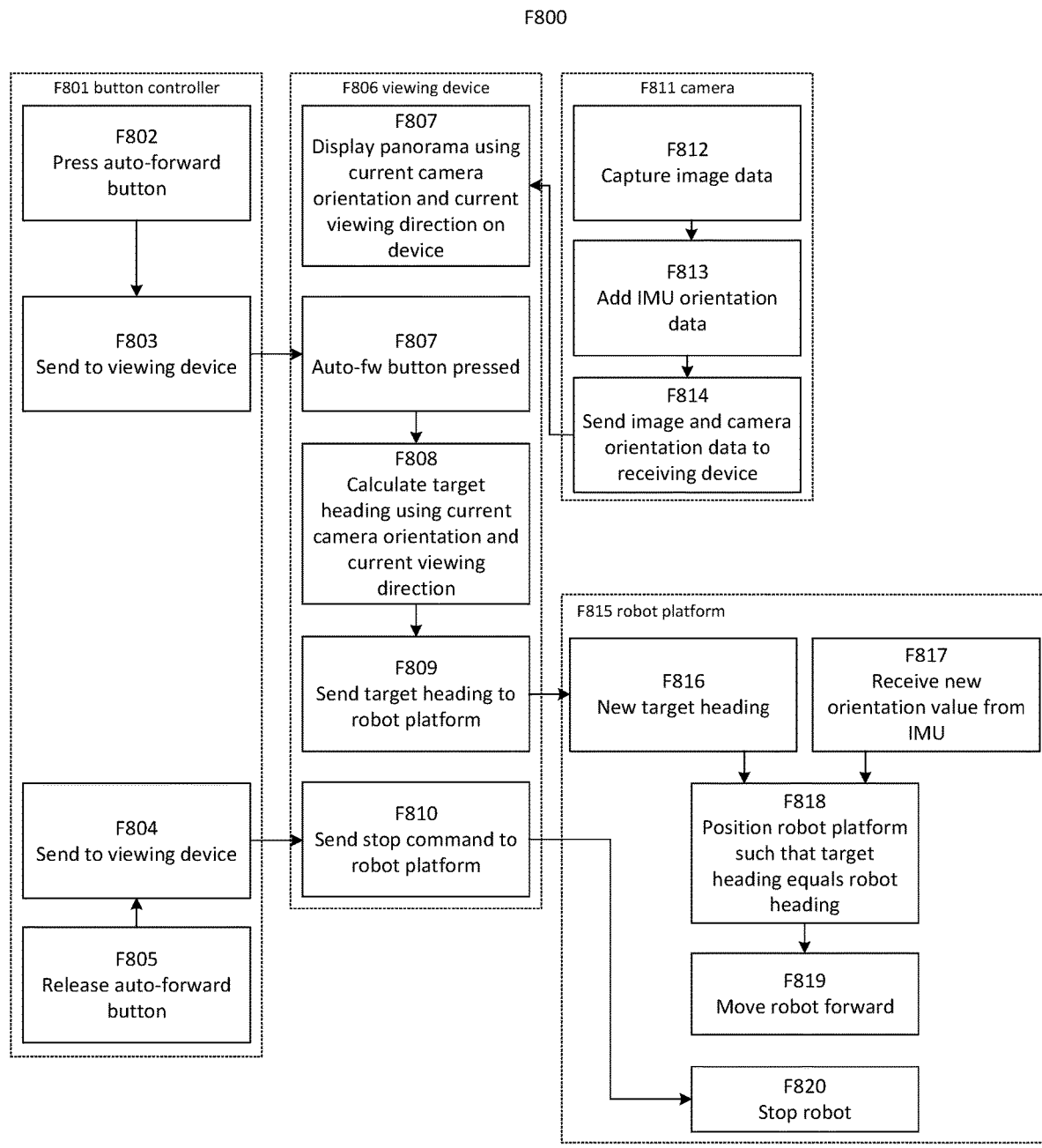
FIG. 18 shows a method for operating a robot platform according to an embodiment of the disclosure.

FIG. 18 shows a method F800 for operating a robot platform according to an embodiment of the disclosure. The process F800 may start with the camera F811 capturing image data F607. To this image data, the current camera orientation (from IMU) may be added F813. Both may be sent F814 to the receiving device F806. The receiving device may display F807 the panorama by taking into account the current camera orientation and the direction the user has chosen to view.

When the user orients himself by looking around, and has decided which way to go, the auto-forward button may be pressed F802. This may be a button on a separate remote controller connected to the viewing device F801 or may be integrated in the viewing device. The press of the auto-forward button F807 may trigger the calculation F808 of the target heading in the viewing device. This may be calculated based on the current viewing direction and the camera orientation information.

The target direction may be sent F809 to the robot platform which may start moving F818 towards the target heading based on the new target heading and the current heading F817. When the target heading is reached, the robot platform may start moving forward F819.

When the auto-forward button is released F805, the stop command may be sent to the robot, which may cause the robot to stop F820.

There are may also be more advanced use cases where the user can also control forward and backward movement, actively initiate turning, control speed, disable follow current orientation etc. Also other features of the platform can be user controlled. For example, the user may control an actuator to raise the camera, or an actuator that deploys a payload to a scene, or control a winch, etc. These direct robot movement control commands may originate from the button controller or from the viewing device. Every button/control may directly relate to a robot action (forward, backward, left, right, raise camera, deploy payload, etc.), and may be forwarded to the robot platform, which may respond by carrying out the commanded action.

The panorama can be overlaid with additional information captured by the system, or coming from remote sources. For example, such information may include, but is not limited to compass direction, current weather (forecast), indication of from where rain will come, locations of other known entities, the orientation of where the viewer is relative to the platform, etc.

For the actual panorama image creation, the same proposed methods as described in the body cam above may be applied (e.g., rigid vs non-rigid vs combination of rigid and non-rigid). In some cases, especially on larger platforms, the rigidity may quickly become non-rigid because of material deflections while the platform is stressed by different external or internal forces.

In case a non-rigid or partial rigid imager setup is used in the camera (e.g., where the relative imager positions and orientations can change beyond a certain threshold), movement may be compensated by having an IMU on every segment. A segment may be defined as a rigid section where one or more imagers are located. By creating a part of the panorama for every section, the resulting panoramas from the different sections may be projected individually on the panorama projection sphere using the IMU information of every segment. To enable this approach to work, a ground truth may be established on how the segment orientations relate to each other. There are several methods on how this can be achieved. For example, the camera may be placed in a fixed starting point, and the user may indicate that this is the default start position. Another example may be to use a known approximate orientation and position and, based on matching salient features in the overlapping sub-panoramas of the segments, the relative positions and orientations between segments may be obtained on a continuous basis (e.g., see FIG. 32). The relative position and orientation between rigid segments may also be obtained by having a special calibration object that is visible in the overlapping sub panoramas. This may be part of the calibration object shown in FIG. 26, for example. This calibration object may be made of just adjacent intersection points (e.g., contrasted with 201600, which has 8 intersection points). When this object is visible at the same time in two sub panoramas, the relative position and orientation (extrinsics) may be obtained in the same way as described in U.S. Pat. No. 10,091,418 (the contents of which are incorporated by reference in its entirety) and herein.

Figure 19:
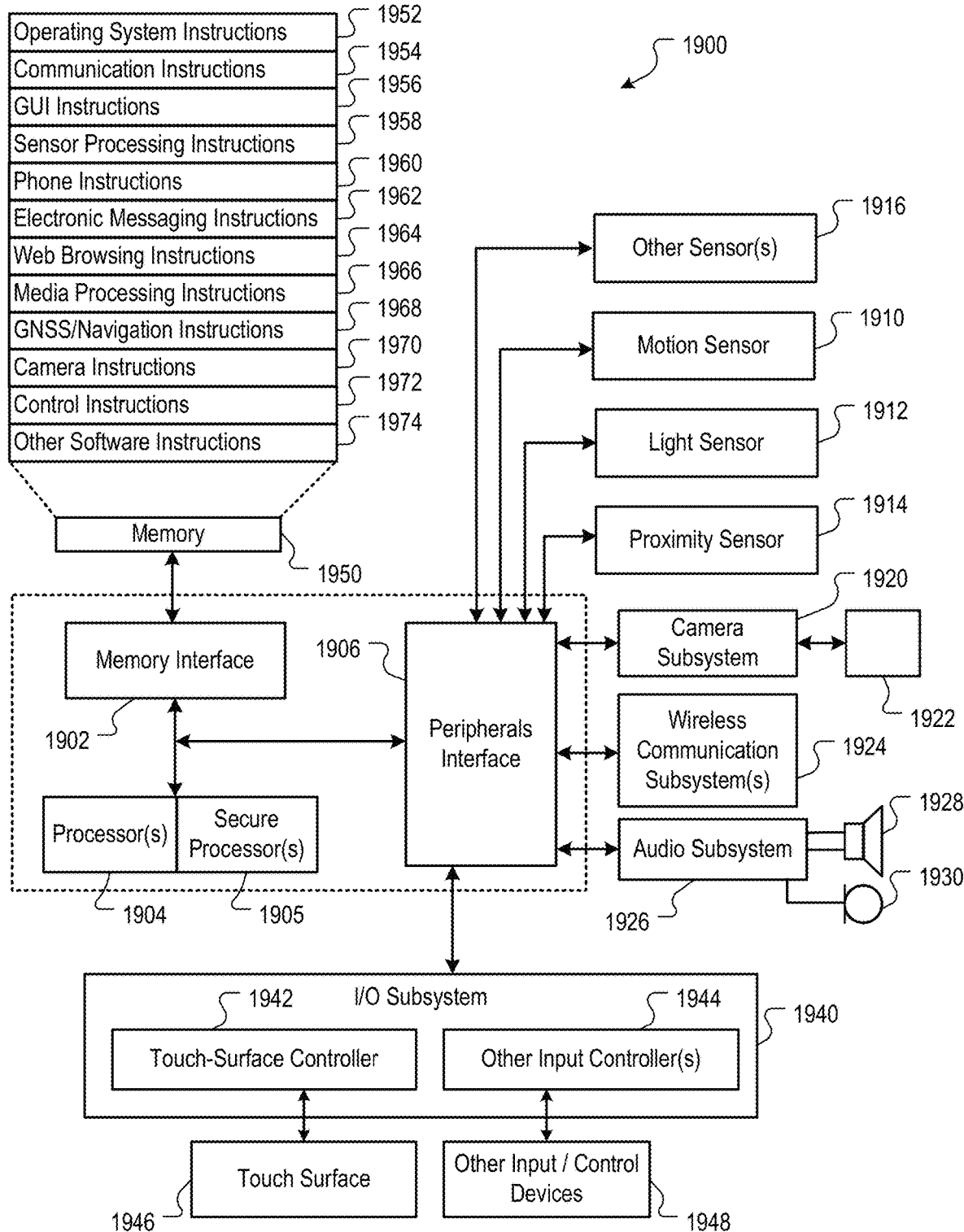
FIG. 19 shows a computing device according to an embodiment of the disclosure.

FIG. 19 shows a computing device 1900 according to an embodiment of the disclosure. Computing device 1900 may function as any of the computing devices described above, such as receiving devices, imaging devices, control devices, etc. Computing device 1900 may include a memory interface 1902, one or more data processors, image processors, central processing units 1904, and a peripherals interface 1906. The memory interface 1902, the one or more processors 1904, and/or the peripherals interface 1906 may be separate components or may be integrated in one or more integrated circuits. The various components in computing device 1900 may be coupled by one or more communication buses or signal lines and/or by one or more network connections.

Sensors, devices, and subsystems may be coupled to the peripherals interface 1906 to facilitate multiple functionalities. For example, a motion sensor 1910, a light sensor 1912, and a proximity sensor 1914 may be coupled to the peripherals interface 1906 to facilitate orientation, lighting, and proximity functions. Other sensors 1916 may also be connected to the peripherals interface 1906, such as a global navigation satellite system (GNSS) (e.g., GPS receiver), a temperature sensor, a biometric sensor, magnetometer, or other sensing device, to facilitate related functionalities.

A camera subsystem 1920 and an optical sensor 1922, e.g., a charged coupled device (CCD) or a complementary metal-oxide semiconductor (CMOS) optical sensor, may be utilized to facilitate camera functions, such as recording photographs and video clips. The camera subsystem 1920 and the optical sensor 1922 may be used to collect images of a user to be used during authentication of a user, e.g., by performing facial recognition analysis.

Communication functions may be facilitated through one or more wired and/or wireless communication subsystems 1924, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 1924. The specific design and implementation of the communication subsystems 1924 may depend on the communication network(s) over which computing device 1900 may be intended to operate. For example, computing device 1900 may include communication subsystems 1924 designed to operate over a GSM network, a GPRS network, an EDGE network, a WiFi or WiMax network, and a Bluetooth™ network. For example, the wireless communication subsystems 1924 may include hosting protocols such that computing device 1900 can be configured as a base station for other wireless devices and/or to provide a WiFi service.

An audio subsystem 1926 may be coupled to a speaker 1928 and a microphone 1930 to facilitate voice-enabled functions, such as speaker recognition, voice replication, digital recording, and telephony functions. The audio subsystem 1926 may be configured to facilitate processing voice commands, voice printing, and voice authentication, for example.

The I/O subsystem 1940 may include a touch-surface controller 1942 and/or other input controller(s) 1944. The touch-surface controller 1942 may be coupled to a touch surface 1946. The touch surface 1946 and touch-surface controller 1942 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1946.

The other input controller(s) 1944 may be coupled to other input/control devices 1948, such as one or more buttons, rocker switches, thumb-wheel, infrared port, USB port, and/or a pointer device such as a stylus. The one or more buttons (not shown) may include an up/down button for volume control of the speaker 1928 and/or the microphone 230.

In some implementations, a pressing of the button for a first duration may disengage a lock of the touch surface 1946; and a pressing of the button for a second duration that is longer than the first duration may turn power to computing device 1900 on or off. Pressing the button for a third duration may activate a voice control, or voice command, module that enables the user to speak commands into the microphone 1930 to cause the device to execute the spoken command. The user may customize a functionality of one or more of the buttons. The touch surface 246 can, for example, also be used to implement virtual or soft buttons and/or a keyboard.

In some implementations, computing device 1900 may present recorded audio and/or video files, such as MP3, AAC, and MPEG files. In some implementations, computing device 1900 may include the functionality of an MP3 player, such as an iPod™. Computing device 1900 may, therefore, include a 36-pin connector and/or 8-pin connector that is compatible with the iPod™. Other input/output and control devices may also be used.

The memory interface 1902 may be coupled to memory 1950. The memory 1950 may include high-speed random access memory and/or non-volatile memory, such as one or more magnetic disk storage devices, one or more optical storage devices, and/or flash memory (e.g., NAND, NOR). The memory 1950 may store an operating system 1952, such as Darwin, RTXC, LINUX, UNIX, OS X, WINDOWS, or an embedded operating system such as VxWorks.

The operating system 1952 may include instructions for handling basic system services and for performing hardware dependent tasks. In some implementations, the operating system 1952 may be a kernel (e.g., UNIX kernel). In some implementations, the operating system 1952 may include instructions for performing voice authentication.

The memory 1950 may also store communication instructions 1954 to facilitate communicating with one or more additional devices, one or more computers and/or one or more servers. The memory 1950 may include graphical user interface instructions 1956 to facilitate graphic user interface processing; sensor processing instructions 1958 to facilitate sensor-related processing and functions; phone instructions 1960 to facilitate phone-related processes and functions; electronic messaging instructions 1962 to facilitate electronic-messaging related processes and functions; web browsing instructions 1964 to facilitate web browsing-related processes and functions; media processing instructions 1966 to facilitate media processing-related processes and functions; GNSS/Navigation instructions 1968 to facilitate GNSS and navigation-related processes and instructions; and/or camera instructions 1970 to facilitate camera-related processes and functions.

The memory 1950 may store control instructions 1972 to facilitate other processes and functions, such as performing calculation, light control, camera control, image display, video display, and/or other functions as described herein.

The memory 1950 may also store other software instructions 1974, such as web video instructions to facilitate web video-related processes and functions; and/or web shopping instructions to facilitate web shopping-related processes and functions. In some implementations, the media processing instructions 1966 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 1950 may include additional instructions or fewer instructions. Furthermore, various functions of computing device 1900 may be implemented in hardware and/or in software, including in one or more signal processing and/or application specific integrated circuits.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc. While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

Calibration and Image Processing

As discussed above, some embodiments may use technology described in U.S. Pat. No. 10,091,418, while further translating a virtual center point to give a "wearer's eye view" of a scene, rather than a view focused on a camera's real position. The following description illustrates the underlying calculations for calibration and image processing.

Figure 20:
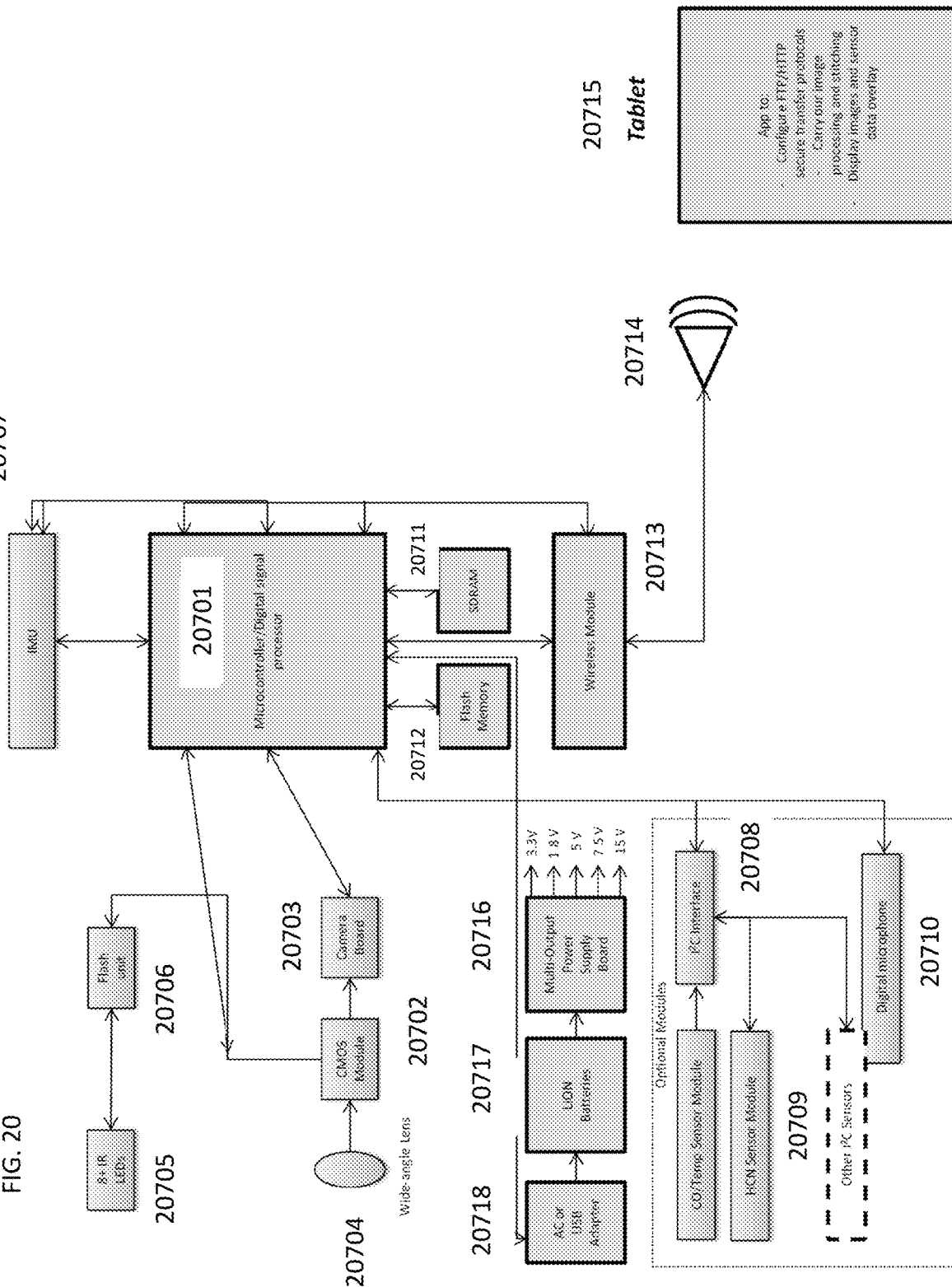
FIG. 20 is an imaging system according to an embodiment of the invention.

FIG. 20 is an imaging system according to an embodiment of the invention. FIG. 20 provides a high-level view of the hardware design and operation. Microprocessor and/or digital signal processor 20701 may trigger imaging sensor 20702, which may be mounted on camera board 20703, to capture an image.

Imaging sensor 20702 may take a quick calibration read to determine light conditions in the space being imaged, and based on these conditions may determine the appropriate exposure and whether (and how strongly) to trigger LEDs 20705. In some embodiments, the calibration may be carried out using a photosensor 20608. In some embodiments, high-intensity near-infrared LEDs 20705 with max output at a wavelength of 850 nm may be used, in other embodiments other LEDs may be used (as discussed above) appropriate to the application. LEDs 20705 may be mounted on an LED board 20706 controlled in some embodiments by the CMOS sensor 20702 and in some embodiments by the microprocessor 20701.

IMU 20707 may provide the microcontroller 20701 with information about the orientation and acceleration of the sensor unit 20101 as it is moving through its path of travel in the air and on the ground. The microcontroller 20701 may associate this information with images and transmit it to the receiver unit. This data may allow the receiver unit 20103 to provide information to the end user that allows that user to understand in which direction the sensor unit was thrown and what orientation the unit had when it took an image, whether that orientation is relative to gravity or relative to an orientation selected by the viewer. The data may also help determine how to display the images and position information on the receiver unit screen. In some embodiments, no IMU is used, and the unit may rely on software correction methods.

Sensor interface 20708 may connect additional analog and digital sensors to the microprocessor 20701. In the example embodiment shown, an I$^2$C interface connects a carbon monoxide/temperature sensor and a hydrogen-cyanide sensor (both shown in 20709) to the microprocessor. In other embodiments, a wide range of sensors may be employed, examples of which are listed above.

Microphone 20710 may capture audio from the environment and transmit this information back to microprocessor 20701, which in turn may make it available to receiver unit 20103. In some embodiments, a speaker or buzzer may be connected to the microprocessor 20701, as discussed above. In some embodiments, stereo microphones or other sound-gathering devices (e.g. hydrophones), both analog and digital, may be employed.

In some embodiments, microprocessor may employ memory 20711, flash memory 20712, or other forms of storage to buffer or store data or files. In some embodiments, all buffering and storage may be conducted onboard the microprocessor 20701.

Microprocessor 20701 may accept and process information from the imaging sensors 20702 and/or the additional sensors 20709 and/or the microphone 20710 and/or IMU 20707. Microprocessor 20701 may then transmit data or files to onboard flash memory 20712 or other memory and/or to the receiver unit 20103 via a wireless module 20713. Wireless module 20713 may transfer data and communications back and forth between receiver unit 20103 and sensor unit 20101 over a wireless link with the aid of antenna 20714. In some embodiments, the wireless module 20713 may broadcast data without a link being established, as in cases when links are difficult to establish. In some embodiments, the wireless module 20713 may perform some or all processing related to the image stitching and compression, in combination with and/or in place of other modules (e.g., microprocessor 20701). In other embodiments, some or all processing related to the image stitching and compression may be performed locally by microprocessor 20701 and/or other equipment coupled to and/or integrated with the camera system.

Receiver unit 20715 (e.g., same as receiver unit 20103), may receive data from the sensor unit 20101 and may process and display this information to a user or users. In some embodiments, the receiver unit may be an Android-based tablet running an Android app. In other embodiments, the receiver unit may be another smart device such as an iPad, iPhone, Blackberry phone or tablet, Windows-based phone or tablet, etc., as discussed above. In some embodiments, the receiver unit may be a personal computer. In some embodiments, the receiver unit may be a second sensor unit 20103 acting as a repeater for the receiver unit 20715 or as part of a mesh network of units 20103.

Power supply 20716 may provide the electrical energy for the other hardware. The power supply may draw current from battery 20717. In some embodiments, battery 20717 is a prismatic lithium-ion battery. In some embodiments, battery 20717 may be one or many alkaline batteries. In some embodiments, battery 20717 may take another form of high-performance battery. In some embodiments, power supply 20716 may connect directly to an external power supply 20718. In some embodiments, tether 20302 may provide a connection to an external power supply. In some embodiments, external power supply/adapter 20718 may comprise an A/C or USB adapter that may supply power to the unit 20101 and/or charge the battery 20717.

Figure 21:
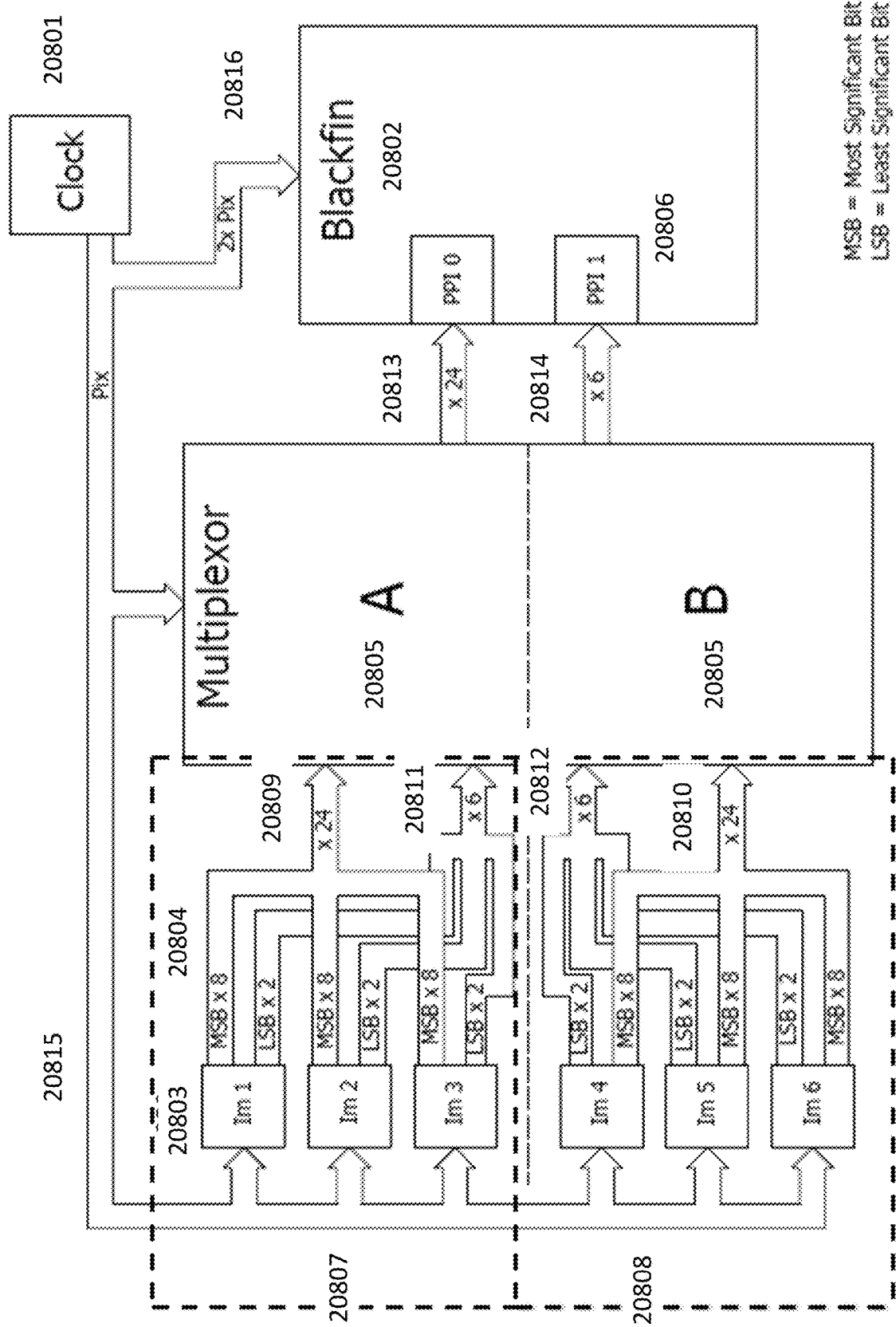
FIG. 21 is a circuit block diagram according to an embodiment of the invention.

FIG. 21 is a circuit block diagram according to an embodiment of the invention. Multiplexing may be used to allow the microprocessor 20701 to accept data from a plurality of image sensors. In this example, a BlackfinBF548 microprocessor 20802 may accept data from six imaging sensors 20803 over two parallel peripheral interfaces (PPI) 20806. Each of 6 image sensors 20803 may be driven by same clock source 20801, which may ensure that image data from the image sensors 20803 is synchronized. Each of image sensors 20803 may use a 10 bit data bus to transfer images. Six image sensors 20803 may be separated into two groups of three image sensors 20803 in each group—groups 20807 and 20808. Eight most significant bits from 3 image sensors 20803 in each group may be placed sequentially, forming 2024-bit signals 20809 and 20810. Two least significant bits from 3 image sensors 20803 in each group may be placed sequentially, forming 6-bit signals 20811 and 20812. Two 24-bit signals 20809 and 20810 may be multiplexed by multiplexor 20805A into single 24-bit signal 20813. Two 6-bit signals 20811 and 20812 may be multiplexed by Multiplexor 20805B into single 6-bit signal 20814. The 24-bit signal 20813 may be sent to PPI0 port of BF548 20802. The 6-bit signal may be sent to PPI1 port of BF548 20802. Multiplexor 20805 may pass data from group 20807 during high level of clock signal 20815 and from group 20808 during low level of clock signal 20815, resulting in doubling data rate of the image data. In order to correctly receive this data, both of PPI ports 20806 may use clock 20816, which may be double the clock frequency used by the image sensors. In order to properly synchronize multiplexing of the image data 20804, clock source 20801 may allow phase control between clocks 20815 and 20816. In some embodiments, this combination of multiple image data streams may be achieved via the use of a Field-Programmable Gate Array (FPGA). In some embodiments, small microprocessors associated with each of the image sensors may buffer data and thus address the multiple-data-input problem solved through multiplexing above. This synchronization may enable some embodiments, wherein the rotation of the device requires very precise alignment of images in time that may not be required on a stationary camera platform, to function.

Figure 22:
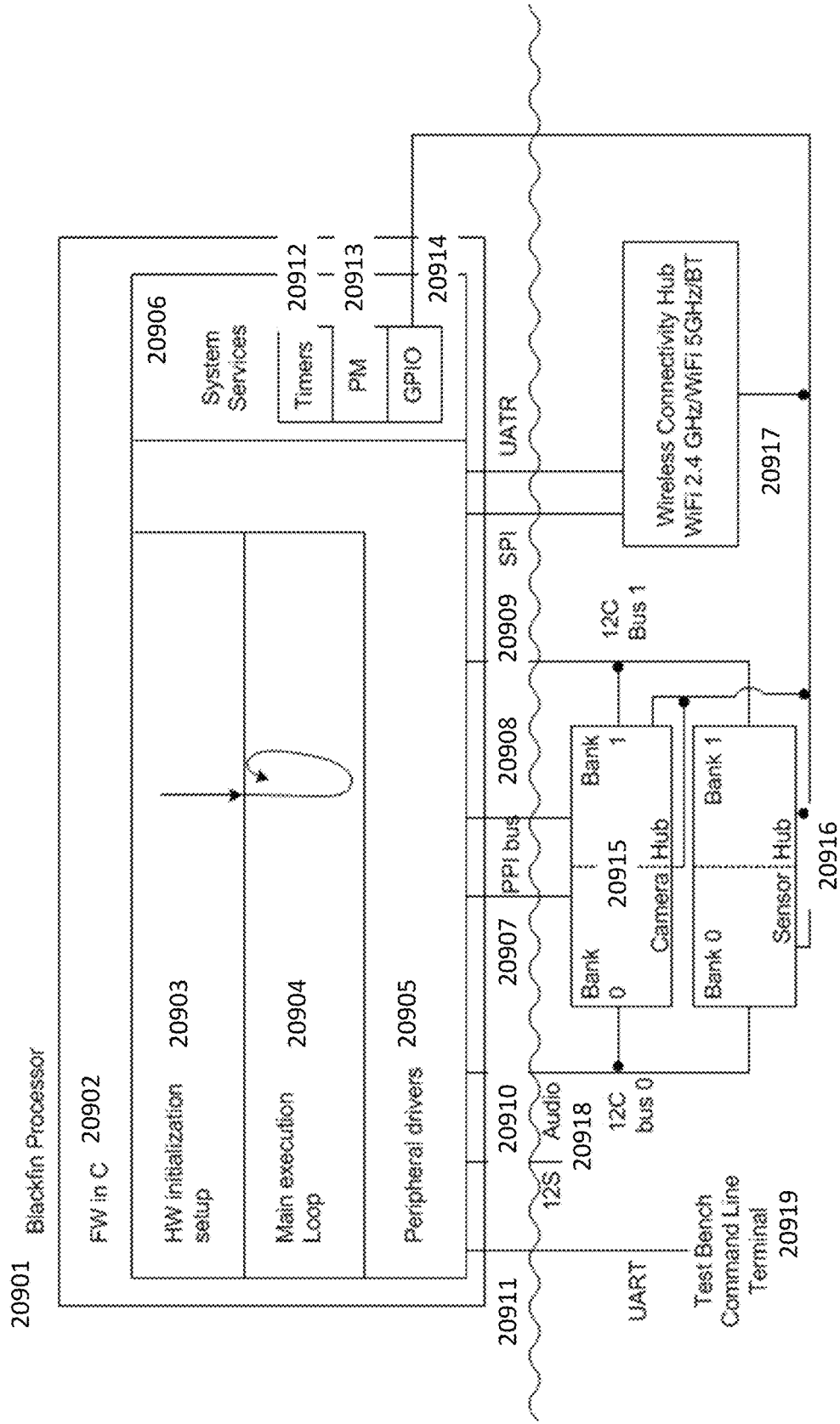
FIG. 22 is a sensor unit block diagram according to an embodiment of the invention.

FIG. 22 is a sensor unit block diagram according to an embodiment of the invention. FIG. 22 offers a high-level view of the hardware/software/firmware implementation on the sensor unit 20101. In some embodiments, the on-board processor 20901 may run a full operating system, such as Linux or Real Time OS. In FIG. 22, an embodiment is shown which does not rely on an operating system and instead uses a plain infinite main execution loop known as "bare metal" approach. The firmware 20902 for microprocessor 20901 may be written in C, a widely used programming language. In some embodiments, other programming languages might be utilized (e.g., interpreted scripting and/or assembly languages). The firmware may begin its executions upon reset and may run a one-time initialization of the hardware first, as illustrated in 20903. From here, the main execution loop may begin and may run indefinitely as indicated in 20904. Firmware initialization and main loop for the sensor unit 20101 may use peripheral drivers 20905 and system service 20906 source and/or binary code. Peripherals and services may be specific to on-board processor 20901 and may vary in other embodiments. Peripherals for 20901 processor may include PPI bus 20907 for imaging sensors, I²C bus 20908 for additional non-imaging sensors control and data acquisition, SPI bus 20909 for wireless connectivity, I²S bus 20910 for audio, and/or UART channel 20911 for auxiliary communication functionality. Services may include timers 20912, power management facilities 20913, and/or general purpose I/O 20914 for various system needs.

Via peripheral drivers and system services, firmware 20902 may control and utilize external devices attached to processor 20901 by mechanical and electrical means. Set of cameras 20915 may be controlled and utilized via PPI bus 20907 and I²C bus 20910. Audio functionality 20918 may be controlled and utilized via I²S bus 20910. Wireless connectivity module 20917 may be controlled and utilized via SPI bus 20909. Set of system sensors 20916 (temperature, toxic gases, buzzer, IMU, etc.) may be controlled and utilized via I²C bus 20918. UART channel 20911 and its multiple instances may serve many auxiliary control and utilization needs, such as test bench command line terminal 20919 or alternative access to wireless connectivity module 20917. Some system devices external to the processor 20901 may be controlled and utilized via GPIO 20914 pins. Utilization and control for camera functionality in firmware may allow for proper acquisition of images into processor's 20901 internal memory. Similarly, other data may be collected from other system sensors. To deliver collected information to user interface devices, firmware may use wireless connectivity functionality embedded in wireless connectivity module 20917, which may provide 802.11 WiFi protocol communications along with higher level communication stacks (e.g., TCP/IP, BSD sockets, FTP, and/or HTTP). In some embodiments other protocols and/or communication stacks may be utilized (e.g., Bluetooth, 802.15 and custom and proprietary). In some embodiments, the wireless connectivity module 20917 may perform some or all processing related to the image stitching and compression, in combination with and/or in place of other modules (e.g., processor 20901). In some embodiments, a wired connection (e.g., USB) may be provided in addition to or instead of the wireless connection. In the latter case, the wireless connectivity module 20917 may be replaced with a wired connectivity module, for example.

Figure 23:
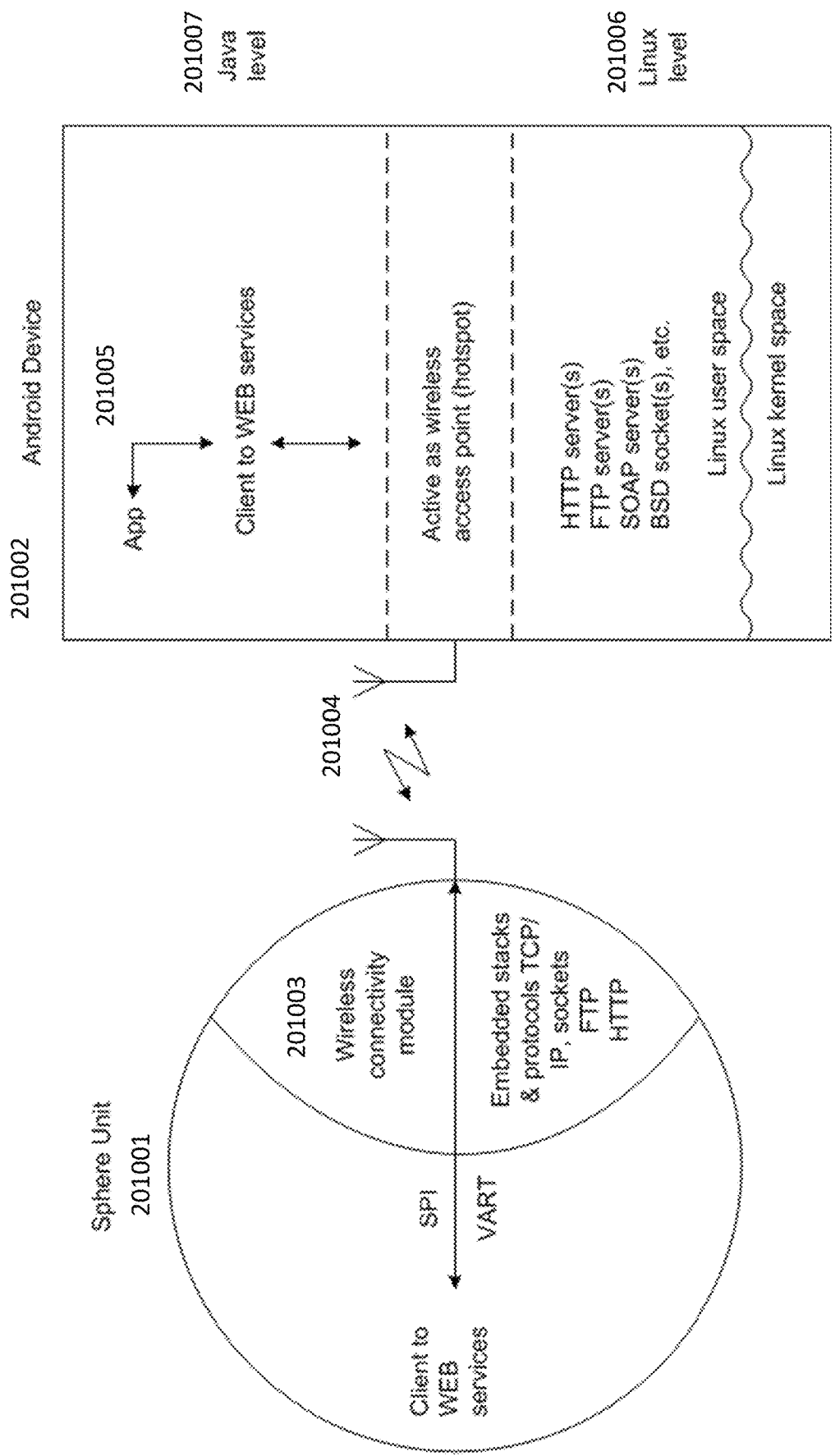
FIG. 23 is a network according to an embodiment of the invention.

FIG. 23 is a network according to an embodiment of the invention. FIG. 23 illustrates one of several possible architectures for communication between the sensor unit 201001 and the receiver unit 201002. In one embodiment, shown here, the sensor unit may act as WEB service client to the receiver unit, and sensor's wireless module 201003 may facilitate such behavior by providing embedded plain TCP/IP, BDS sockets, FTP, and HTTP protocols and stacks. In other embodiments, the sensor unit 201001 may act as a wireless hotspot and as a network server (TCP or UDP) that may be controlled by the receiver unit 201002. Microprocessor 20701 (20901) may communicate with wireless module 201003 (20917) over UART and/or SPI connection and/or via a wired connection such as USB. In other embodiments, sensor unit 201001 may implement and act as a server to the receiver unit client with support from the wireless module. Data transmission may also occur in ad hoc fashion without a clear server-client arrangement established.

In the example embodiment shown, wireless module 201003 may connect as a client to a server on receiver unit 201002 via an 802.11b wireless link 201004. In some embodiments, the server on the receiver unit 201002 (in the embodiment shown, an Android tablet) may operate at the operating system level (in the embodiment shown, Android Linux). In other embodiments, the server or client on the receiver unit may be implemented at the application level (in the embodiment shown, at the Java level in an app). In the embodiment shown, the app 201005 may both configure the server properties of the receiver unit and process data from the sensor unit 201001.

Figure 24:
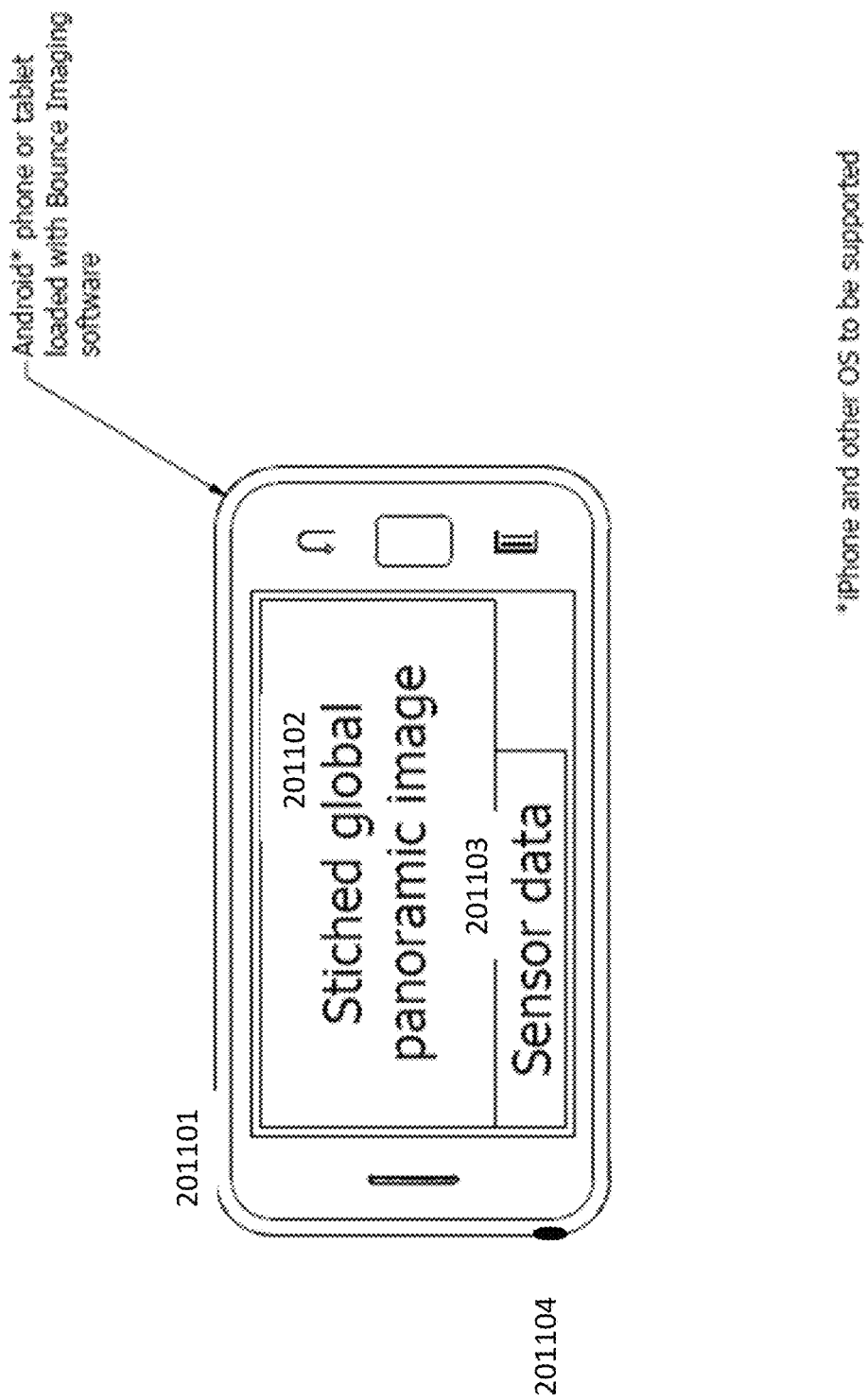
FIG. 24 is a user interface according to an embodiment of the invention.

FIG. 24 is a user interface according to an embodiment of the invention. FIG. 24 shows a simplified, example, high level diagram of the design of the display application on receiver unit 201101. This application may display a series of images 201102 of the space into which the sensor unit 20101 is thrown. In some embodiments, the series of images 201102 may be frames in a video which may be played via the application, for example. The images 201102 may cycle automatically and/or be advanced manually, and the images 201102 may display the perspective of the sensor unit 201101 at different intervals over the course of its travel. Images 201102 may be oriented based on IMU information from the sensor unit 20103 in such a way as to make the images intelligible to the user (e.g. right-side up and pointing in the direction that the sensor unit 20101 was thrown). This may provide visual reference points which may be useful for making decisions about entering a space (e.g. "Is that object to the right or left relative to where the ball was thrown?") and/or provide a stabilized view of the path of travel of the sensor unit 20101.

Sensor data overlay 201103 may display additional sensor data in some embodiments. In the embodiment shown, data 201103 about temperature and gas levels may be provided at the bottom of the screen. In other embodiments, data may be overlaid directly over the image where relevant.

Headphone jack 201104 on the receiver unit 201101 may allow the user or users to listen to audio data being transmitted from the sensor unit 20101.

The application which displays information on receiver unit 201101 may take several forms. In the embodiment shown in FIG. 24, the application may be a Java-based Android app running on an Android tablet or smartphone. In other embodiments, the application may be an app on another operating system, such as iOS, Windows, or Blackberry. In other embodiments, the application may be a custom application for a different receiver unit. In each case, the application may include the following functions: configuring the communications protocols with one or many sensor units 20101, processing image and sensor information received from the sensor unit 20101, and/or displaying that information in a way that is useful to the end user. In some embodiments, the application may include further functions, such as triggering when an image or data point is taken, activating beepers, sirens, or diversionary devices, and/or controlling the motion of sensor units 20101 when these are self-propelled.

Figure 25:
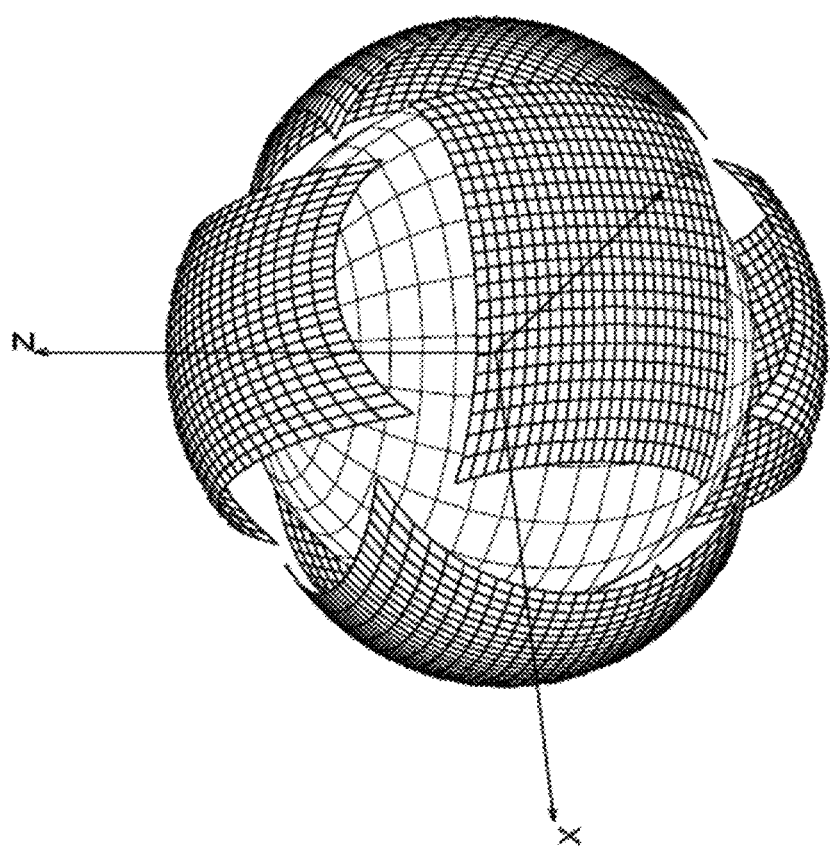
FIGS. 25-27 are an image processing method according to an embodiment of the invention.
Figure 26:
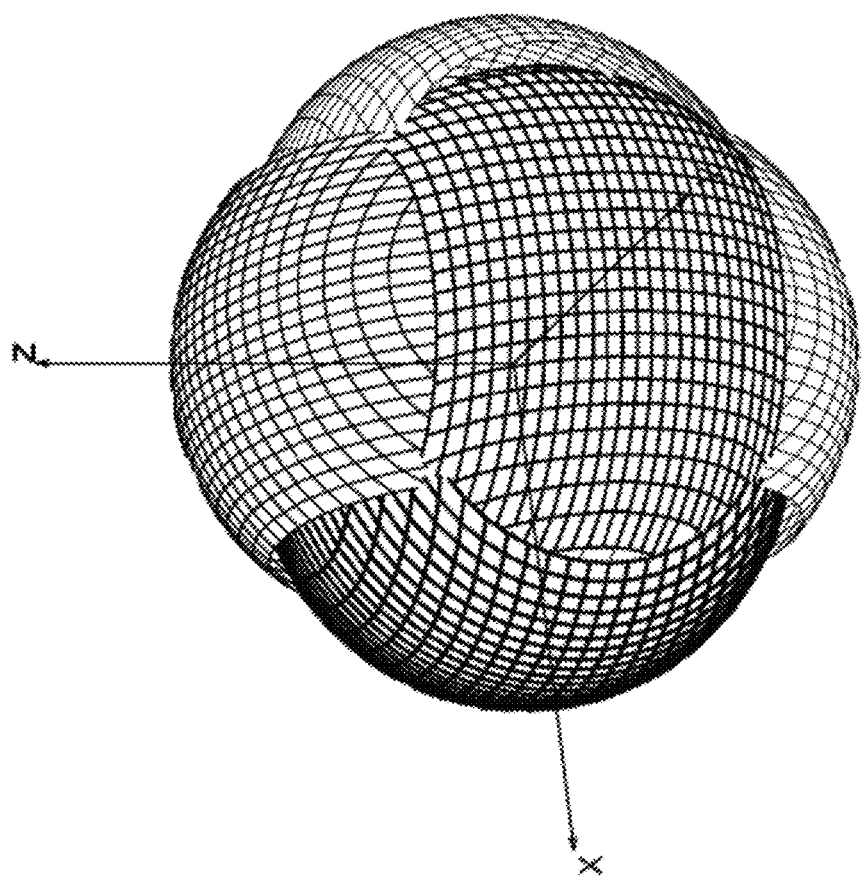
Figure 27:
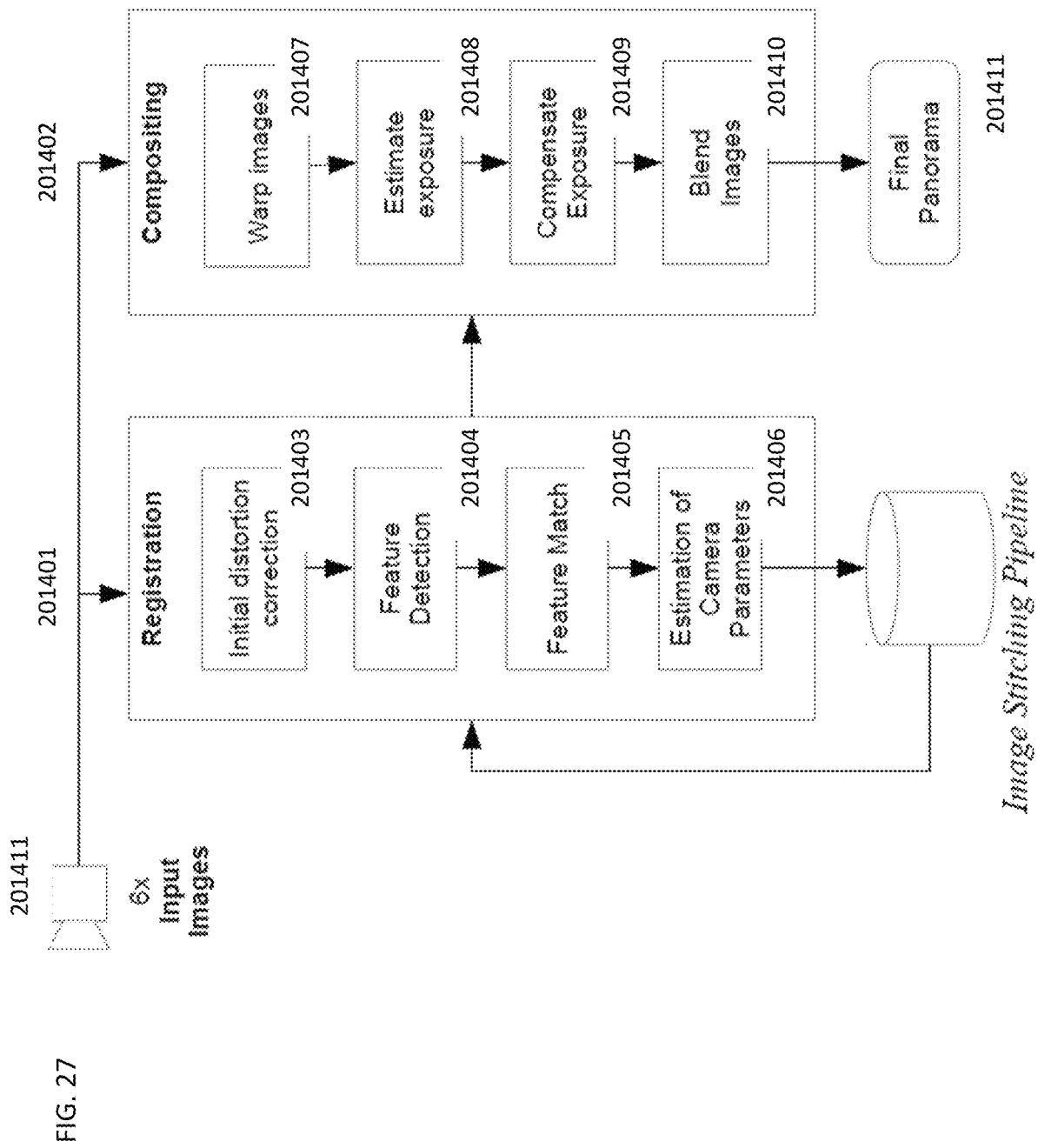

FIG. 25, FIG. 26, and FIG. 27 illustrate a process by which the application on receiver unit 201101 may process and display the images received from sensor unit 20101 according to an embodiment of the invention. Creation of a panoramic image with the image data from the sensor unit 20101 may assume the configuration shown in FIG. 25 of spherically projected images, for example. A wide-angle of 100° for the horizontal field of view (HFOV) and a 63° vertical field of view (VFOV) are shown in this example, although these angles may be lower than the real FOV achieved with wide-angle or fish-eye lenses in some embodiments. In this example, the image orientations may always rotate 90° between neighbors to increase the coverage of the spherical field of view. The aspect ratio shown is the same as in the image sensor chosen in one embodiment (in this example 20480/752). FIG. 26 shows another sphere coverage example with an HFOV of 140° and a VFOV of 89°.

The spherical projection of each image may be computed from the sensor image, and due to the displacement of each camera in the physical sphere, the center of the spherical projection may be displaced with respect to the center of the reference sphere on which the panoramic image is created.

The panorama creation may follow the processing pipeline depicted in FIG. 27. Once the input images 201411 are received, the panorama creation process may be separated into two main steps: registration 201401 and compositing 201402.

Registration 201401 may begin with initial image distortion correction 201403. It then may proceed to feature detection 201404, which among other things may allow for control point matching across neighboring images. Feature match 201405 may follow and may be based on feature detection 201404. Next, camera parameters may be estimated 201406.

Compositing of images 201402 may also include a series of steps. Images may be warped 201407 to compensate both for fisheye effects and for how the images are to be displayed on a 202-dimensional screen. The exposure of the image may be estimated 201408 and compensated for 201409. The images may be blended 201410 into a single image. The resulting single image may form the final panorama 201411 displayed to the user on the receiver unit.

The entire process of image capture, registration, composition, and display of a final panorama (and sensor data overlay) may take only a few milliseconds when using the systems and methods described above. Such speed may be achieved because of a series of optimizations in the design of the processing software. One example optimization is the assumption, possible given the mechanical design of the sensor unit, that the cameras are at mostly fixed positions relative to each other. In addition, while prior research has included some mention of creating panoramas from fisheye/wide-angle lens images, these processes assume that images are taken from a single point in space. The stitching process used by the system may mathematically correct for the elimination of this center point assumption to allow the creation of panoramic images from the multiple cameras.

Image Processing

The following image processing systems and methods may be used to stitch images gathered by the imaging systems described above or any other multi-camera system. Stitching of images may be performed in a fraction of a second on a processing device (e.g., a smartphone or other mobile device and/or the imaging device itself) despite frequent noise and blur issues, no fixed center point, super-fisheye lenses, and limited processing power.

Figure 32:
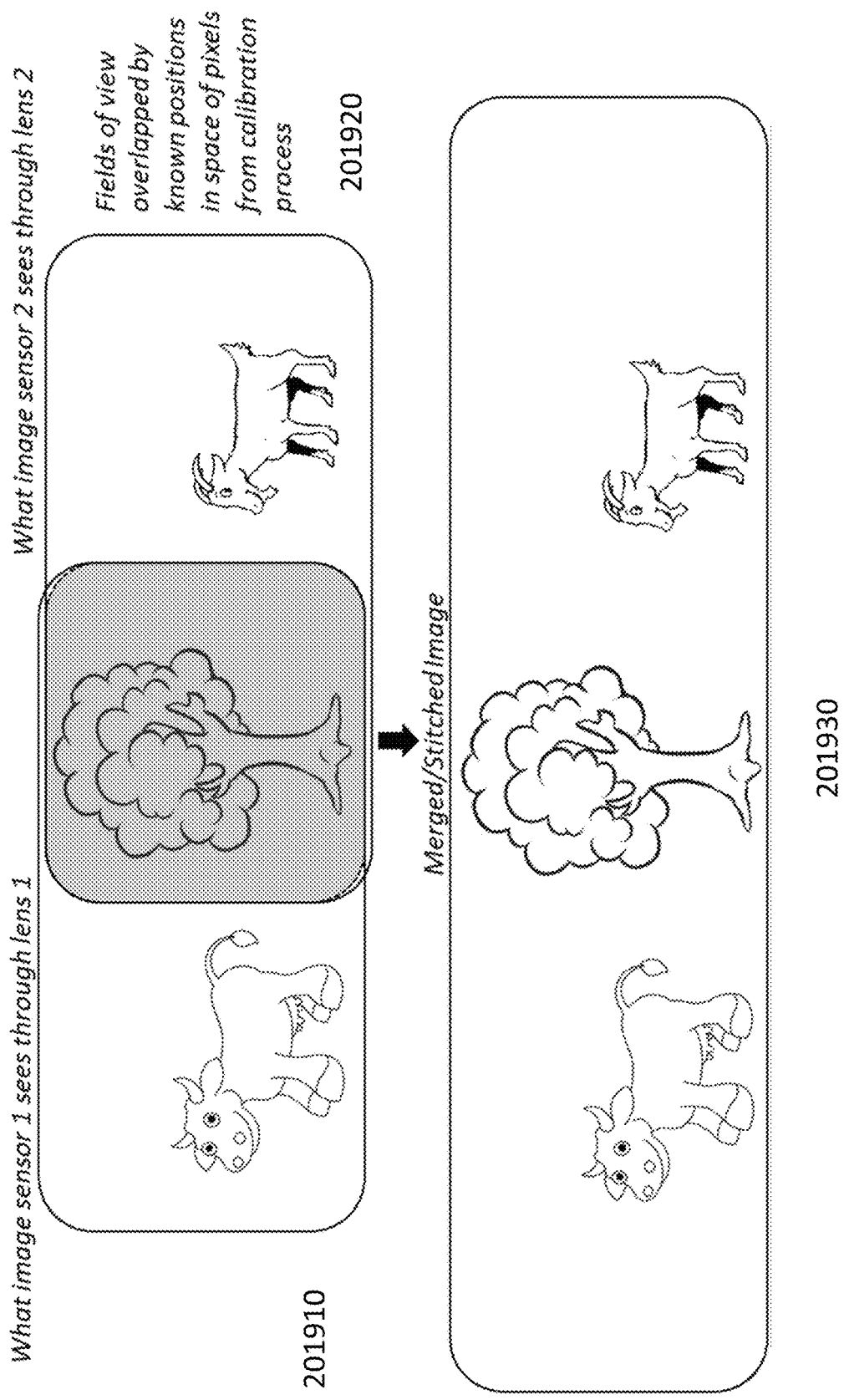
FIG. 32 is an image merging example according to an embodiment of the invention.
Figure 33:
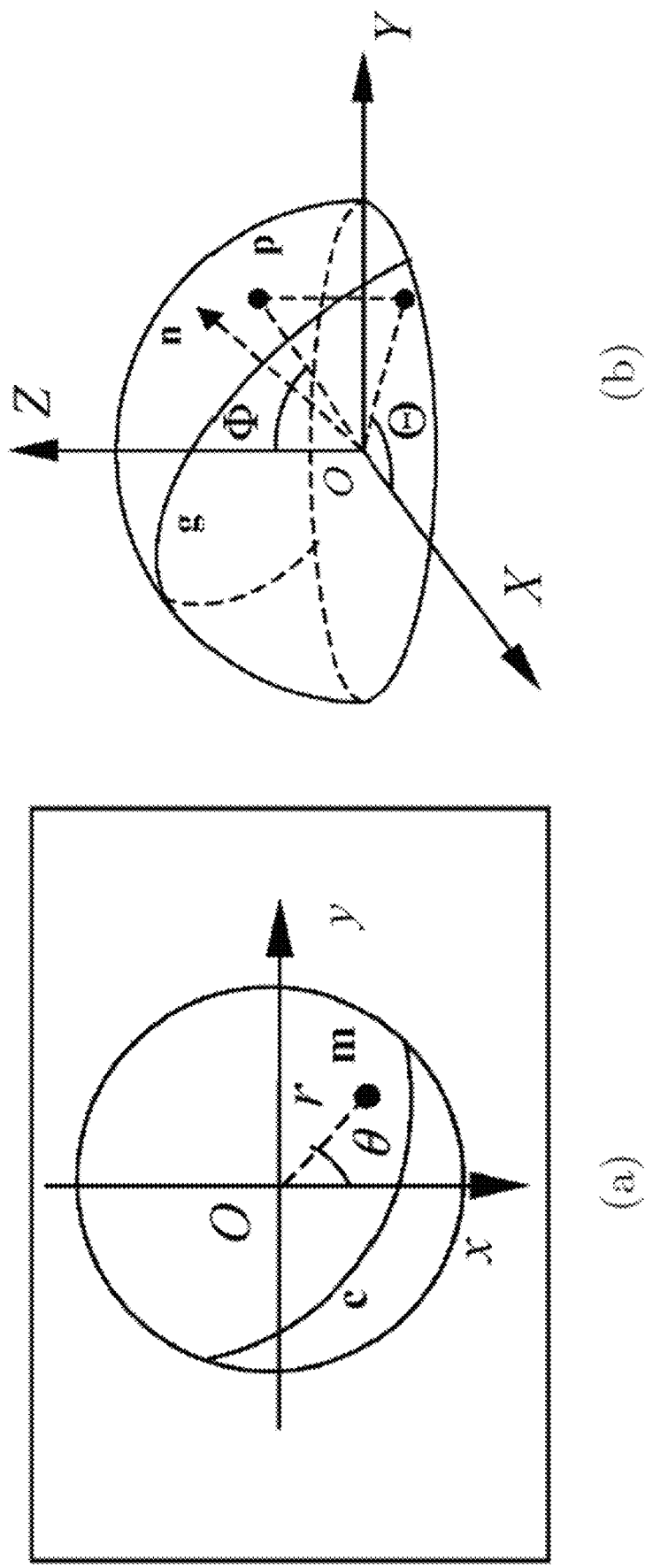
FIG. 33 is an ideal fisheye projection and a corresponding spherical perspective image according to an embodiment of the invention.

FIG. 32 is an image merging example according to an embodiment of the invention. Image merging may rely on a very precise calibration (described below) that allows the system to know precisely where pixels in images should lie in space and overlap these pixels across multiple images. For example, in a two camera system, image sensor 1 may capture first image 201910, and image sensor 2 may capture second image 201920. Both images 201910 and 201920 may contain pixels that overlap in space (e.g., the tree). The images 201910 and 201920 may be merged into a panoramic image 201930 based on these overlapping pixels. This method may require the positions of the cameras to be known precisely, as may be achieved through the calibration process described below. A mechanical understanding of camera/sensor positions is insufficient due to the non-linear nature of lens distortions (e.g., in fisheye lenses) in some embodiments. Thus, both an intrinsic and extrinsic calibration process may be performed and may deliver both precisely known camera/lens positions relative to each other and the specific characteristics of each lens being used. This data may allow the processor performing stitching/merging to know precisely where each pixel should lie in space. Thus, the disclosed systems and methods may precisely align the input images and merge/stitch them without feature matching.

Some embodiments are described herein in conjunction with the platform comprising cameras in fixed positions described above. However, some embodiments may be extended to a range of platforms (e.g., telemetry from cameras on a drone). Moreover, the positions of the cameras may not need to be fixed if they can be precisely known. Thus, for example, six cameras on a person's clothing/helmet, each generating a small active signal (such as a Bluetooth signal) or a passive reply (such as an RFID), may use those signals to triangulate their precise position relative to the other cameras in space and do an "on-the-fly" calibration that may allow for cleanly-merged images and panoramas. Other techniques for determining the camera positions, such as mechanical links/cables or actuated arms moving them to known positions, may be similarly effective in allowing the use of the disclosed image processing even if the cameras/sensors are not in fixed positions relative to one another.

The image processing may rely on known relative positions of cameras (see extrinsic camera calibration as discussed below) in a system to pre-process camera calibration and other parameters on computers when the camera ball or other system is built or configured and store that information in lookup tables that may be accessed by the stitching application in a fraction of the time that it would take to re-calculate. The image processing may utilize a distortion model which, in contrast to standard models like Brown's lens model, may be readily able to handle fisheye lenses. Intrinsic and extrinsic calibration of a system of cameras may be performed by a calibration apparatus developed specifically for fisheye lenses. The image processing may utilize an automatic line-detection method that may provide automatic calibration of camera systems in mass-production. In some embodiments, manual calibration may be performed. The image processing may be performed wholly or in part by a mobile application that is highly optimized to process and display image data to the user in some embodiments. The image processing may provide a user interface designed to allow the user to quickly and easily navigate the panoramic image data provided by the system.

The system may pre-compute as much information as possible at the calibration stage when a new camera ball or other camera system is manufactured or re-calibrated. This may vastly reduce the amount of computational resources required when the imaging process is run, for example, on a mobile device (the process may also be run on a computer, server, embedded hardware, or other system/processor, but the mobile device is used as an example herein). Because users may navigate the image within a spherical context (e.g., due to spherical arrangement of cameras and naturally curved fisheye images), the processing may be performed in a spherical projection context, rather than transitioning to a planar projection (thereby saving a processing step of transitioning to a planar projection).

Pre-Processing the Intrinsic and Extrinsic Calibration

Figure 28:
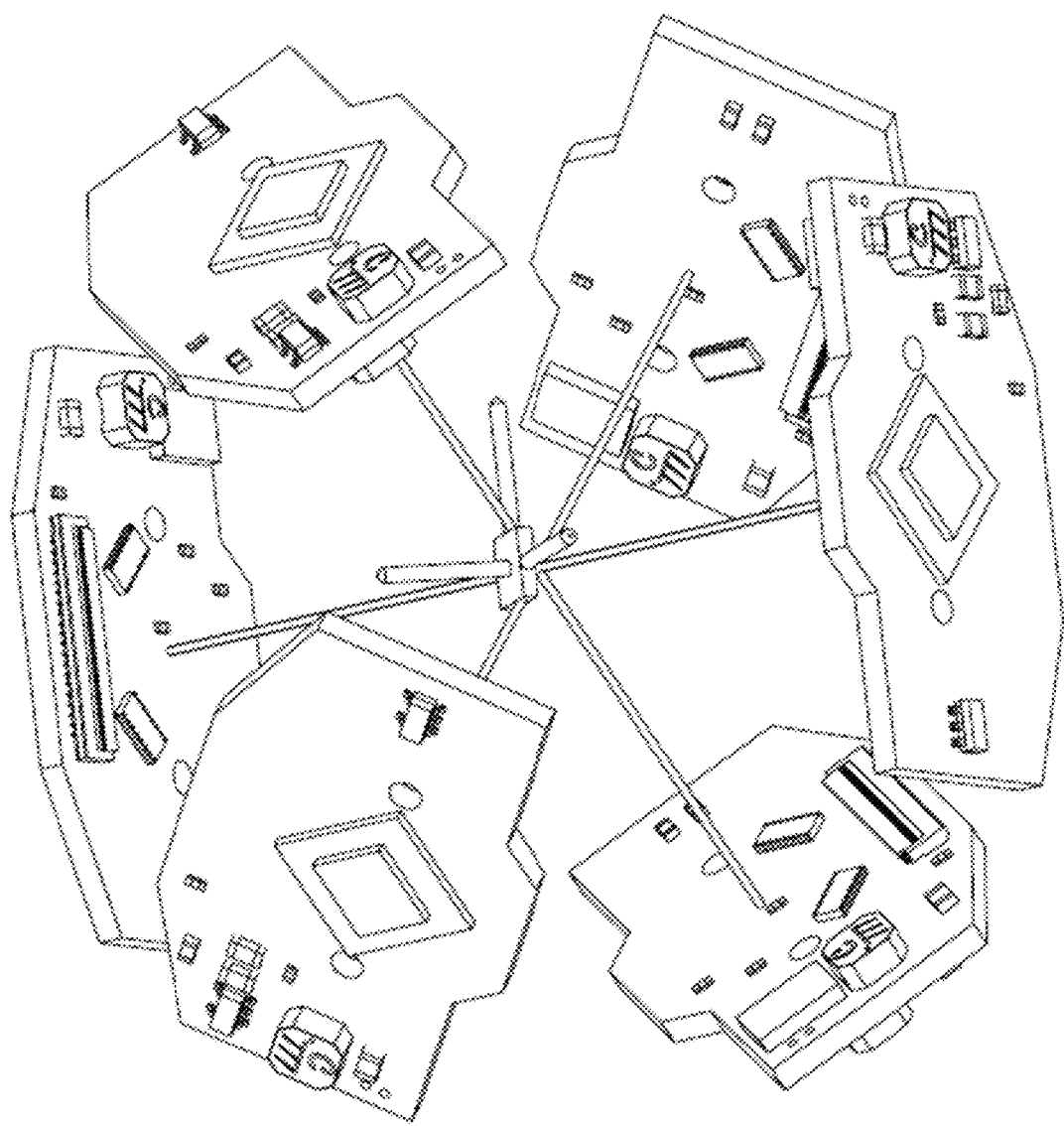
FIG. 28 is a camera system with a set of axes according to an embodiment of the invention.

In some camera systems with which the image processing is employed there may be no fixed center point (e.g., in the case of the camera ball). Thus, a virtual center point/origin may be created by mathematically mapping the images as if they were captured from the optical center—the point at which lines drawn through the center of each of the cameras would intersect. FIG. 28 is a six-camera system with a set of axes developed around the optical center (intersection point of lines drawn through each camera) according to an embodiment of the invention, though the number of cameras may vary. A spherical model may be developed via the projection of lines and planes cutting through the virtual origin of the camera system and as determined by the calibration described below.

Distortion and initialization parameters may be calculated via a genetic optimization framework. This recognizes that even the most precisely-built calibration apparatus may have some error and allows lenses (and their associated distortion and other characteristics) to be changed as needed. A genetic optimization framework may be hybridized with a classical optimization to find local minima around each genetic-produced individual (in other embodiments, other algorithms/methods may be used). This hybrid approach may find optima in a nonconvex error surface, may be faster than pure genetic optimization, and may avoid the use of the full gradient derivation of error functions. The framework may provide a precise estimation of the parameters for the intrinsic calibration, which may allow such data as the vertical and horizontal fields of view and the complete field of view to be measured, and may provide a warping model to project a fisheye image onto a sphere.

To allow the genetic algorithms to avoid over-optimizing to a particular set of images, the system may be provided with several sets of images taken from different perspectives.

Calculating distortion models for fisheye lenses may require the estimation for the inverse model for doing the image warping. The disclosed systems and methods may use a lookup table to make these computations feasible on a mobile device. In some embodiments the calculation may take milliseconds, with precisions measured in fractions of a pixel.

Figure 29:
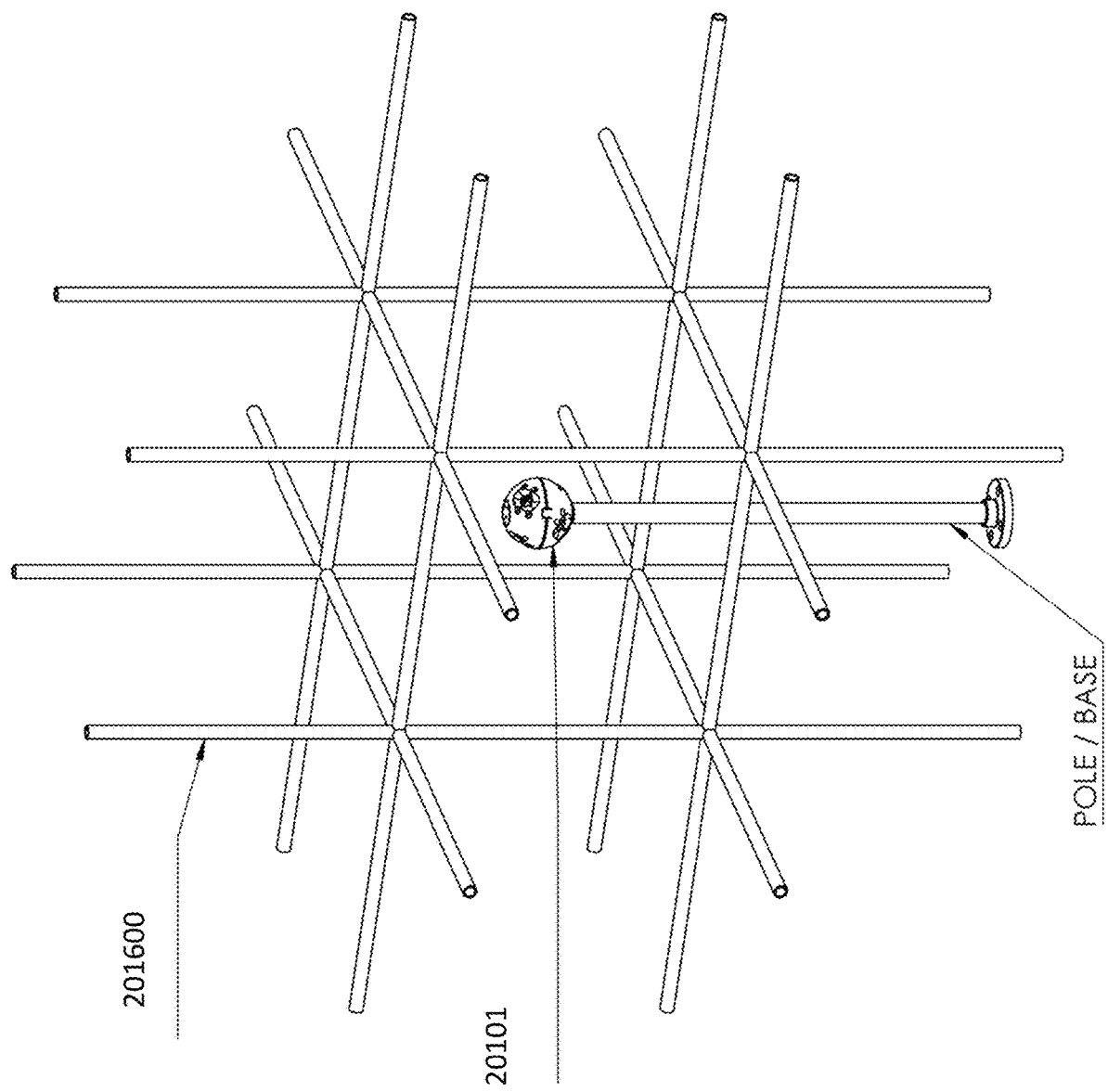
FIG. 29 is a calibration cage according to an embodiment of the invention.

Extrinsic camera calibration may be complicated by the high distortions of the fisheye lenses, especially when super-fisheyes are used, as in the throwable ball camera. To address this issue, a calibration cage apparatus that takes the form of an open cube with extended arms may be used in calibration. FIG. 29 is a calibration cage 201600 according to an embodiment of the invention. The camera system, in this example the camera ball 20101, may be placed within the calibration cage 201600. The calibration cage 201600 may offer eight available coordinate systems to map the relative positions and perspectives of all cameras in the system. Each axis may have lines that indicate a 45-degree (or other) angle and markers which denote distance (e.g., 5 cm between vertical lines). Each axis may also have human-readable identifiers (such as "#" or "Z") and/or machine-readable indicators such as April tags. In some embodiments, axis identifiers may not be needed because the camera may be rotated via a mechanical arm to pre-determined positions within the calibration cage 201600. Additionally, some of the algorithms disclosed below may be used with a broad range of alternative calibration apparatuses (e.g., anything with very long, straight lines) in some embodiments. For automatic calibration, the contrast and clarity of the system may be enhanced via the application of electroluminescent tape or other electroluminescent materials which may fluoresce when a current is applied.

Some embodiments may utilize the calibration cage 201600 to provide a known set of axes and reference points for calibrations, especially during an initial calibration. In other embodiments, camera systems may self-calibrate in the field given known positions in space (such as lines of a known separation on a ceiling) or with projected lines (such as lasers included in the system projecting a grid).

Electroluminescent tape or other luminescent marking may be placed along the lines of the cage. In a dark environment, the camera unit may be placed inside the calibration structure. The camera unit may be automatically moved to various positions inside the structure and capture and save camera images at each position. Using the known approximate line positions, the detected lines may be identified.

The methods described for camera calibration may be extended to non-visual data, such as thermal infrared sensor data or ultraviolet-light images or radio or radar images. Any set of sensors in a known configuration receiving signals from the outside world may similarly be combined into a panorama given an understanding of the relative positions of the sensors and how the sensors receive information.

While some embodiments are described in conjunction with a camera in space or in the medium of air, other embodiments may be extended to media other than a vacuum or air, such as underwater. The calibration processes may be appropriately adapted to account for the different behavior of light (or other signal data, such as sonar) underwater, underground, or in another medium.

The relation between two cameras for the extrinsic calibration may be established using the plane-circle concepts already used in the intrinsic camera calibration. The extrinsic calibration may yield the exact geometrical configuration of all cameras in the system, which may be useful for warping the spherical projected images. With fisheye lenses there may be strong distortion of objects lying near the sphere and captured by several cameras. To simplify calculation, the system may assume that the spherical projections produced with the model of the intrinsic calibration come from rays originated at infinity. With this assumption, the spherical projections of the cameras may be warped into a global spherical projection.

Figure 30:
FIG. 30 is a panorama according to an embodiment of the invention.
Figure 31:
FIG. 31 is a screenshot according to an embodiment of the invention.

Model parameters and extrinsic parameters may be adapted to force a perfect stitching, but the optimization of those parameters may be time consuming because it involves a bundle adjustment of all six camera models. In some embodiments, parameter optimization may be replaced with a blending framework since the images may already be properly warped. A variety of methods for the final blending of images may be used. For example, feathering may provide clean and nearly perfect images in milliseconds on almost any device. The degree of feathering may be modified to find an optimal image result. Multiband blending may be more precise, but sometimes may require more processing power to process at high speed. In some embodiments, these two warping processes may be computationally merged. FIG. 30 is an example panorama of a stitched image (flattened to fit on a 202D piece of paper) produced according to an embodiment of the invention.

An application on the mobile device may use the information from the intrinsic and extrinsic calibration to carry out the final steps of image processing and stitching. When images are processed on a mobile device (for example, Android or iOS), the received files that contain images may also include an XML with all the intrinsic and extrinsic parameters calculated as described above.

Image alignment and stitching may involve estimation of a mathematical model that relates the pixel coordinate systems between different images, estimation of the global alignment between pairs of images, detection of distinctive features in images and finding correspondences between them, computation of a globally consistent set of alignments for several images, selection of a final compositing surface and its parameterization where all other images will be warped and placed, and blending of the overlapping images.

Estimation of the models for alignment and the relationships between images may be performed by calibration, i.e., the estimation of the intrinsic and extrinsic parameters for all cameras involved. Intrinsic calibration may involve the estimation of the optical relationships between lenses and sensors, including the form factor and pixel skewness due to misalignments between sensor and lens, the optical distortion parameters, and/or the optical axis center in an image. Extrinsic calibration may relate the camera coordinate systems among themselves and to a global reference.

Note that while the sensor unit described above is a throwable unit housing a plurality of cameras, any device that receives image data from a plurality of cameras may be a sensor unit for the purposes of the image processing described herein. Thus, for example, a computer coupled to a plurality of cameras in any arrangement may be a sensor unit. Likewise, while the receiver unit described above is a smartphone or tablet in wireless communication with the throwable ball, any device that processes the image data into a combined (e.g., panoramic) image may be a receiver unit for the purposes of the image processing described herein. Thus, for example, any computer coupled to the sensor unit (e.g., via wired or wireless connection) may be a receiver unit. Also, the receiver unit may be another portion of the same computer that serves as the sensor unit in some embodiments (e.g., the sensor unit may be a first dedicated module, software element, processor, etc. of the computer and the receiver unit may be a second dedicated module, software element, processor, etc. of the computer).

Intrinsic Calibration

Intrinsic calibration may involve determining the parameters of individual cameras (intrinsic parameters). These parameters may describe how the lens distorts the light rays going through it and how the camera sensor is positioned relative to the lens, for example. Intrinsic calibration may be performed using a calibration object (e.g., the calibration cage described herein or some other object). A calibration object may be a 3 dimensional object with known properties and dimensions. Using the data of different views of the calibration object, the parameters may be derived.

The intrinsic parameters may be determined by an algorithm that varies the intrinsic parameters until an optimum is found. The different parameter values may be evaluated using a number of criteria. For example, criteria may include the measure of how straight the lines of the calibration object are in the panorama representation and/or how well camera position and orientation may be determined.

The algorithms that determine the optimal parameters may be executed by any device. For example, the determination may be made by the camera unit, the viewing device, or another device possibly in a remote location. For example, the calibration algorithms may be executed on a web server to which a calibration job can be dispatched.

The determined parameters may be stored on the camera unit, the viewing device, or on another device possibly in a remote location, for example, as long as the parameters are available together with the camera data (e.g., image data) when creating a panorama. For example, the calibration parameters may be stored in the camera unit and may be sent together with the camera and sensor data to the device that creates the panorama.

Fisheye Projection Model

In order to readily accommodate fisheye lenses having fields-of-view (FOV) near 180°, a spherical projection surface may be used. For example, a lens with an FOV near 180° may need only one spherical surface to be projected instead of two planar surfaces. Additionally, the final result of the stitching process may be a spherical mapping of the image captured by all cameras, thus the use of a spherical projection surface may reduce calculations in later steps of the process. In some embodiments, the spherical projection of each camera and the final spherical projection may have a displacement, but both representations may be relatively close.

The projection of a point $p_w=(x_w, y_w, z_w)$ in the world coordinate system into a point $m'=(u, v)$ on the two-dimensional fisheye image may be modeled in four steps. The notation for a point may be given as $p=(x, y, z)$ to represent the equivalent column vector notation $p=[x, y, z]^T$. The steps may proceed as follows:

1. From world coordinate system to camera coordinate system $$p_w = (x_w, y_w, z_w) \to p_c = (x_c, y_c, z_c)$$

2. Projection on the unit sphere $$p_c = (x_c, y_c, z_c) \to p = \langle \gamma, \theta, \phi \rangle \text{ with } \gamma = 1$$

3. Lens distortion to produce the ideal fisheye coordinates $$p = \frac{p_c}{\|p_c\|} \to m = (x, y)$$

where m is on the image plane

4. Affine transformation to produce the actual fisheye image $$m = (x, y) \to m' = (u, v)$$

Step 1: The transformation between the world coordinate system and the camera reference may be modeled with rotation matrix R and a translation vector t such that $$p_c = Rp_w + t$$

All elements of R and t may constitute the extrinsic parameters.

Step 2: The three dimensional point $p_c$ may be projected onto the unit sphere on a ray going through the origin of the camera coordinate system as follows:

$$p = (x, y, z) = \frac{p_c}{\|p_c\|} = (\sin\Phi\cos\theta, \sin\Phi\sin\theta, \cos\Phi)$$

That ray may be fully described by the two angular components of the spherical coordinate system $\langle \theta, \phi \rangle$. The angles may be computed as $$\theta = \arctan\left(\frac{y}{x}\right)$$

$$\Phi = \arccos(z)$$

The angle $\theta$ may represent the longitude angle with respect to the x axis, and the angle @ may represent the latitude with respect to the polar axis z.

Step 3: The fisheye distortion model D may describe the optical projection occurring in the real camera, but under idealized circumstances such as perfect parallelism between the image projection plane and the xy-plane, and the principal axis crossing the origin of the xy-plane.

$$m = (x, y) = (\gamma L \theta) = D(p) = D(\langle \theta, \Phi \rangle)$$

FIG. 33(a) shows an ideal fisheye projection (top view of the spherical coordinate system), and FIG. 33(b) shows a corresponding spherical perspective image, according to an embodiment of the invention. Here $r=\sqrt{x^2+y^2}$ and $\theta=\arctan(y/x)$. The current distortion model may treat the tangential $D_T$ and radial $D_R$ components separately as polynomials with no offset term as follows:

$$r = D_R(\Phi) = \sum_{i=1}^{5} d_i \Phi^i$$

$$\theta = D_T(\theta) = \sum_{i=1}^{5} b_i \theta^i$$

where $d_i$ are the radial and $b_i$ the tangential distortion parameters.

In some embodiments the radius of the fisheye may be unknown, since the complete surface of the sensor may be covered by the projection and hence the fisheye circle is not visible. Furthermore, the field of view of the lens may not be precisely known. Therefore, the calibration may not restrict the coefficients $d_i$ of the radial distortion and may estimate all five coefficients.

For the tangential distortion, continuity of the distortion $D_T$ and its derivative $D'_T$ may be assumed, that is:

$$D_T(0) = 0$$
$$D_T(2\pi) = 2\pi$$
$$D'_T(0) = D'_T(2\pi)$$

which may be used to obtain:

$$b_4 = \frac{5(1-b_1) - 3(2\pi)b_2 - 2(2\pi)^2 b_3}{(2\pi)^3}$$

-continued $$b_5 = \frac{b_1 + b_2\pi + b_3\pi^2 - 1}{(4\pi)^4}$$

Three parameters for the tangential distortion may remain.

Step 4: By using homogeneous coordinates, the last step may be expressed in terms of a linear transformation as follows:

$$\hat{m}' = K_A \hat{m}$$

where the homogeneous points $\hat{m}'=(u, v, 1)$ and $\hat{m}=(x, y, 1)$ are extensions on an additional unitary component of the Euclidean points m'=(u, v) and m=(x, y), as may be customary in the projective geometry. Additionally, the affine transformation matrix $K_A$ may be defined as follows:

$$K_A = \begin{bmatrix} a & s & u_0 \\ 0 & 1 & v_0 \\ 0 & 0 & 1 \end{bmatrix}$$

The skew s, pixel aspect ratio a, and image center $(u_0, v_0)$ may be among the intrinsic parameters to be estimated during the calibration process.

The calibration process may determine twelve extended intrinsic parameters: five for radial distortion ($d_i$, i=1 ... 5), three for the tangential distortion ($b_j$, j=1 ... 3), and four for the affine transformation a, s, $u_0$, $v_0$.

Inverse Model

The previous model may transform a point in space into a point on the fisheye image. For the calibration process, the opposite process may be performed. Given a point on the fisheye image, the ray originating at the coordinate system of the camera that contains the corresponding space point may be determined. This may involve the following steps:

1. Map m' to m by mapping their homogeneous versions as follows:

$$K_A^{-1} = \begin{bmatrix} \frac{1}{a} & \frac{-s}{a} & \frac{sv_0 - u_0}{a} \\ 0 & 1 & -v_0 \\ 0 & 0 & 1 \end{bmatrix}$$

2. Reverse the lens distortion using the following:

$$\Phi = D_R^{-1}(r)$$

$$\Theta = D_T^{-1}(\theta)$$

Since the polynomials $D_R(\phi)$ and $D_T(\Theta)$ have no closed-form inverses, look-up tables (LUT) may be pre-computed to approximate them. There may be one LUT for $D_R^{-1}(\phi)$ and another for $D_T^{-1}(\Theta)$, and one pair for each camera. All LUTs may be computed for each camera in the mobile device, because the camera parameters may vary between cameras and spheres. To enable rapid computation, an approximation method may be used.

Great Circle Fitting

In order to find the intrinsic model, it may be necessary to define an objective function to be minimized. This may be done based on sampled points of several image curves depicting space lines on the fisheye image. Every straight line in space and the point at the origin of the camera coordinate system may span one single plane, which may always cut the spherical projection surface in a circle. The normal of a plane may be found that, projected back to the fisheye image, produces the smallest error on the set of markers of the corresponding line. This process is known as great circle fitting.

Let $\langle \alpha, \beta \rangle$ be the directional angles of the normal of the plane containing both the great circle and the origin of the camera coordinate system (e.g., FIG. 33(b)). The normal may thus be n=(sin $\alpha$ cos $\beta$, sin $\alpha$ sin $\beta$, cos $\alpha$). The distance d from a spherical point p and the plane $\langle \alpha, \beta \rangle$ may therefore be $$d = |p^T n|$$

The problem of great circle fitting may reduce to the minimization of the sum of squares of distances between N known spherical points pi and the plane.

$$F(n) = \sum_{i=1}^{N} (p_i^T n)^2$$

Each spherical point $p_i$ may be generated from a landmark $l_i$) depicted on the fisheye image, using the inverse projection model described in the previous section.

The solution of the fitting problem may be found noticing that for a matrix A containing all spherical points A= $[p_1, p_2, \ldots, p_N]^T$, if all those points belong to the great circle then An=0. Hence, $$F(n) = \sum_{i=1}^{N} (p_i^T n)^2$$

may be rewritten as $$F(n) = (An)^t An = n^T(A^T A)n = n^T B n$$

The solution n may be the eigenvector of B corresponding to the smallest eigenvalue.

Objective Function

The previous section described a way to compute the normal of the plane closest to all sphere points corresponding to the set of landmarks of the image of a space straight line depicted on the fisheye image.

Let now L be the number of image curves on the fisheye image, depicting space straight lines, and let $N_j$ (j=1, ..., L) be the number of landmarks on the j-th image curve. Let $m'_{i,j}$ represent the i-th landmark on the j-th image curve. Those landmarks may be projected into the sphere with:

$$p_{i,j} = D^{-1}(K_A^{-1}(m'_{i,j}))$$

where the functional notation $K_A^{-1}(\bullet)$ may denote the transformations to and from homogeneous coordinates.

The objective function may be defined as $$E(\rho) = \sum_{j=1}^{L} F(n_j) = \sum_{j=1}^{L} \left[ \sum_{i=1}^{N_j} (p_{i,j}^T n_j)^2 \right]$$

with $n_j$=(sin $\alpha_j$ cos $\beta_j$, sin $\alpha_j$ sin $\beta_j$, cos $\alpha_j$) the normal vector for the plane containing the best t great circle of the j-th line, and $$\rho = [a, s, u_0, v_0, d_1, d_2, d_3, d_4, d_5, b_1, b_2, b_3]^T$$

Optimization Process

The optimization process may use a multi-objective hybrid optimization approach, which may avoid issues arising from a lack of knowledge of the radius of the fisheye image and field of view of the lenses and/or from difficulty of computation of an algebraic derivation of the gradient of the error function or a numerical approximation thereof.

The disclosed systems and methods may use a genetic optimization process, in which through mutation and crossover of the previously best initialization points, new possible better solutions may be generated. Each point so generated may be used as seed of a deterministic downhill-simplex optimization. Even though this method may have a slow convergence, it may provide a low risk of stopping at saddle points or local maxima due to its reliance on the function value only (i.e., no gradient required).

The method may be multi-objective, which means not only the error function E is optimized, but other criteria such as the achievable field of view of the lens, the skewness, or aspect ratio of the pixels may be inserted in the optimization process.

Evaluation may be performed using the Pareto front. The aggregate fitness function F for a model A with the parameterization $\rho$, evaluated using as reference the ground truth data G may be defined as $$F(A_\rho, G) = \psi(f_1(A_\rho, G), \ldots, f_n(A_\rho, G))$$

with the individual fitness functions $f_i(A_\rho, G)$ defined to increase monotonically with the fitness of some particular aspect of the model's behavior. All components $f_i$ may span a multidimensional fitness space, where each point may represent the performance of the model $A_\rho$, parameterized with one point $\rho$ in a parameter space.

Figure 34:
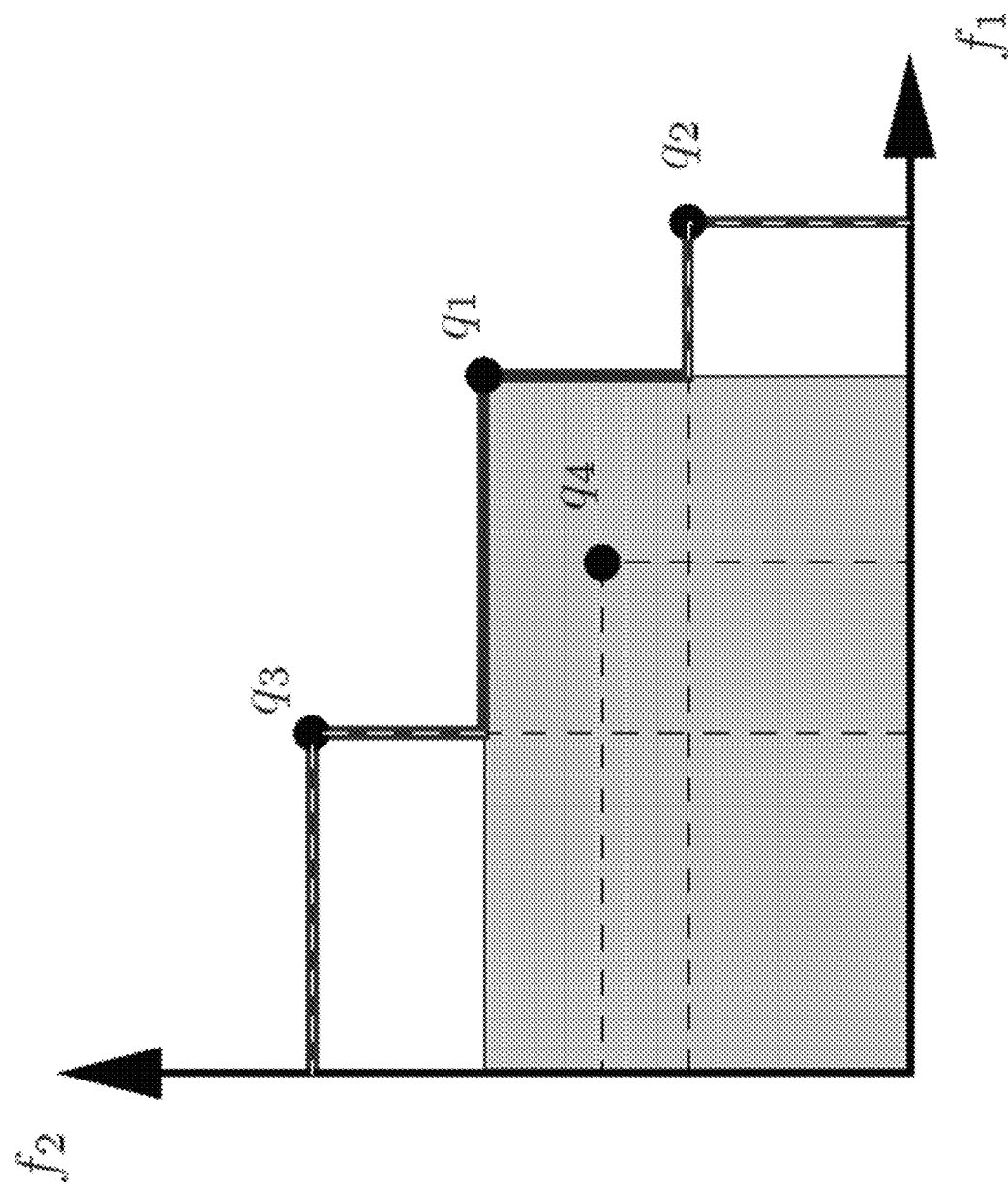
FIG. 34 is a Pareto front according to an embodiment of the invention.

The general form of $\psi$ may be assumed unknown, but it may be known to increase monotonically with increasing values of all fitness functions $f_i$. This condition may ensure that a point in the fitness space may be considered fitter than all other points with smaller values in all dimensions. FIG. 34 is a Pareto front according to an embodiment of the invention. The point $q_1$ dominates the region highlighted with a gray rectangle. Dashed lines delimit the dominated regions of the points $q_2$, $q_3$, and $q_4$. The thick solid line represents the Pareto front for the four points. In FIG. 34, for example, the point q may be fitter than the point $q_4$ and all other elements within the rectangle. In this context, the point $q_1$ may be said to dominate $q_4$. All non-dominated points in a set may define the Pareto front of that set. In the example of FIG. 34 this front may be defined by the points $q_1$, $q_2$, and $q_3$. Choosing a parameterization that is not in the Pareto front may be a bad choice since there is another point on the front with a better aggregate fitness.

The previous concepts may be expressed mathematically using the following equation:

$$\hat{p} = \{(\langle \rho \in P_A, f(A_\rho, G) \rangle) | \nexists v \in P_A : f(A_v, G) > f(A_\rho, G)\}$$

where $\hat{p}$ is the Pareto front, f is the vector of fitness functions $[f_1, \ldots, f_n]^T$, and $P_A$ is the parameter space of the model A. The partial ordering relation ">" on f may describe the domination property and may be defined as:

$$f(A_v, G) > f(A_\rho, G) \Leftrightarrow \forall i : f_i(A_v, G) \geq f_i(A_\rho, G) \land$$
$$\exists i : f_i(A_v, G) > f_i(A_\rho, G)$$

Any algorithm that finds the Pareto front for a set of fitness points may implement the two preceding equations. In one example, the algorithm/model is the fisheye projection model. The parameter spaced may be spanned by the twelve parameters of the model ρ. The five dimensional fitness space may be spanned by the inverse of the error function $E(\rho) = \Sigma_{j=1}^L F(n_j) = \Sigma_{j=1}^L [\Sigma_{i=1}^{N_j} (p_{i,j}^T n_j)^2]$, the skewness and squaredness of a pixel, and the vertical and horizontal fields of view, which are described in detail in the next section.

Since the parameter space $P_A$ may contain an infinite number of parameterizations, the next problem may involve choosing a representative set of samples from $P_A$ such that their Pareto front can be assumed to be a reliable approximation of the exact front extracted for the complete space.

One approach may be to regularly sample the values of each parameter, since the number of necessary evaluations may increase exponentially with the number of parameters. For example, an algorithm with 12 parameters, each sampled five times, would require $5^{12}$ evaluations. Since a single evaluation may comprise computations for a complete data set, the time requirements for this approach may be great, even for a coarse sampling of the parameter space.

In another approach, the multi-objective evolutionary algorithm PESA (Pareto Envelope-based Selection Algorithm) may be used with modifications for the estimation of the population density. Furthermore, a decaying mutation rate may ensure a large coverage of the parameter space during the first generations of the genetic algorithm (decaying mutation rates), which may be similar to the simulated annealing optimization process.

The genetic algorithm may be used to find initial points in the parameter space to start a downhill-simplex optimization process. The parameters stored in the Pareto front may be those resulting after the deterministic optimization, instead of the initial points generated by mutation or crossover. This approach may avoid computation of useless parameterizations and may concentrate the analysis on those regions of the parameter space that provide promising results. The deterministic optimization step may ensure that local minima are considered in the search.

Even if this algorithm also samples the parameter space, the resolution used for each parameter may be high (e.g., 232 samples per parameter). The number of evaluations required may be proportional to the number of bits used to represent the complete parameterization.

Multi-objective optimization algorithms (including PESA) may try to find the front containing parameterizations best optimized for the reference (golden) data set G, which in this case may comprise all landmarks in the fisheye images, corresponding to straight lines in space. Hence, the evaluation may use representative data taken from the application context.

Since some systems (e.g., the throwable ball) may use several cameras, the optimization model may employ one further step. Three example options are provided:
1. Estimation of the parameters of each camera, independently of the others.
2. Joint estimation of the parameters for all cameras.
3. Joint estimation of the parameters for all cameras, except the principal points of each camera $i(u_0, v_0)_i$.

Fitness functions may be used in the genetic approach. Some of the previous definitions are error functions, which may be mapped into fitness functions. A main fitness function may be related to the error of the lines defined above. The line fitness may be defined as $f_l = e^{-E(\rho)}$
which may constrain the fitness between 0.0 and 1.0.

Figure 35:
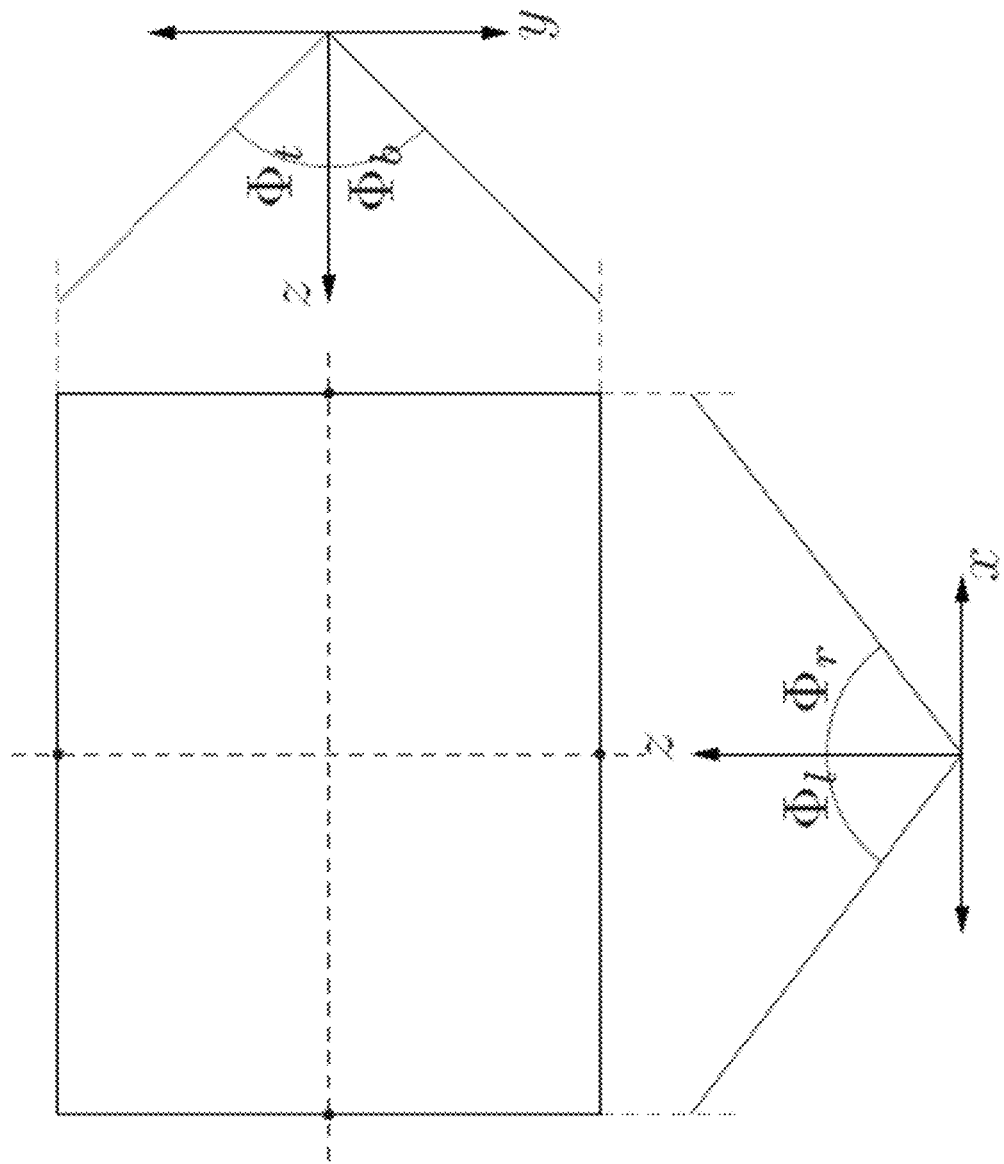
FIG. 35 is a field-of-view computation according to an embodiment of the invention.

FIG. 35 is a computation of the effective HFOV and VFOV from inversely mapped points at the top, bottom, left, and right sides of the fisheye image according to an embodiment of the invention. Genetic evolution may achieve a reduction of the line error by reduction of the vertical and horizontal fields of view. Hence, the horizontal (HFOV) and vertical (VFOV) fields of view may be used directly as fitness measures in the multi-objective optimization approach. The fields of view may be computed using the inverse mapping discussed above, taking for the VFOV the φ angles of the upper and lower horizontally centered points and for HFOV the φ angles of the right and left vertically centered points of the fisheye image, as shown in FIG. 35, for example. Hence, $$VFOV = |\Phi_b| + |\Phi_t|$$
$$HFOV = |\Phi_l| + |\Phi_r|$$

Even though an exact computation may require the computation of those angles for all the border pixels, this approximation may be faster to compute.

The skew and aspect ratio may also achieve a reduction of the line error.

Therefore, two additional fitness measures may be used to force the squareness and skewless-ness of the pixels. These measures may be directly related to the coefficients a and s of the matrix $K_A$ as described above.

The factor a may be related to the squareness of the pixels. The closer a is to 1.0, the closer is the shape to a square. Otherwise, the shape may be distorted in rectangles.

$$f_{sq} = \exp\left(\frac{-\max(a, 1)}{\min(a, 1)}\right)$$

The skewlessness fitness may be defined as:

$$f_{sk} = \exp(-s^2)$$

The optimization may fix whether a=1 and s=0 (perfectly squared pixels) and may optimize HFOV and VFOV, or may only optimize a and s, restricting them to values close to one and zero, respectively.

Extrinsic Calibration

Extrinsic calibration may find the rotation and translation between each camera coordinate system and a reference coordinate system. Like intrinsic calibration, extrinsic calibration may be performed using a calibration object. Using the data of different views of the calibration object, the parameters may be derived.

The extrinsic parameters may be determined by identifying the intersections of lines in the calibration object. The position of these intersections in the calibration object may be known. If two or more of these crossings are visible in a camera image, the position and orientation of the camera may be calculated. When this is done for all cameras using the same view of the calibration object, the camera positions and orientations relative to each other may be derived.

The algorithms that determine the optimal parameters may be executed by any device. For example, the determination may be made by the camera unit, the viewing device, or another device possibly in a remote location. For example, the calibration algorithms may be executed on a web server to which a calibration job can be dispatched.

The determined parameters may be stored on the camera unit, the viewing device, or on another device possibly in a remote location, for example, as long as the parameters are available together with the camera data (e.g., image data) when creating a panorama. For example, the calibration parameters may be stored in the camera unit and may be sent together with the camera and sensor data to the device that creates the panorama.

Ideal Calibration

Let $p_i$ be a point in the i-th camera coordinate system and $p_s$ be the same point in the reference coordinate system of the sphere. The mapping may be $$p_s = R_{is} p_i + t_{is}$$

where $R_{is}$ is the rotation matrix and $t_{is}$ is the translation vector between the origins of both coordinate systems.

Figure 36:
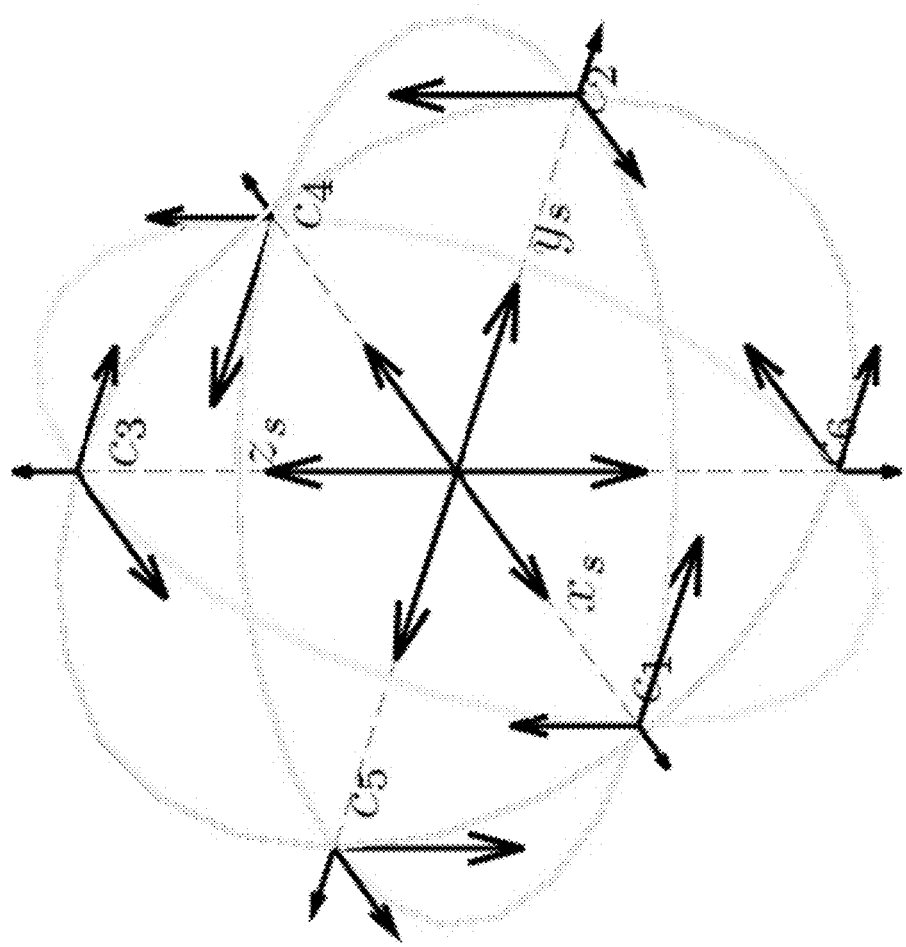
FIG. 36 is a configuration of six cameras on a sphere according to an embodiment of the invention.

FIG. 36 is a configuration of six cameras on a sphere according to an embodiment of the invention. The shortest axis may represent the z axis of the camera coordinate system, which may always be perpendicular to the sphere centered at the reference coordinate system. The largest vector on each camera center may represent the x axis. Note the alternation between adjacent cameras of the x axis. Camera $i \in \{1, 2, 3\}$ may be opposite to camera i+3. The reference coordinate system may be denoted in the figure with longer vectors. The directions of the x-axis vectors may alternate between adjacent cameras, i.e., the x-axes between adjacent cameras may always be perpendicular to each other. Similarly, the directions of the y-axis vectors may alternate between adjacent cameras, i.e., the y-axes between adjacent cameras may always be perpendicular to each other.

Assuming perfect alignment of the six cameras, the transformations between the six coordinate systems may be as follows:

$$R_{1s} = \begin{bmatrix} 0 & 0 & +1 \\ +1 & 0 & 0 \\ 0 & +1 & 0 \end{bmatrix}$$

$$t_{1s} = [r00]^T$$

$$R_{2s} = \begin{bmatrix} 0 & +1 & 0 \\ 0 & 0 & +1 \\ +1 & 0 & 0 \end{bmatrix}$$

$$t_{2s} = [0r0]^T$$

$$R_{3s} = \begin{bmatrix} +1 & 0 & 0 \\ 0 & +1 & 0 \\ 0 & 0 & +1 \end{bmatrix}$$

$$t_{3s} = [00r]^T$$

$$R_{4s} = \begin{bmatrix} 0 & 0 & -1 \\ -1 & 0 & 0 \\ 0 & +1 & 0 \end{bmatrix}$$

$$t_{4s} = [-r00]^T$$

$$R_{5s} = \begin{bmatrix} 0 & +1 & 0 \\ 0 & 0 & -1 \\ -1 & 0 & 0 \end{bmatrix}$$

$$t_{5s} = [0 - r0]^T$$

$$R_{6s} = \begin{bmatrix} -1 & 0 & 0 \\ 0 & +1 & 0 \\ 0 & 0 & -1 \end{bmatrix}$$

$$t_{6s} = [00 - r]^T$$

Calibration Cage

In the embodiments described herein, the detection of lines may simplify the calibration processes due to the great circle fitting described above. The fixed structure of the calibration cage may allow calibration to relate the transformations between the camera systems and may allow calibration of fisheye lenses (which may have difficulty detecting chessboard patterns used for calibration of lenses for which the pinhole camera or thick-lens model are sufficient).

Figure 37:
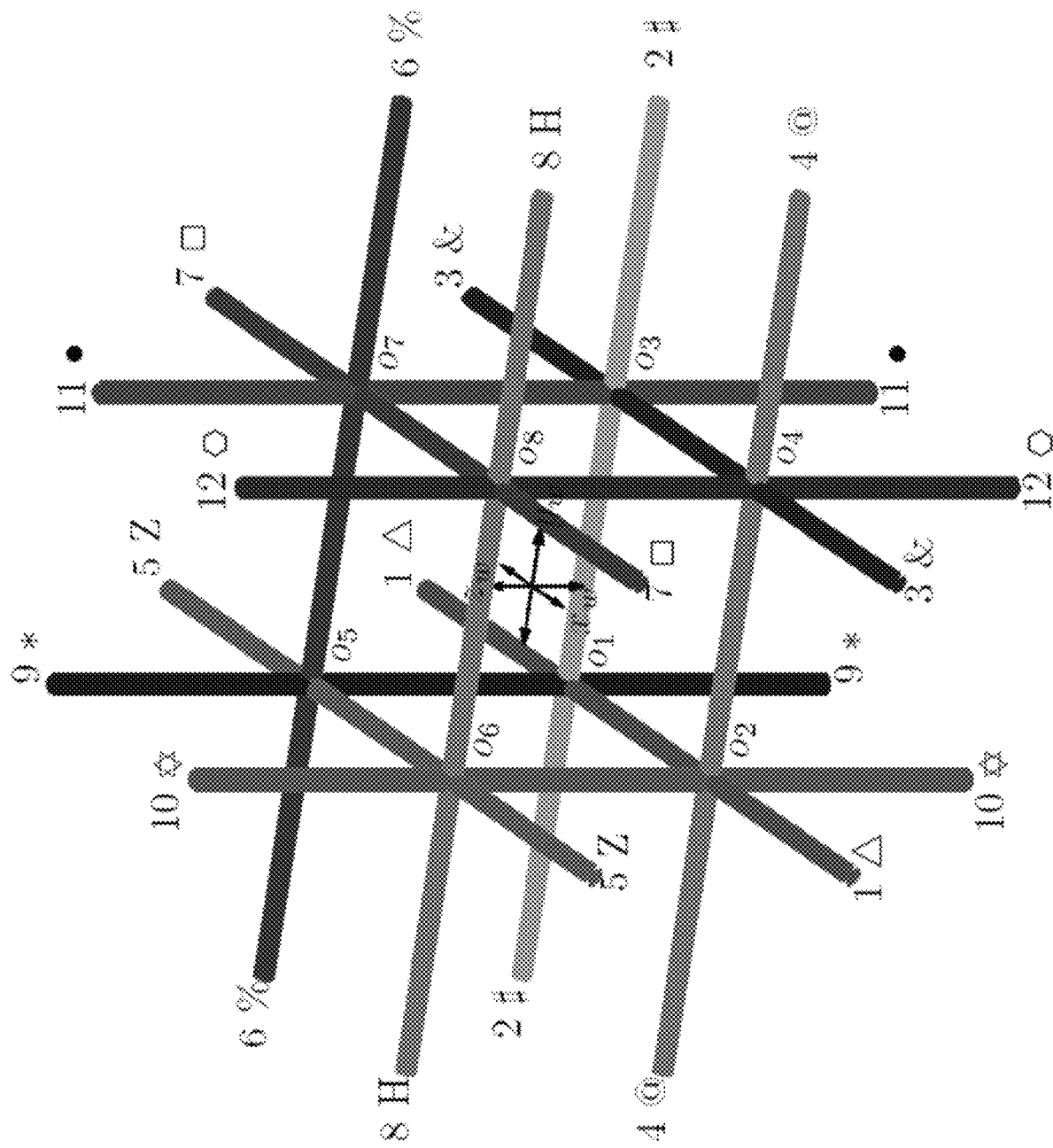
FIG. 37 is a calibration cage according to an embodiment of the invention.

The basic structure of the calibration cage according to some embodiments is shown in FIG. 37. The calibration cage may include twelve tubes (numbered from 1 to 12 in the figure), giving origin to eight coordinate systems (labeled as $o_i$, with i=1 ... 8. The length of the tubes may be 1.5 m, for example, which may be long enough to cover large areas on the image. If the sphere is placed on the inner cube, then all six cameras may capture lines. Small rotations and translations of the sphere may shift and rotate the projected lines in the images, which may aid in the process of calibration of the intrinsic parameters. If the global coordinate system is placed on the center of the calibration cage, then the position of all twelve axes is known, as well as the positions of the eight coordinate systems. This knowledge may suffice for the proper extrinsic calibration.

Method for Extrinsic Calibration of One Camera

Let $p_{wi}$ be a point on the i-th coordinate system of the cage. That point may be mapped into the c-th camera coordinate system with $$p_c = R_{wic} p_{wi} + t_{wic}$$

The three axes of the cage coordinate system may be generated parametrically with $\lambda \in \mathbb{R}$ as $$p_x = \begin{bmatrix} \lambda \\ 0 \\ 0 \end{bmatrix} \quad p_y = \begin{bmatrix} 0 \\ \lambda \\ 0 \end{bmatrix} \quad p_z = \begin{bmatrix} 0 \\ 0 \\ \lambda \end{bmatrix}$$

The origin of the coordinate system may be mapped into the spherical projection surface at a direction $$s_0 = \frac{t_{wic}}{\|t_{wic}\|}$$

Figure 38:
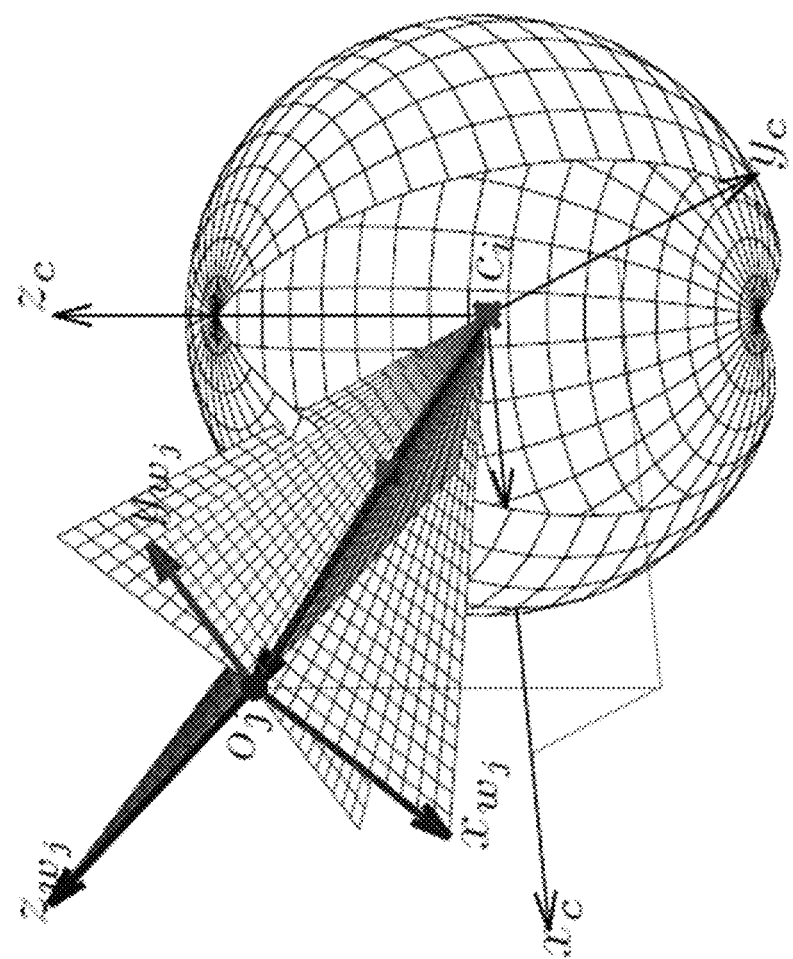
FIG. 38 is a set of intersections of planes passing through axes of one cage coordinate system and the origin of the camera coordinate system according to an embodiment of the invention.

FIG. 38 is a set of intersections of planes passing through axes of one cage coordinate system and the origin of the camera coordinate system according to an embodiment of the invention. As described previously, since each cage axis is a straight line in space, it may be projected as a big circle onto the ideal fisheye image, generated as the intersection of the spherical projection surface and the plane containing that axis of the cage coordinate system and the origin of the camera coordinate system. The line going through the origin of both the coordinate system of the camera and the i-th coordinate system of the cage (e.g., FIG. 25 where i is the camera number and j is the coordinate system number) may be parallel to the vector $t_{wic}$. That line may be contained on all three planes, each containing one of the three axes of the i-th cage coordinate system and the camera's origin. Therefore, the normals to those planes may also be perpendicular to $t_{wic}$. Let $n_x$, $n_y$, and $n_z$ represent the normals of the planes containing the x, y, and z-axes of the cage coordinate system, respectively. It may follow $$n_x^T t_{wic} = n_y^T t_{wic} = n_z^T t_{wic} = 0$$

Additionally, due to the properties of the cross product it may follow $$s_0 = \frac{t_{wic}}{\|t_{wic}\|} = \gamma_x \frac{n_x \times n_y}{\|n_x \times n_y\|} = \gamma_y \frac{n_x \times n_z}{\|n_x \times n_z\|} = \gamma_z \frac{n_y \times n_z}{\|n_y \times n_z\|}$$

where $\lambda_j = \pm 1 (j \in \{x, y, z\})$ is chosen such that the z component of $s_0$ is positive. This factor may be useful since each plane has two valid normals, one on each side, and it may not be known which normal is computed from the image data.

Let the rotation matrix be expressed in terms of its column vectors $r_i$:

$$R_{wic} = [r_1 r_2 r_3]$$

Since all rotation matrices may be orthonormal, it may follow that $R_{wic}^T R_{wic} = 1$, or for the column vectors $$r_i^T r_j = \begin{cases} 0 & \text{for } i \neq j \\ 1 & \text{for } i = j \end{cases}$$

Using $p_c = R_{wic} p_{wi} + t_{wic}$, each axis of the i-th cage coordinate system may be projected into the camera coordinate system as $$p_{cx} = \lambda r_1 + t_{wic}$$
$$p_{cy} = \lambda r_2 + t_{wic}$$
$$p_{cz} = \lambda r_3 + t_{wic}$$

Since $n_x$ is the normal of the plane passing through the x-axis of the i-th cage coordinate system and the origin of the camera coordinate system, then it may follow $$n_x^T p_{cx} = n_x^T (\lambda_1 + t_{wic}) = 0$$
$$\lambda n_x^T r_1 + n_x^T t_{wic} = 0$$

Considering $n_x^T t_{wic} = n_y^T t_{wic} = n_z^T t_{wic} = 0$, the second term may be zero, therefore $$\lambda n_x^T r_1 = 0$$

Similarly, for the y and z axes of the i-th cage coordinate system $$\lambda n_y^T r_2 = 0$$
$$\lambda n_z^T r_3 = 0$$

These observations may allow the optimization function for the rotation matrix to be stated as $$E(R_{wic}) = (n_x^T r_1)^2 + (n_y^T r_2)^2 + (n_z^T r_3)^2$$

under the constraints $$\|r_1\| = \|r_2\| = \|r_3\| = 1$$

The normals may be known, since they can be computed from the markers representing the axis by $F(n) = (An)^t An = n^T (A^T A) n = n^T B n$. However, since there may be an intrinsic duality in the estimation of the direction of each axis, further consideration may be given.

The optimization process may ensure the orthonormality of $R_{wic}$ and the proper chirality, since the mapped coordinate system may still be a right-handed one. Both conditions may be fulfilled if the rotation matrix is parameterized by the Rodrigues formula in terms of a rotation axis $k = [k_x, k_y, k_z]^T$, $\|k\| = 1$ and a rotation angle $\theta$:

$$R_{wic}(k, \theta) = I + \sin\theta [k]_X + (1 - \cos\theta)(kk^T - I)$$
$$I + \sin\theta [k]_X + (1 - \cos\theta) k_x^2$$

where I is the 3×3 identity matrix, $kk^T$ is the outer product of k with itself and $[k]_x$ is the matrix representation of the cross product with k on the left side:

$$[k]_X = \begin{bmatrix} 0 & -k_z & k_y \\ k_z & 0 & -k_x \\ -k_y & k_x & 0 \end{bmatrix}$$

The magnitude of the rotation axis k may be irrelevant, so two angles ($\alpha$, $\beta$) may suffice for its description:

$$k = [k_x, k_y, k_z]^T = [\sin\alpha\cos\beta, \sin\alpha\sin\beta, \cos\alpha]^T$$

Hence, the rotation matrix may have three degrees of freedom ($\alpha$, $\beta$, $\theta$).

The previous observations estimate a rotation matrix $R_{wic}$ and $s_0$; however, these estimations may be ambiguous. It may be possible to rotate on any of the plane normals using an angle that aligns the other axes on the opposite planes (this is related to the ambiguity of the 2D dimensional projection of a 3D cube). In other words, the proposed optimization function that uses only one coordinate system of the cage may be under-determined, and the optimization may have several possible global minima. Additional constrains may be used to reduce this ambiguity, and the chosen structure of the cage may be useful for this task. If two coordinate systems of the cage are visible simultaneously, and the parallel corresponding axes are known, then 5 axes may be available for the optimization function. 5 axes may provide enough constraints to force a unique global minimum of the optimization function.

Let $p_{wj}$ be the a point in the j-th cage coordinate system, adjacent to the i-th one. If both coordinate systems are aligned, then $$p_{wi} = p_{wj} + t_{ji}$$

where $t_{ji}$ is the displacement vector between both coordinate systems. Then, mapping a point in the j-th cage coordinate system onto the camera coordinate system may be given by $$p_c = R_{wic} p_{wi} + t_{wic}$$
$$R_{wic}(p_{wj} + \delta_{ji}) + t_{wic}$$
$$R_{wic} p_{wj} + (R_{wic}\delta_{ji} + t_{wic})$$

where it is clear that the rotation matrix may be the same for both projections.

Following the previous steps, the optimization function may be restated as $$E(R_{wic}) = \left(n_{ix}^T r_1\right)^2 + \left(n_{iy}^T r_2\right)^2 + \left(n_{iz}^T r_3\right)^2 + \left(n_{jx}^T r_1\right)^2 + \left(n_{jy}^T r_2\right)^2 + \left(n_{jz}^T r_3\right)^2$$

where $n_{i\xi}$ are the normals of the planes including the axes $\xi \in \{x, y, z\}$ of the i-th cage coordinate system, and equivalently $n_{j\xi}$ are the normals of the planes including the axes of the j-th coordinate system of the cage. Since one of the axes may be shared between both coordinate systems, it may appear just once in the optimization function without changing the result.

Figure 39:
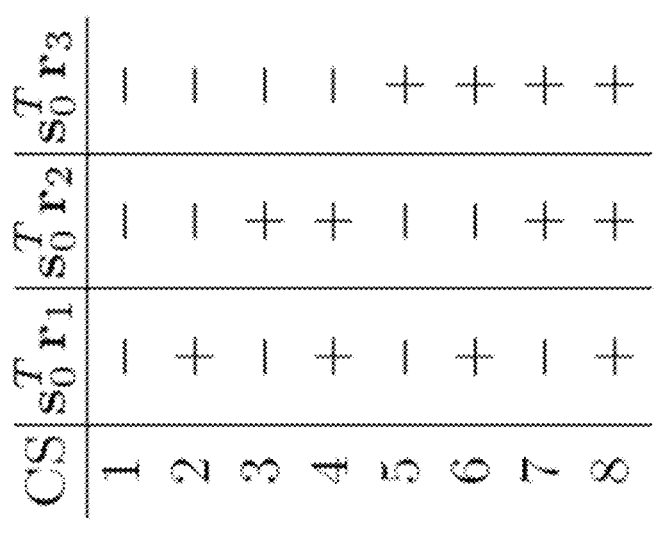

Another ambiguity may be solved. It may be possible to minimize the same function by rotating on 180° on any of the axis. This may keep the chirality of the system and the axes may keep laying on their original planes. Again, the cage structure may be used to solve this ambiguity. Assuming that the sphere is capturing the cage coordinate system within the internal cube, the directional vector $s_0$ may be on particular octants. FIG. 39 is a table of signs of projections of the direction vector on the axes of the cage coordinate systems according to an embodiment of the invention. If $r_1$, $r_2$, and $r_3$ are the first, second, and third columns of the rotation matrix, respectively, then for the coordinate systems labeled in FIG. 38, the scalar products of so with those columns may be as shown in FIG. 39. If these signs are not fulfilled by the columns of the rotation matrix, then their directions may be negated according to the table of FIG. 39.

Find Translation Vector

The translation vector $t_{wic}$ is still only partially determined, as the direction so may already be known as described above.

The estimation of the axis normals may not be perfectly accurate due to inaccuracies in the marker positioning, the quantization of the pixel positions, image noise, etc. It may possible to reduce the estimation error by averaging the terms in the solution to $s_0$:

$$s_0 = \frac{1}{3}\left(\gamma_{ix}\frac{n_{ix} \times n_{iy}}{\|n_{ix} \times n_{iy}\|} + \gamma_{iy}\frac{n_{ix} \times n_{iz}}{\|n_{ix} \times n_{iz}\|} + \gamma_{iz}\frac{n_{iy} \times n_{iz}}{\|n_{iy} \times n_{iz}\|}\right)$$

with the same values of $y_j=\pm 1 (j \in \{x, y, z\})$ chosen such that the z component of so is positive. Note the use of the i-th coordinate in the previous equation.

Equivalently, the direction towards the j-th coordinate system may be computed as $$s_1 = \frac{1}{3}\left(\gamma_{jx}\frac{n_{jx} \times n_{jy}}{\|n_{jx} \times n_{jy}\|} + \gamma_{jy}\frac{n_{jx} \times n_{jz}}{\|n_{jx} \times n_{jz}\|} + \gamma_{jz}\frac{n_{jy} \times n_{jz}}{\|n_{jy} \times n_{jz}\|}\right)$$

Figure 40:
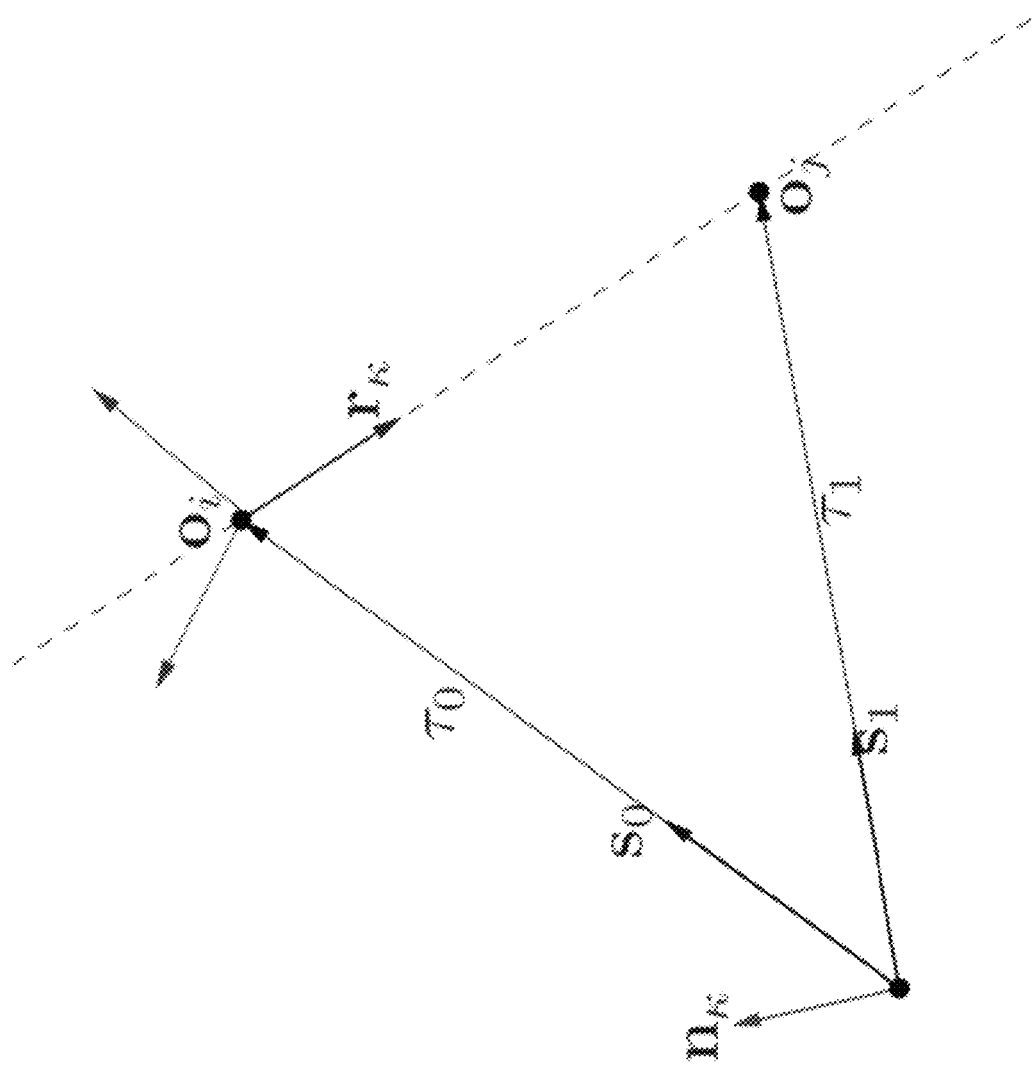
FIG. 40 is a rotation matrix estimation according to an embodiment of the invention.

The distance between the two origins of the cage coordinate systems may be known. The rotation matrix between both cage coordinate systems and the camera coordinate system may be estimated as described above. FIG. 40 is a rotation matrix estimation according to an embodiment of the invention. If the common axis between both cameras is known, then the direction vector of that axis in the camera coordinate system may be given by the corresponding column vector of that rotation matrix. Let $k \in \{x, y, z\}$ represent the common axis between both cage coordinate systems, $r_k$ the corresponding column vector of the rotation matrix, and $n_k$ the normal to the plane corresponding to that axis, which at the same time may include the vectors $s_0$ and $s_1$ (e.g., FIG. 40).

To reduce the effects of the estimation error, let $r_k$ be the normalized projection of $r_k$ on the plane containing $s_0$ and $s_1$:

$$\hat{r}_k = \frac{r_k - r_k^T n_k}{\|r_k - r_k^T n_k\|}$$

Let A be the distance between the origins of both coordinate systems $o_i$ and $o_j$. Hence $$o_j - o_i = A\hat{r}_k$$

Since $o_i=\tau_0 s_0$ and $o_j=\tau_1 s_1$, which can be written in matrix form as $$[-s_0 s_1]\begin{bmatrix} T_0 \\ T_1 \end{bmatrix} = A\vec{r}_k$$

which may be an overdetermined system that may be solved under error minimization with SVD.

Relating All Cameras

Each camera may be related to one coordinate system of the cage. Since the relative positions of all coordinate systems of the cage may be known, it may be possible to find the relationships among the cameras of the sphere, which is the final goal of the extrinsic calibration.

Let all eight coordinate systems of the cage be identically oriented, as shown in FIG. 37, for example. Parallel to $x_w$ are the axes 1, 3, 5, and 7; parallel to $y_w$ are the axes 2, 4, 6, and 8; parallel to $z_w$ are the axes 9, 10, 11, and 12. With these restrictions, all camera coordinate systems may be related to the common cage reference system by a translation vector. If $p_{wi}$ represents a point in the i-th coordinate system of the cage, then the same point in the cage reference coordinate system may be given by $$p_w = I p_{wi} - \delta_i$$

Let $\delta_x$, $\delta_y$, $\delta_z$ be the distances between origins of the coordinate systems in the x, y, and z directions respectively. So, the translation vectors may be given by $$\delta_1 = \begin{bmatrix} -\delta_x/2 \\ -\delta_y/2 \\ -\delta_z/2 \end{bmatrix} \quad \delta_2 = \begin{bmatrix} +\delta_x/2 \\ -\delta_y/2 \\ -\delta_z/2 \end{bmatrix} \quad \delta_3 = \begin{bmatrix} -\delta_x/2 \\ +\delta_y/2 \\ -\delta_z/2 \end{bmatrix} \quad \delta_4 = \begin{bmatrix} +\delta_x/2 \\ +\delta_y/2 \\ -\delta_z/2 \end{bmatrix}$$

$$\delta_5 = \begin{bmatrix} -\delta_x/2 \\ -\delta_y/2 \\ +\delta_z/2 \end{bmatrix} \quad \delta_6 = \begin{bmatrix} +\delta_x/2 \\ -\delta_y/2 \\ +\delta_z/2 \end{bmatrix} \quad \delta_7 = \begin{bmatrix} -\delta_x/2 \\ +\delta_y/2 \\ +\delta_z/2 \end{bmatrix} \quad \delta_8 = \begin{bmatrix} +\delta_x/2 \\ +\delta_y/2 \\ +\delta_z/2 \end{bmatrix}$$

and the inverse transformation from the reference system to one particular cage system may be given by $$p_{wi} = p_w - \delta_i$$

The relationship of a cage coordinate system and the c-th camera was given above as $$p_c = R_{wic} p_{wi} + t_{wic}$$

Combining the previous results:

$$p_c = R_{wic}(p_w - \delta_i) + t_{wic}$$

$$R_{wic} p_w + (t_{wic} + R_{wic}\delta_i) + t_{wic} R_{wic} p_w + t_{wc}$$

with $t_{wc} = t_{wic} - R_{wic}\delta_i$. Let $t_{cw} = -R_{wic}^{-1} t_{wc} = \delta_i - R_{wic}^{-1} t_{wic}$. Inverting the previous relationship:

$$p_w = R_{wic}^{-1} p_c - R_{wic}^{-1} t_{wc} R_{wic}^{-1} p_c + t_{cw}$$

Hence, two known points in the cage reference system $p_w^{(1)}$ and $p_w^{(2)} = p_w^{(1)} + D$ may be transformed into two different camera systems. Assume that $p_w^{(1)}$ is visible from camera $c_\alpha$ and $p_w^{(2)}$ is visible from camera $c_\beta$. From the previous relations:

$$p_{c\alpha}^{(1)} = R_{wic\alpha} p_w^{(1)} + t_{wc\alpha}$$

$$p_{c\beta}^{(2)} = R_{wic\beta} p_w^{(2)} + t_{wc\beta}$$

Taking the last equation may yield $$p_{c\beta}^{(2)} = R_{wic\beta}\left[p_w^{(1)} + D\right] + t_{wc\beta}$$

$$p_w^{(1)} = R_{wic\beta}^{-1} p_{c\beta}^{(2)} - R_{wic\beta}^{-1} t_{wc\beta} - D$$

and inserting this into $p_{c\alpha}^{(1)} = R_{wic\alpha} p_w^{(1)} + t_{wc\alpha}$ may yield $$p_{c\alpha}^{(1)} = R_{wic\alpha}\left[R_{wic\beta}^{-1} p_{c\beta}^{(2)} - R_{wic\beta}^{-1} t_{wc\beta} - D\right] +$$
$$t_{wc\beta}(R_{wic\alpha} R_{wic\beta}^{-1}) p_{c\beta} + (t_{wc\alpha} - R_{wic\alpha} R_{wic\beta}^{-1} t_{wc\beta} - R_{wic\alpha} D)$$

For the particular case D=0, both points $p_w^{(1)}$ and $p_w^{(2)}$ may be the same, and $$p_{c\alpha} = (R_{wic\alpha} R_{wic\beta}^{-1}) p_{c\beta} + (t_{wc\alpha} - R_{wic\alpha} R_{wic\beta}^{-1} t_{wc\beta})$$

may relate two camera systems.

The previous equation may enable the relation of all camera systems to a common one; for instance, $\alpha=3$, which may be chosen as it is aligned with the sphere system (see FIG. 23, for example).

To obtain the final sphere coordinate system, only a displacement may be missing between the previous, which may be computed using the average of all origins of the six camera coordinate systems as the center of the sphere.

Panorama Creation

A panorama may be created by merging the camera data given the parameters of the cameras. It may be possible to create either a whole panorama (using all available camera data) or only a portion thereof.

The panorama that is created may have multiple representations (e.g., spherical, cubic, cylindrical, etc.). Any of these representations may use raster data in which pixels values are stored. When creating a panorama, these pixel values may be determined. For every pixel in the panorama image, one or multiple source pixel positions in the camera data may be calculated using the parameters of the cameras. These source positions may be calculated when needed or may be pre-calculated for extra performance.

When multiple source positions are available for one target pixel, the pixel values in the source images may be merged by giving each source position a certain weight. The weighting of the pixels may be done in multiple ways. For example, a function based on the distance to the center of a camera may be used to create weight values that "feather" the different images together.

The calculations to create the panorama may be done by any device, for example by the camera unit, the viewing device, and/or a separate device that is possibly on a remote location, as long as the camera data and the parameters of the camera are available.

For example, the panorama may be created on a mobile device. The camera data and parameters may be sent together with sensor data from the camera unit to the mobile device using a WiFi connection. When new data is received, a new panorama may be created and displayed to the user. In the mobile device full panoramas of all camera images may be created using an algorithm implemented in the C++ programming language or some other language, for example.

As different cameras may have different optical centers, parallax issues may arise (e.g., different cameras may have different views on the same object). This may happen more frequently with objects very near to the cameras. Parallax issues may also increase if cameras are not very near to each other. In order to handle the parallax, a virtual sphere (with a center and a radius) may be defined on which parallax issues may be minimized. When a view of an object very near to the cameras is requested, the radius may be adjusted to minimize parallax.

Partial display of the panorama may be handled in a variety of ways. For example, the system may create a complete panorama in memory and only display a portion of it. When a new view is requested, only the displayed portion may be generated. This means the original camera data doesn't need to be merged. Only a new view on the panorama in memory may be made. In another example, the system may create only the portion of the panorama displayed to the user. When a new view is requested, the original camera data may be merged to form the portion of the panorama that is requested. In the former approach, the creation of the whole panorama in memory may take more time and/or processing power than creating only the requested portion. However, a new view on a panorama in memory may be created very quickly. A combination of the two approaches may also be possible.

Panorama creation may be implemented using 3D rendering hardware and software. For example, the hardware and software may use OpenGL or some other rendering protocol, in which the whole panorama may be projected on the inner side of an object. Requesting a new view on the panorama may be delegated to the OpenGL pipeline, which may use hardware accelerated rendering of the view when available. The IMU orientation data may be represented as a quaternion and used to create a rotation matrix which in turn may be added to the OpenGL transformation pipeline to correct the changes in orientation during camera unit movement. For example, an MPU9150 IMU may be used, but any other IMU that supplies orientation information may be used as well. The current view on the panorama may also be outputted using some video signal (for example VGA) for viewing on a separate monitor.

The blending of the several stitched images may be performed by weighting every pixel. In addition to the look up table (LUT) for the distortion, a LUT for the weights of the pixels may be provided. The weight LUT may include information defining how heavily a camera (source) pixel influences the value of the corresponding panorama (destination) pixel. There may be multiple ways to calculate the blending weights. For example, an exponential function based on the distance to the camera image edge may be used. A wider or narrower blending zone between camera images may be achieved by varying the value of the exponent. After all weight LUTs have been initialized, they may be normalized so that every pixel in the panorama has a summed weight of 1. To summarize, the calibration data for each camera may be correlated with image data for an image captured by that camera. Thus, an understanding of each pixel's location may be gained. The images from each camera may then be oriented relative to one another based on the calibration data.

Parallax Effects

Figure 41:
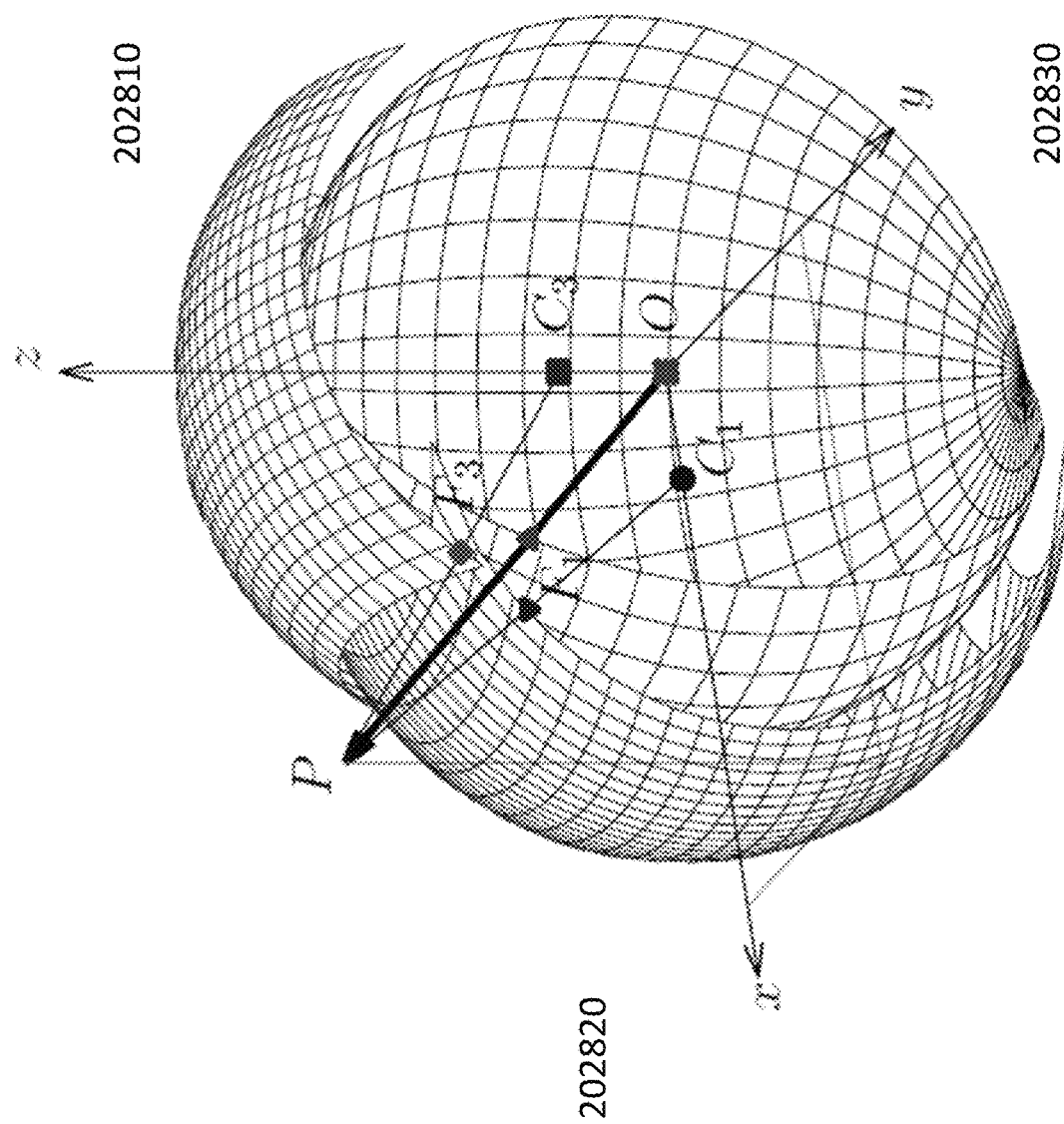
FIG. 41 is a set of landmarks for two fisheye spherical projections on the reference sphere according to an embodiment of the invention.

FIG. 41 shows landmarks for two fisheye spherical projections on the reference sphere. The top surface 202810 may represent the spherical projection of one camera centered on a point $C_3$ in the z axis. The left surface 202820 may represent the spherical projection of another camera centered at $C_1$ on the x axis. The inner surface 202830 may represent the global projection onto which the images captured by both cameras may be mapped (reference sphere centered on O). All spheres have been cut to simplify the visualization of the landmarks.

The creation of panoramas using the example configuration of six cameras on the sphere may allow presupposition of orthogonality on the optical axes. The parallax effect may be studied using only two cameras as shown in FIG. 28, where some landmarks have been placed to be used as reference in the algebraic derivations.

In general, a point $p_i$ on the i-th camera coordinate system may be expressed in spherical coordinates as $p_i=(r_i, \theta_i, \emptyset_i)$, where the directional vector $(\theta_i, \emptyset_i)$ may suffice to describe a point on the fisheye image. The points on the i-th coordinate system may be mapped to a global spherical reference with a rotation $R_{is}$ and a translation $t_{is}$:

$$p_s = R_{is} p_{is} + t_{is}$$

Hence, a point P described in the spherical reference may appear in the fisheye camera.

The general problem may be stated as follows: given a calibrated two-camera configuration, estimate the projection of a point P onto a reference sphere, given the projections of that point in the two fisheye projections. Let $p_i$ be the projection of the point P in the fisheye projection of the camera 1 and $p_2$ be the projection of the same point P in the fisheye projection of the camera 2.

An example solution may be illustrated for the case where the coordinate system of one camera is aligned to the reference coordinate system, but displaced in exactly one axis, and the second camera is orthogonally rotated and displaced. Given the centers $C_3$ and $C_1$ of two fisheye spherical projections with respect to a reference coordinate system centered in O=(0, 0, 0), and given the projections $F_3=(x_3, y_3, z_3)$ and $F_1=(x_1, y_1, z_1)$ of a point P=(x, y, z), a solution may compute point P and its projection onto the reference sphere.

As noted above, some embodiments may perform translation of the coordinate system to place a center point away from the cameras (e.g., at an eye level of a wearer or the like). FIG. 41 shows the projection sphere 202830, center point (O) and camera field of views 202820 and 202810. Moving the virtual center point may be achieved by translating the center point (O) and projection sphere 202830 from the center of camera to the new viewpoint. If the translation from camera center (Pc) to the new virtual viewpoint (Pv) is defined by vector T, they relate as: Pv=Pc+T. Once the center point is modified, the methods described herein to create the panorama from the different images may be applied in similar fashion to how they are applied without translating the center point in other embodiments.

Figure 42:
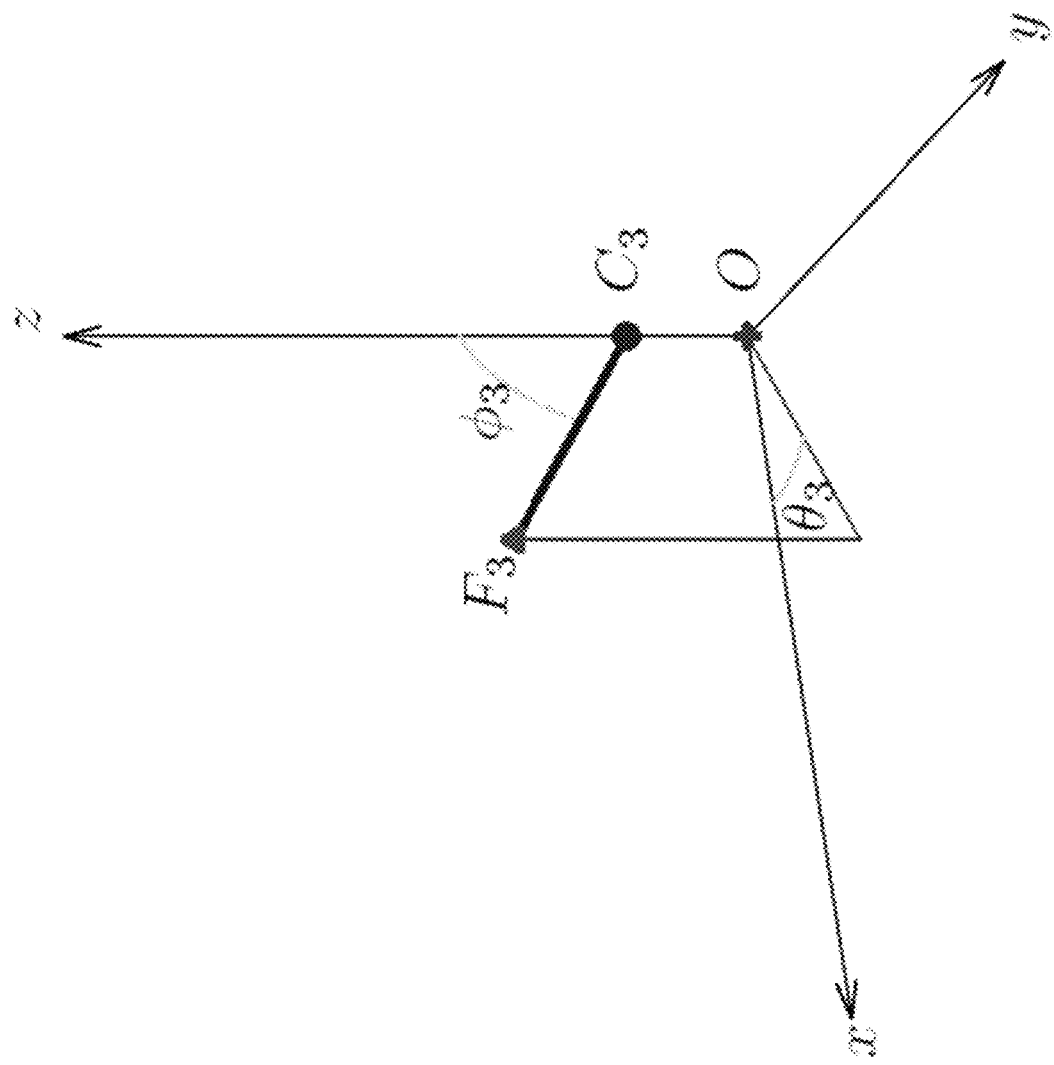
FIG. 42 is a spherical coordinate system according to an embodiment of the invention.

FIG. 42 is a spherical coordinate system centered on S according to an embodiment of the invention. Let O be the center of the reference sphere, $C_3$ the center of the top fisheye spherical projection 202810, and $F_3$ the projection of the point P onto that spherical projection. Using the z-axis as reference of the spherical coordinate system, as shown in FIG. 29 it may follow $$O = (0, 0, 0)$$

$$C_3 = (0, 0, d_3)$$

$$F_3 = (x_3, y_3, z_3) = (r_3\sin\emptyset_3\cos\theta_3,\ r_3\sin\emptyset_3\sin\theta_3,\ r_3\cos\emptyset_3 + d_3)$$

where $r_3 = \|\overrightarrow{C_3F_3}\|$ is the radio of the fisheye spherical projection, $d_3$ is the distance between the center $C_3$ of that sphere and the origin O of the reference coordinate system, $\emptyset_3$ is the latitude coordinate, and $\theta_3$ the longitude for the fisheye projection sphere.

Figure 43:
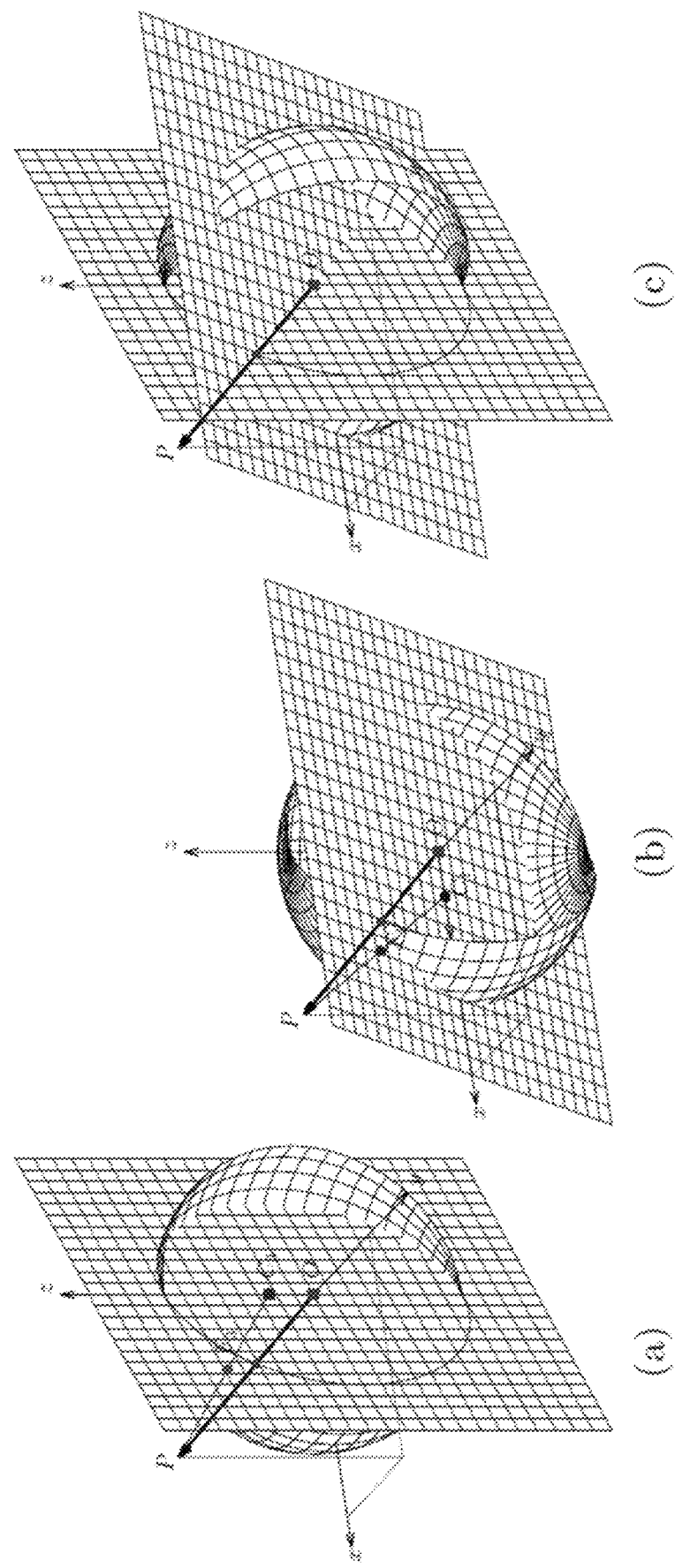
FIG. 43 is a series of planes according to an embodiment of the invention.

FIG. 43 is a series of planes according to an embodiment of the invention. FIG. 43(a) is plane $\Pi_3$, FIG. 43(b) is plane $\Pi_1$, and FIG. 43(c) is both planes intersecting along the ray between O and P. A vector $n_3$ normal to the plane $\Pi_3$ and containing the three points O, $C_3$, and $F_3$ may be given by $$n_3 = \overrightarrow{OC_3} \times \overrightarrow{C_3F_3}$$

$$\begin{vmatrix} \hat{i} & \hat{j} & \hat{k} \\ 0 & 0 & d_3 \\ x_3 & y_3 & z_3 \end{vmatrix}$$

$$n_3 = (-d_3y_3, d_3x_3, 0)$$

which may lie on the xy plane. Since the term $d_3$ may not change the direction of the normal, it may be factored out, and the normal may be expressed as $$n_3 = (-y_3, x_3, 0)$$

Thus, any point p on the plane $\Pi_3$ may satisfy $$n_3 \cdot p = (-y_3, x_3, 0) \cdot (x, y, z) = 0$$

$$-y_3 x + x_3 y = 0$$

An example of this plane is shown in FIG. 30(a).

Similarly, for the plane $\Pi_1$ containing the points O, $C_1$ (center of the left projection), and $F_1$ (the projection of point P onto the left fisheye sphere), under alignment of the spherical polar axis to the x axis of the reference coordinate system, it may hold $$C_1 = (d_1, 0, 0)$$

$$F_1 = (x_1, y_1, z_1) = (r_1\cos\emptyset_1 + d_1,\ r_1\sin\emptyset_1\cos\theta_1,\ r_1\sin\emptyset_1 + \sin\theta_1)$$

A vector $n_1$ normal to $\Pi_1$ may be computed from the cross product of the x axis and the ray $\overrightarrow{C_1F_1}$ as $$n_1 = (0, z_1, y_1)$$

and therefore the equation for the plane $\Pi_1$ may be $$1 = 0$$
$$-z_1 y + y$$

An example of this plane is shown in FIG. 30(b).

Due the fact that both planes include both the point O and the ray to the point P, the normal vectors $n_1$ and $n_3$ may also be perpendicular to that ray $\overrightarrow{OP}$, whose direction v may be aligned to the cross product of the normal as follows:

$$v = n_3 \times n_1$$

$$\begin{vmatrix} \hat{i} & \hat{j} & \hat{k} \\ -y_3 & x_3 & 0 \\ 0 & -z_1 & y_1 \end{vmatrix}$$

$$(x_3 y_1,\ y_3 y_1,\ y_3 z_1)$$

where $$x_3 = r_3\sin\emptyset_3\cos\theta_3 \quad y_3 = r_3\sin\emptyset_3\sin\theta_3$$
$$x_1 = r_1\sin\emptyset_1\cos\theta_1 \quad y_1 = r_1\sin\emptyset_1\sin\theta_1$$

Thus, considering the direction only, and discarding the factors $r_1 r_2$, $$v = (v_x, v_y, v_z)$$
$$(\sin\emptyset_3\cos\theta_3\sin\emptyset_1\cos\theta_1,\ \sin\emptyset_3\sin\theta_3\sin\emptyset_1\cos\theta_1,\ \sin\emptyset_3\cos\theta_3\sin\emptyset_1\sin\theta_1)$$

The final projection of P onto the reference sphere may require the polar representation of v, which may be given by:

$$\theta_s = \arctan\left(\frac{v_y}{v_x}\right) = \arctan\left(\frac{\sin\theta_y}{\cos\theta_x}\right) = \theta_3$$

$$\emptyset_s = \arctan\left(\frac{\sqrt{v_x^2 + v_y^2}}{v_z}\right) = \arctan\left(\frac{\cot\theta_1}{\sin\emptyset_3}\right)$$

which describes how to project into the reference sphere a point in space depicted in two fisheye images if the correspondence of that point is known.

Finding τ Using Distance Markers

Let τ be a scaling factor such that $$t_{w_ic} = \tau s_0 \quad 5$$

An alternative method to the translation vector finding method discussed above may use the distance markers in the calibration cage to find the value of t based on the known distance between the distance markers.

Deriving the value of τ may start from the images of the markers on the projection sphere, which may be derived with the intrinsic distortion model introduced above and the distance markers. The distance markers may be entered manually by a user or may be automatically detected. The distance between them is assumed to be known in this example.

One axis of the cage coordinate system may be described on the camera coordinate system with:

$$a(s) = a_0 + s r_n$$

where the unitary vector $r_n$ may correspond to one of the columns of the rotation matrix $R_{w_ic}$ and may be parallel to that axis. The point $a_0$ may represent the origin of the coordinate system, and therefore $$a_0 = \tau s_0$$

Each marker on the fisheye image may represent all points on a ray starting at the origin of the camera system and passing through the real i-th marker in the cage. That ray may be parameterized as follows:

$$m_i(t) = t v_i$$

where $v_i$ is a directional unitary vector that may be estimated from the markers in the image with the fisheye projection model introduced above.

Here it may be assumed that the coordinates of the marker in 3D coordinate system of the camera can be estimated as the closest point on the axis to the corresponding ray. The closest points in the ray and in the axis may be generated with the parameters:

$$s_c = \frac{(r_n^T v_i)(\tau s_0^T v_i) - \tau r_n^T s_0}{1 - (r_n^T v_i)^2}$$

$$t_c = \frac{\tau s_0^T v_i - (r_n^T v_i)(\tau r_n^T s_0)}{1 - (r_n^T v_i)^2}$$

The parameter $s_c$ may be of particular interest. If $\Delta$ is the distance between two consecutive markers, since $\|r_n\|_2 = 1$, $$s_c = i\Delta$$

where $i \in \mathbb{Z}$. Combining the previous results may yield $$s_c = i\Delta = \tau \frac{(r_n^T v_i)(\tau s_0^T v_i) - r_n^T s_0}{1 - (r_n^T v_i)^2} = \tau \varsigma_i$$

with $$\varsigma_i = \frac{(r_n^T v_i)(s_0^T v_i) - r_n^T s_0}{1 - (r_n^T v_i)^2}$$

and $$\tau = \frac{i\Delta}{\varsigma}$$

Another way to compute t may make use of the information of two consecutive markers. Since $$(i+1)\Delta = \tau \varsigma_{i+1}$$

$$i\Delta = \tau \varsigma_i$$

by subtracting both expressions $$\Delta = \tau(\varsigma_{i+1} - \varsigma_i)$$

and $$\tau = \frac{\Delta}{\varsigma_{i+1} - \varsigma_i}$$

Performing the above-described calibration processing during an initial setup of a multi-camera system and/or after changes to the multi-camera system may enable the above-described panorama generation processing to be performed quickly and with minimal processing power. Accordingly, the disclosed systems and methods may provide a substantial improvement in image processing hardware operation.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
    identifying, by at least one processor, a geometric arrangement of a plurality of networked imagers with respective fields of view;
    determining, by the at least one processor, a panoramic geometry covered entirely or partially by the respective fields of view;
    determining, by the at least one processor, respective projections of the respective fields of view onto the panoramic geometry;
    receiving, by the at least one processor, a plurality of images from the plurality of networked imagers; and combining, by the at least one processor, the plurality of images into at least one combined image by positioning pixels of each of the plurality of images relative to pixels of the remaining plurality of images according to the respective projections and merging the positioned pixels of each of the plurality of images into the at least one combined image.

2. The method of claim 1, wherein the respective projections are respective spherical projections.

3. The method of claim 2, wherein the determining of the respective projections comprises displacing at least one center of at least one of the respective spherical projections with respect to a center of the panoramic geometry.

4. The method of claim 1, wherein the combining further comprises registration of the plurality of images, the registration comprising at least one of image distortion correction, feature detection, feature matching, and camera parameter estimation.

5. The method of claim 1, wherein the combining further comprises at least one of warping at least one of the plurality of images, exposure estimation of at least one of the plurality of images, and exposure compensation of at least one of the plurality of images.

6. The method of claim 1, further comprising:
receiving, by the at least one processor, orientation data indicating orientations of the plurality of networked imagers;
wherein:
the combining further comprises associating the positioned pixels with the orientation data, and
the merging is performed subsequent to the associating, resulting in the at least one combined image being an oriented image.

7. The method of claim 6, wherein the orientation data comprises a quaternion, a Euler angle, or a combination thereof.

8. The method of claim 6, wherein the combining further comprises compensating for at least one of pitch, roll, and yaw of the plurality of networked imagers.

9. The method of claim 1, wherein the positioning comprises correcting for a parallax effect in at least one of the images, determining a transformation factor for portions of the image data, relating pixel coordinate systems between the portions of the image data, estimating a global alignment between the portions of the image data, detecting a common distinctive feature in the portions of the image data, computing a globally consistent set of alignments for the portions of the image data, selecting a final compositing surface and a parameterization for the portions of the image data, or a combination thereof.

10. The method of claim 1, further comprising transmitting the at least one combined image to at least one receiver unit.

11. An imaging system comprising:
a plurality of networked imagers arranged in a geometric arrangement with respective fields of view; and
at least one processor in communication with the networked imagers, the at least one processor being configured to:
identify a geometric arrangement of the plurality of networked imagers;
determine a panoramic geometry covered entirely or partially by the respective fields of view;
determine respective projections of the respective fields of view onto the panoramic geometry;
receive a plurality of images from the plurality of networked imagers; and
combine the plurality of images into at least one combined image by positioning pixels of each of the plurality of images relative to pixels of the remaining plurality of images according to the respective projections and merging the positioned pixels of each of the plurality of images into the at least one combined image.

12. The imaging system of claim 11, wherein the respective projections are respective spherical projections.

13. The imaging system of claim 12, wherein the determining of the respective projections comprises displacing at least one center of at least one of the respective spherical projections with respect to a center of the panoramic geometry.

14. The imaging system of claim 11, wherein the combining further comprises registration of the plurality of images, the registration comprising at least one of image distortion correction, feature detection, feature matching, and camera parameter estimation.

15. The imaging system of claim 11, wherein the combining further comprises at least one of warping at least one of the plurality of images, exposure estimation of at least one of the plurality of images, and exposure compensation of at least one of the plurality of images.

16. The imaging system of claim 11, further comprising:
at least one inertial measurement unit (IMU) in communication with the plurality of networked imagers and the at least one processor, the at least one IMU being configured to generate orientation data indicating orientations of the plurality of networked imagers;
wherein:
the combining further comprises associating the positioned pixels with the orientation data, and
the at least one processor is further configured to perform the merging subsequent to the associating, resulting in the at least one combined image being an oriented image.

17. The imaging system of claim 16, wherein the orientation data comprises a quaternion, a Euler angle, or a combination thereof.

18. The imaging system of claim 16, wherein the combining further comprises compensating for at least one of pitch, roll, and yaw of the plurality of networked imagers.

19. The imaging system of claim 11, wherein the positioning comprises correcting for a parallax effect in at least one of the images, determining a transformation factor for portions of the image data, relating pixel coordinate systems between the portions of the image data, estimating a global alignment between the portions of the image data, detecting a common distinctive feature in the portions of the image data, computing a globally consistent set of alignments for the portions of the image data, selecting a final compositing surface and a parameterization for the portions of the image data, or a combination thereof.

20. The imaging system of claim 11, wherein the at least one processor is further configured to transmit the at least one combined image to at least one receiver unit.

* * * * *